US011975530B2

(12) United States Patent
Landa et al.

(10) Patent No.: US 11,975,530 B2
(45) Date of Patent: *May 7, 2024

(54) DIGITAL PRINTING PROCESS

(71) Applicant: LANDA CORPORATION LTD., Rehovot (IL)

(72) Inventors: Benzion Landa, Nes Ziona (IL); Sagi Abramovich, Ra'anana (IL); Moshe Levanon, Rehovot (IL); Galia Golodetz, Rehovot (IL); Helena Chechik, Rehovot (IL); On Mero, Ganei Tikva (IL); Tatiana Kurtser, Petach Tikva (IL); Ayal Galili, Beit Elazari (IL); Uriel Pomerantz, Kfar Saba (IL); Dan Avital, Mazkeret Batya (IL); Jose Kuperwasser, Ashdod (IL); Omer Ashkenazi, Kfar Gibton (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,875

(22) Filed: May 10, 2023

(65) Prior Publication Data

US 2023/0356534 A1 Nov. 9, 2023

Related U.S. Application Data

(63) Continuation of application No. 17/842,860, filed on Jun. 17, 2022, now Pat. No. 11,697,291, which is a (Continued)

(51) Int. Cl.

*B41J 2/005* (2006.01)
*B41J 11/00* (2006.01)
*B41J 2/01* (2006.01)

(52) U.S. Cl.

CPC ......... *B41J 11/0015* (2013.01); *B41J 2/0057* (2013.01); *B41J 11/0045* (2013.01); *B41J 2/01* (2013.01); *B41J 2002/012* (2013.01)

(58) Field of Classification Search

CPC .. B41J 11/0015; B41J 2/0057; B41J 11/0045; B41J 2/01; B41J 2002/012

See application file for complete search history.

(56) References Cited

U.S. PATENT DOCUMENTS 3,837,878 A 9/1974 Beers
5,278,199 A 1/1994 Ohkawa et al.
(Continued)

FOREIGN PATENT DOCUMENTS

CN 201082827 Y 7/2008
CN 104975254 A 10/2015
(Continued)

OTHER PUBLICATIONS

CN104975254A Machine Translation (by EPO and Google)—published Oct. 14, 2015; Shanghai Junshan Surface Technology Engineering Co Ltd.
(Continued)

*Primary Examiner* — Yaovi M Ameh
(74) *Attorney, Agent, or Firm* — Momentum IP; Marc Van Dyke

(57) ABSTRACT

Embodiments of the invention relate to a method of indirect printing with an aqueous ink. Related apparatus, systems and treatment formulations are disclosed herein. Some embodiments relate to an aqueous treatment formulation for use with an intermediate transfer member of a printing system. In some embodiments, the system comprises a treatment station disposed downstream of the impression station and upstream of the image forming station for forming a uniform thin layer of a liquid treatment formula-
(Continued)

tion onto a surface of an intermediate transfer member (ITM) at a lower run thereof.

20 Claims, 27 Drawing Sheets

Related U.S. Application Data continuation of application No. 17/157,767, filed on Jan. 25, 2021, now Pat. No. 11,396,190, which is a continuation of application No. 16/303,631, filed as application No. PCT/IL2017/050616 on Jun. 1, 2017, now Pat. No. 10,933,661, which is a continuation-in-part of application No. PCT/IB2017/053177, filed on May 30, 2017.

(60) Provisional application No. 62/513,388, filed on May 31, 2017, provisional application No. 62/343,123, filed on May 30, 2016, provisional application No. 62/343,108, filed on May 30, 2016.

(56) References Cited

U.S. PATENT DOCUMENTS

| | | | | |
|---|---|---|---|---|
| 5,683,841 | A * | 11/1997 | Kato | G03G 13/286<br>430/49.31 |
| 7,419,257 | B2 | 9/2008 | Mouri et al. | |
| 8,632,147 | B2 | 1/2014 | Onishi | |
| 9,044,932 | B2 | 6/2015 | Ohnishi et al. | |
| 9,969,182 | B2 | 5/2018 | Torisaka et al. | |
| 10,052,865 | B2 | 8/2018 | Goto | |
| 10,336,060 | B2 | 7/2019 | Liu | |
| 11,396,190 | B2 * | 7/2022 | Landa | B41J 11/0045 |
| 11,697,291 | B2 * | 7/2023 | Landa | B41J 11/0045<br>347/103 |
| 2006/0175559 | A1 | 8/2006 | Fischer et al. | |
| 2008/0101895 | A1 | 5/2008 | Holcomb et al. | |
| 2008/0295724 | A1 | 12/2008 | Lohweg et al. | |
| 2009/0237479 | A1 * | 9/2009 | Yamashita | B41J 11/00214<br>347/102 |
| 2009/0317555 | A1 * | 12/2009 | Hori | B41J 29/393<br>427/428.01 |
| 2012/0280447 | A1 | 11/2012 | Kayanuma | |
| 2013/0016156 | A1 | 1/2013 | Ooishi et al. | |
| 2015/0097906 | A1 | 4/2015 | Beier et al. | |
| 2015/0375474 | A1 | 12/2015 | DeGolier et al. | |
| 2018/0281382 | A1 | 10/2018 | Umezawa et al. | |
| 2019/0232638 | A1 | 8/2019 | Ziegenbalg et al. | |
| 2020/0376860 | A1 | 12/2020 | Paker et al. | |
| 2023/0166495 | A1 | 6/2023 | Burkatovsky | |
| 2023/0202162 | A1 | 6/2023 | Landa et al. | |
| 2023/0202209 | A1 | 6/2023 | Guttman et al. | |

FOREIGN PATENT DOCUMENTS

| | | | |
|---|---|---|---|
| DE | 102012011783 | A1 | 12/2013 |
| JP | H05249870 | A | 9/1993 |
| JP | H0659608 | A | 3/1994 |
| JP | H08272224 | A | 10/1996 |
| JP | 2003107819 | A | 4/2003 |
| JP | 2003200106 | A | 7/2003 |
| JP | 2003227549 | A | 8/2003 |
| JP | 3712547 | B2 | 11/2005 |
| JP | 2009083315 | A | 4/2009 |
| JP | 2009258587 | A | 11/2009 |
| JP | 2010076214 | A | 4/2010 |
| JP | 2012081770 | A | 4/2012 |
| WO | 2015036865 | A1 | 3/2015 |
| WO | 2019012456 | A1 | 1/2019 |
| WO | 2019111223 | A1 | 6/2019 |
| WO | 2020003088 | A1 | 1/2020 |
| WO | 2020136517 | A1 | 7/2020 |
| WO | 2020141465 | A1 | 7/2020 |
| WO | 2021137063 | A1 | 7/2021 |

OTHER PUBLICATIONS

CN201082827Y Machine Translation (by EPO and Google)—published Jul. 9, 2008; Baoshan Iron Steel.
Co-pending U.S. Appl. No. 18/016,343, inventors Levanon; Moshe et al., filed Jan. 15, 2023.
Co-pending U.S. Appl. No. 18/134,190, inventor Landa; Benzion, filed Apr. 13, 2023.
DE102012011783A1 Machine Translation (by EPO, PlatPat and Google)—published Dec. 19, 2013; Heidelberger Druckmasch AG.
JP2003107819A Machine Translation (by EPO and Google)—published Apr. 9, 2003; Kanegafuchi Chemical Ind.
JP2003200106A Machine Translation (by EPO and Google)—published Jul. 15, 2003; Fuji Photo Film Co Ltd.
JP2003227549A Machine Translation (by EPO, PlatPat and Google)—published Aug. 15, 2003; Xerox Corp.
JP2009083315A Machine Translation (by EPO and Google)—published Apr. 23, 2009; Fujifilm Corp.
JP2009258587A Machine Translation (by EPO and Google)—published Nov. 5, 2009; Fuji Xerox Co Ltd.
JP2010076214A Machine Translation (EPO, PlatPat and Google) published on Apr. 8, 2010 Fuji Xerox Co Ltd.
JP2012081770A Machine Translation (EPO, PlatPat and Google) published on Apr. 26, 2012 Komori Printing Mach.
JP3712547B2 Machine Translation (EPO, PlatPat and Google) published on Nov. 2, 2005 Sasaya Shunji.
JPH05249870A Machine Translation (by EPO, PlatPat and Google)—published Sep. 28, 1993; Matsushita Electric Ind Co Ltd.
JPH0659608A Machine Translation (by EPO and Google)—published Mar. 4, 1994; Xerox Corp.
JPH08272224A Machine Translation (by EPO, PlatPat and Google)—published Oct. 18, 1996; Ricoh KK.

* cited by examiner

Profile of Dried Treatment Film Having a Smooth, Uniform Upper Surface, as a Function of Position Profile of Dried Treatment Film Having a Smooth, Uniform Upper Surface, as a Function of Position Single Ink Dot, Transferred to Coated Paper 130 GSM (x100)

Field of View of Ink Dots on Coated Paper 130 GSM (x20)

Single Ink Dot, Transferred to Uncoated Paper (x100)

Field of View of Ink Dots on Uncoated Paper (x20)

Fig. 25A
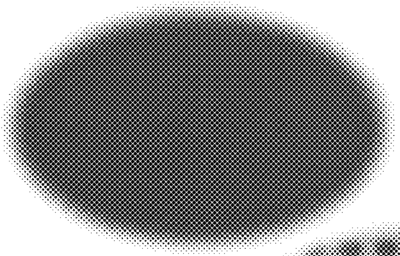
Fig. 25B
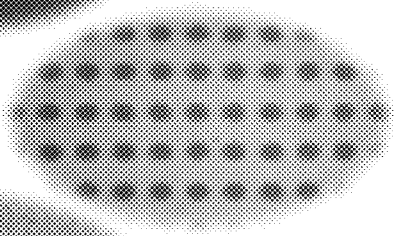
Fig. 25C
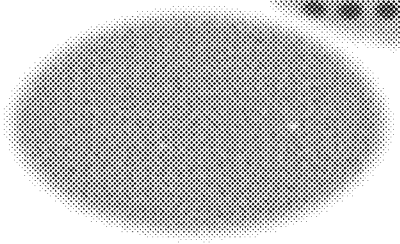
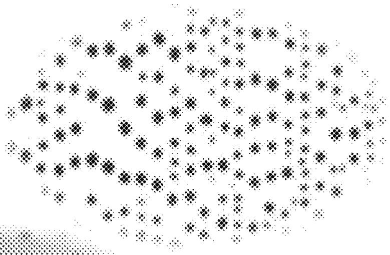
Fig. 26A
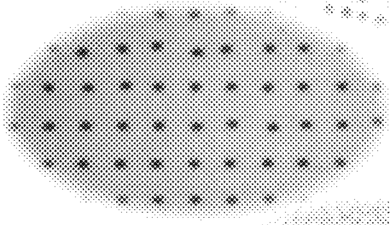
Fig. 26B
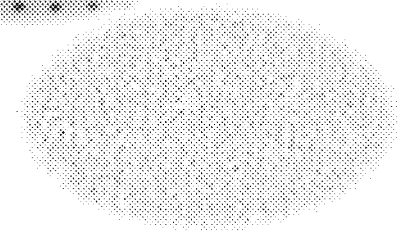
Fig. 26C

DIGITAL PRINTING PROCESS

CROSS-REFERENCE TO RELATED APPLICATIONS

PCT/IL2017/050616 filed on Jun. 1, 2017 is incorporated herein by reference in its entirety. PCT/IL2017/050616 claims priority to U.S. patent application Ser. No. 62/343,123 filed on May 30, 2016, and to U.S. patent application Ser. No. 62/343,108 filed on May 30, 2016, both of which are entirely incorporated herein by reference.

FIELD

The present disclosure relates to a digital printing process, aqueous treatment formulations, and related kits and systems.

BACKGROUND

The following patent publications provide potentially relevant background material, and are all incorporated by reference in their entirety: WO/2017/009722 (publication of PCT/IB2016/053049 filed May 25, 2016), WO/2016/166690 (publication of PCT/IB2016/052120 filed Apr. 4, 2016), WO/2016/151462 (publication of PCT/IB2016/051560 filed Mar. 20, 2016), WO/2016/113698 (publication of PCT/IB2016/050170 filed Jan. 14, 2016), WO/2015/110988 (publication of PCT/IB2015/050501 filed Jan. 22, 2015), WO/2015/036812 (publication of PCT/IB2013/002571 filed Sep. 12, 2013), WO/2015/036864 (publication of PCT/IB2014/002366 filed Sep. 11, 2014), WO/2015/036865 (publication of PCT/IB2014/002395 filed Sep. 11, 2014), WO/2015/036906 (publication of PCT/IB2014/064277 filed Sep. 12, 2014), WO/2013/136220 (publication of PCT/IB2013/051719 filed Mar. 5, 2013), WO/2013/132419 (publication of PCT/IB2013/051717 filed Mar. 5, 2013), WO/2013/132424 (publication of PCT/IB2013/051727 filed Mar. 5, 2013), WO/2013/132420 (publication of PCT/IB2013/051718 filed Mar. 5, 2013), WO/2013/132439 (publication of PCT/IB2013/051755 filed Mar. 5, 2013), WO/2013/132438 (publication of PCT/IB2013/051751 filed Mar. 5, 2013), WO/2013/132418 (publication of PCT/IB2013/051716 filed Mar. 5, 2013), WO/2013/132356 (publication of PCT/IB2013/050245 filed Jan. 10, 2013), WO/2013/132345 (publication of PCT/IB2013/000840 filed Mar. 5, 2013), WO/2013/132339 (publication of PCT/IB2013/000757 filed Mar. 5, 2013), WO/2013/132343 (publication of PCT/IB2013/000822 filed Mar. 5, 2013), WO/2013/132340 (publication of PCT/IB2013/000782 filed Mar. 5, 2013), WO/2013/132432 (publication of PCT/IB2013/051743 filed Mar. 5, 2013).

FIG. 1 is a flow chart of a conventional printing process where an intermediate transfer member (ITM) is pre-treated before deposition of an ink image thereto. In step S1, treatment solution is applied to a surface of a hydrophobic ITM to pretreat the ITM surface. In step S9, droplets of aqueous ink are ink-jetted onto the pretreated ITM surface to form an ink image thereon. In step S13, the ink image dries while on the ITM surface. In step S17, the dried ink-image is transferred to substrate. Embodiments of the present invention relate to improved printing processes, to improved ITM (or portions thereof) and to improved compositions used for pre-treating the ITM before deposition of droplets of aqueous ink.

SUMMARY

Aspects of the present invention relate to a method of printing comprising: a. providing an intermediate transfer member (ITM) comprising a silicone-based release layer surface that is sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°; b. providing an aqueous treatment formulation comprising: i. at least 3%, by weight, of a quaternary ammonium salt having a solubility in water, at 25° C., of at least 5%; ii. at least 1%, by weight, of at least one water soluble polymer having a solubility in water of at least 5% at 25° C.; and iii. a carrier liquid containing water, the water making up at least 65%, by weight of the aqueous treatment formulation; the aqueous treatment formulation having the following properties: i. a static surface tension within a range of 20 and 40 dynes/cm at 25° C.; ii. a 25° C. dynamic viscosity that is at least 10 cP; and iii. a 60° C. evaporation load of at most 8:1, by weight; c. applying the aqueous treatment formulation to the silicone-based release layer surface of the ITM to form thereon a wet treatment layer having a thickness of at most 0.8 μm; d. subjecting the wet treatment layer to a drying process to form a dried treatment film, from the wet treatment layer, on the silicone-based release layer surface; e. depositing droplets of an aqueous ink onto the dried treatment film to form an ink image on the release layer surface of the silicone-based release layer surface; f. drying the ink image to leave an ink-image residue on the silicone-based release layer surface; and g. transferring the ink-image residue onto a printing substrate by pressured contact between the ITM and the printing substrate.

Aspects of the present invention relate to a method of printing comprising: a. providing an intermediate transfer member (ITM) comprising a silicone-based release layer surface that is sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°; b. providing an aqueous treatment formulation comprising: i. at least 3%, by weight, of a quaternary ammonium salt having a solubility in water, at 25° C., of at least 5%; ii. at least 1%, by weight, of at least one water soluble polymer having a solubility in water of at least 5% at 25° C.; and iii. a carrier liquid containing water, the water making up at least 65%, by weight of the aqueous treatment formulation; the aqueous treatment formulation having the following properties: i. a static surface tension within a range of 20 and 40 dynes/cm at 25° C.; ii. a 25° C. dynamic viscosity that is at least 10 cP; and iii. a 60° C. evaporation load of at most 8:1, by weight; c. applying the aqueous treatment formulation to the silicone-based release layer surface of the ITM to form thereon a wet treatment layer; d. subjecting the wet treatment layer to a drying process to form a dried treatment film, from the wet treatment layer, on the silicone-based release layer surface; e. depositing droplets of an aqueous ink onto the dried treatment film to form an ink image on the release layer surface of the silicone-based release layer surface; f. drying the ink image to leave an ink-image residue on the silicone-based release layer surface; and g. transferring the ink-image residue onto a printing substrate by pressured contact between the ITM and the printing substrate.

Aspects of the present invention relate to a kit for printing, the kit comprising: a. an intermediate transfer member (ITM) comprising a silicone-based release layer surface that is sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°; and b. a quantity of an aqueous treatment formulation comprising: i. at least 3%, by weight, of a quaternary ammonium salt having a solubility in water, at 25° C., of at least 5%; ii. at least 1%, by weight, of at least one water soluble polymer having a solubility in water of at least 5% at 25° C.; and iii. a carrier liquid containing water, said water making up at least 65%, by weight of the aqueous treatment formulation; the aqueous treatment formulation having the following properties: i. a static surface tension within a range of 20 and 40 dynes/cm at 25° C.; ii. a 25° C. dynamic viscosity that is at least 10 cP; and iii. a 60° C. evaporation load of at most 8:1, by weight.

In some embodiments, the 60° C. evaporation load of the provided aqueous treatment formulation is at most 6:1, at most 5:1, at most 4:1, at most 3.5:1, or at most 3:1, and optionally, at least 2:1, at least 2.2:1 or at least 2.5:1.

In some embodiments, concentration of the quaternary ammonium salt within the provided aqueous treatment formulation is within a range of 3 to 15%; a concentration of the water soluble polymer is within a range of 2.5 to 10% or 2.5 to 8%, a 60° C. evaporation load is within a range of 2.5:1 to 4:1, and the viscosity is at least 12 cP, and optionally, at least 14 cP or at least 16 cP.

In some embodiments, wherein the provided aqueous treatment formulation has a total surfactant concentration of at least 6%, at least 7%, at least 8%, at least 9%, or at least 10%, and optionally, within a range of 6 to 40%, 6 to 30%, 6 to 20%, 7 to 30%, 7 to 20%, 7 to 15%, 8 to 25%, 8 to 20%, 8 to 15%, or 8 to 13%.

In some embodiments, a total concentration of organic solvents within the provided aqueous treatment formulation is at most 3%, at most 2%, at most 1%, or at most 0.5%, by weight, or wherein the formulation is organic-solvent-free.

In some embodiments, a total concentration of liquid hygroscopic agents within the provided aqueous treatment formulation is at most 1.5%, at most 1%, at most 0.5%, at most 0.3%, or at most 0.1%, by weight, or wherein the aqueous treatment formulation liquid-hygroscopic-agent-free.

In some embodiments, the quaternary ammonium salt of the provided aqueous treatment formulation is an organic quaternary ammonium salt.

In some embodiments, a first carbon chain of the organic quaternary ammonium salt has a length of at least 6 carbon atoms, and optionally, within a range of 6 to 20, 6 to 18, 8 to 20, or 8 to 18 carbon atoms.

In some embodiments, wherein a second carbon chain of the organic quaternary ammonium salt has a length of at most 3 carbon atoms, or at most 2 carbon atoms.

In some embodiments, wherein a third carbon chain of the organic quaternary ammonium salt has a length of at most 3 carbon atoms, at most 2 carbon atoms, or 1 carbon atom.

In some embodiments, the organic quaternary ammonium salt is a cationic organic quaternary ammonium salt optionally having a sulfate or phosphate anion.

In some embodiments, the silicone-based release layer surface is sufficiently hydrophilic to satisfy at least one of the following property: a receding contact angle of a drop of distilled water deposited on the silicone-based release layer surface is at most 60°.

In some embodiments, the silicone-based release layer surface is sufficiently hydrophilic such that a 10-second dynamic contact angle (DCA) of a drop of distilled water deposited on the silicone-based release layer surface is at most 108°.

In some embodiments, the provided ITM comprises a support layer and a release layer having the silicone-based release layer surface and a second surface that (i) opposes the silicone-based release layer surface, and (ii) is attached to the support layer, the release layer is formed of an addition-cured silicone material, and a thickness of the release layer being at most 500 micrometers (μm).

In some embodiments, the release layer of the provided ITM consisting essentially of addition-cured silicone, or contains, by weight, at least 95% addition-cured silicone.

In some embodiments, functional groups within the silicone based release layer surface of the provided ITM make up at most 3%, by weight, of the addition-cured silicone material.

In some embodiments, a polyether glycol functionalized polydimethyl siloxane is impregnated in the addition-cured silicone material of the provided ITM.

In some embodiments, the release layer of the provided ITM is adapted such that polar groups of the ink reception surface have an orientation away from or opposite from the second surface.

In some embodiments, a surface hydrophobicity of silicone-based release layer surface of the provided ITM is less than a bulk hydrophobicity of the cured silicone material within the release layer, the surface hydrophobicity being characterized by a receding contact angle of a droplet of distilled water on the ink reception surface, the bulk hydrophobicity being characterized by a receding contact angle of a droplet of distilled water disposed on an inner surface formed by exposing an area of the cured silicone material within the release layer to form an exposed area.

In some embodiments, the aqueous treatment formulation is applied to the silicone-based release layer surface such that the thickness of the wet treatment layer is at most 0.6 μm, at most 0.5 μm or at most 0.4 μm.

In some embodiments, the wet treatment layer is formed and/or thinned by urging a rounded surface towards the ITM or vice versa, wherein: i. the rounded surface has a radius of curvature of at most 2 mm or at most 1.5 mm or at most 1.25 mm or at most 1 mm and/or ii. the urging is at a force density in the cross-print direction of at least 250 g/cm or at least 350 g/cm or at least 400 gm/cm and/or at most 1 kg/cm or at most 750 g/cm or at most 600 g/cm and/or iii. the urging is performed by applying a pressure between and the ITM, a magnitude of the pressure being at least 0.1 bar or at least 0.25 bar or at least 0.35 bar or at least 0.5 bar, and optionally at most 2 bar or at most 1.5 bar, or at most 1 bar.

In some embodiments, the wet treatment layer is formed and/or thinned by a stationary applicator and/or rounded surface that directly or indirectly applies a force against an in-motion ITM to (i) deform the ITM to cause a depression therein; and (ii) to establish a velocity gradient of flowing aqueous treatment formulation, the velocity gradient being normal to the ITM and formed in a gap region between the ITM and the stationary applicator.

In some embodiments, the magnitude of the velocity gradient is at least $10^6$ $sec^{-1}$ or at least $2\times10^6$ $sec^{-1}$.

In some embodiments, the aqueous treatment formulation is applied to at least portion(s) of the ITM that are in-motion at a velocity of at least 1 meters/second or at least 1.5 meters/second or at least 2 meters/second, to form the wet treatment layer thereon.

In some embodiments, formation of the wet treatment layer or thinning thereof comprises forcing the aqueous treatment formulation to flow such that a velocity gradient normal to the ITM is established, a magnitude of the velocity gradient being at least $10^6$ $sec^{-1}$ or at least $2\times10^6$ $sec^{-1}$.

In some embodiments, the release surface of the ITM has a Shore A hardness of at most 50 or at most 45 or at most 40 or at most 35 or at most 30 or at most 25 or at most 20 or at most 15.

In some embodiments, the drying process of the wet treatment layer is sufficiently rapid such that the viscosity of the aqueous treatment formulation increases rapidly enough to inhibit surface-tension-driven beading such that the dried treatment film has a smooth upper surface.

In some embodiments, the smooth upper surface of the dried treatment film is characterized by an average roughness $R_a$ of at most 12 nanometers or at most 10 nanometers or at most 9 nanometers or at most 8 nanometers or at most 7 nanometers or at most 5 nanometers.

In some embodiments, the drying of the treatment solution is performed sufficiently rapidly so as to prevent beading and so as leave a continuous hydrophilic and cohesive polymer treatment film having a thickness of at most 200 nm, or at most 150 nm, or at most 120 nm, or at most 100 nm, or at most 80 nm, or at most 70 nm, or at most 60 nm, or at most 50 nm, or at most 40 nm, or at most 30 nm.

In some embodiments, a thickness of the dried treatment film to which the aqueous ink droplets are deposited is at most 200 nm, or at most 120 nm, or at most 100 nm, or at most 80 nm.

In some embodiments, a thickness of the dried treatment film to which the aqueous ink droplets are deposited is at least 15 nm or at least 20 nm or at least 30 nm.

In some embodiments, the dried treatment film is continuous over an entirety of a rectangle of the release surface of the ITM, wherein the rectangle has a width of at least 10 cm and a length of at least 10 meters.

In some embodiments, the dried treatment film for at least 50% or at least 75% or at least 90% or at least 95% at least 95% or at least 99% or 100% of an area of the rectangle, a thickness of the dried treatment film does not deviate from an average thickness value within the rectangle by more than 50% or more than 40% or more than 30%

In some embodiments, during the drying process of the wet treatment layer, a dynamic viscosity thereof increases by at least a factor of 1000 within a period of time of at most 250 milliseconds.

In some embodiments, a liquid content of the dried treatment film is at most 10% wt/wt or at most 7.5% wt/wt or at most 5% wt/wt or at most 2.5% wt/wt or at most 1.5% wt/wt or at most 1% wt/wt.

In some embodiments, the droplets of the aqueous ink are deposited onto the dried treatment film by ink-jetting.

In some embodiments, the ink-image residue is transferred together with non-printed areas of the dried treatment film onto the printing substrate.

In some embodiments, a thickness of the dried treatment film is at most 120 nm.

In some embodiments, the dried treatment film is sufficiently cohesive such that during transfer of the ink-image residue, the dried treatment film completely separates from the ITM and transfers to the printing substrate with the dried ink image, both in printed and non-printed areas.

In some embodiments, the transfer of the ink-image residue is performed at a transfer temperature of at most 100° C. or at most 90° C.

In some embodiments, solids (e.g. nano-pigments and/or resins) of the aqueous ink migrate into the bulk of the dried treatment film to interact with (e.g. bond with) quaternary ammonium salts residing within the dried treatment film (e.g. so as to promote droplet spreading).

In some embodiments, solids of the aqueous ink migrate into the bulk of the dried treatment film to interact with quaternary ammonium salts residing within the dried treatment film so as to promote droplet spreading.

In some embodiments, the method is performed such that: i. an ink dot set IDS of ink substrate-residing ink dots is formed; ii. a droplet plurality DP of the aqueous ink droplets that are deposited onto the ITM-residing dried treatment film forms the ink dot set IDS of ink substrate-residing ink dots such that there is a correspondence between: A. each given droplet of the droplet plurality DP and B. a respective given substrate-residing ink-dot of the ink-dot set such that the given droplet results in and/or evolves into the given substrate-residing ink-dot; iii. during deposition, whenever a droplet of the droplet plurality collides with the dried treatment film on the ITM, kinetic energy of the colliding droplet deforms the droplet; iv. a maximum impact radius of each of the deformed droplets over the surface of the ITM has a maximum impact radius value $R_{MAX\_IMPACT}$; v. subsequent to impact, physiochemical forces spread the deformed droplets such that each ink dot of substrate-residing ink-dot set IDS has a dried-dot radius $R_{DRIED\_DOT\_ON\_SUBSTRATE}$; vi. for each droplet of the droplet plurality and corresponding ink dot of the ink dot set IDS, a ratio between A. the substrate-residing dried-dot radius $R_{DRIED\_DOT\_ON\_SUBSTRATE}$; and B. the deformed-droplet maximum impact radius value $R_{MAX\_IMPACT}$, is at least 1.1.

In some embodiments, the method is performed such that: i. a droplet plurality DP of the droplets that are deposited onto the ITM-residing dried treatment film generates an ink-dot set IDS of substrate-residing ink dots (i.e. fixedly adhered to a top substrate surface), each droplet of the droplet plurality DP corresponding to a different respective substrate-residing ink-dot of the ink-dot set IDS; ii. each ink droplet of the droplet plurality DP is deposited, according to jetting parameters, onto the substrate; iii. the jetting parameters together with the physicochemical properties of ink droplets of the droplet plurality DP collectively define an ink-jet-paper dot-radius $R_{DIRECT-JETTING-ONTO-INK-JET-PAPER-THEORETICAL}$ which is the radius of the ink-dot obtained if the ink droplets were directly inn-jetted onto ink-jet-paper instead of the dried treatment film; and iv. a ratio between (A) the dried-dot radius $R_{DRIED\_DOT\_ON\_SUBSTRATE}$ of the dots of the ink-dot set IDS and the (B) ink-jet-paper dot-radius $R_{DIRECT-JETTING-ONTO-INK-JET-PAPER-THEORETICAL}$, is at least 1.1.

In some embodiments, a cardinality of the ink dot set is at least 5 or at least 10 or at least 20 or at least 50 or at least 100, each ink dot of the ink dot set being distinct on the substrate.

In some embodiments, the ink dots of the ink dot set are contained within a square geometric projection projecting on the printing substrate, each ink-dot of the ink dot set being fixedly adhered to the surface of the printing substrate, all the ink dots within the square geometric projection being counted as individual members of the ink dot set IDS.

In some embodiments, the method is performed such that: i. an ink dot set IDS of ink substrate-residing ink dots is formed; ii. a cardinality of the ink dot set is at least 5 or at least 10 or at least 20 or at least 50 or at least 100, each ink dot of the ink dot set being distinct on the substrate; iii. the ink dots of the ink dot set are contained within a square geometric projection projecting on the printing substrate, each ink-dot of the ink dot set being fixedly adhered to the surface of the printing substrate, all the ink dots within the square geometric projection being counted as individual members of the ink dot set IDS; iv. each of the ink dots contains at least one colorant dispersed in an organic polymeric resin, each of the dots has an average thickness of less than 2,000 nm, and a diameter of 5 to 300 micrometers; v. each ink dot of the ink dots has a generally convex shape in which a deviation from convexity, ($DC_{dot}$), is defined by: $DC_{dot}=1-AA/CSA$, AA being a calculated projected area of the dot, the area disposed generally parallel to the printing substrate; and CSA being a surface area of a convex shape that minimally bounds a contour of the projected area; and vi. a mean deviation from convexity ($DC_{dot\ mean}$) of the ink dot set is at most 0.05, at most 0.04, at most 0.03, at most 0.025, at most 0.022, at most 0.02, at most 0.018, at most 0.017, at most 0.016, at most 0.015, or at most 0.014.

In some embodiments, the aqueous treatment formulation is applied to at least portion(s) of the ITM that are in-motion at a velocity of at least 1 meters/second or at least 1.5 meters/second or at least 2 meters/second, to form the wet treatment layer thereon.

In some embodiments, the method is performed such that a water-soluble-polymer concentration, by weight, of water soluble polymer within the aqueous treatment formulation is at most 10% or at most 8% or at most 6% or at most 5%.

An aqueous treatment formulation for use with an intermediate transfer member of a printing system, the aqueous treatment formulation comprising: (a) a first surfactant composition including a first surfactant, the first surfactant including a quaternary ammonium salt having a solubility in water, at 25° C., of at least 5%; (b) at least 1%, by weight, of a water soluble polymer having a solubility in water of at least 5% at 25° C.; and (c) a carrier liquid containing water, the water making up at least 65%, by weight, of the treatment formulation; wherein a concentration of the quaternary ammonium salt within the aqueous treatment formulation is at least 3%, by weight; and wherein the treatment formulation has (i) a static surface tension at 25° C. within a range of 20 and 40 dynes/cm, (ii) a 60° C. evaporation load of at most 8:1, by weight and (iii) a 25° C. viscosity within a range of 10 cP to 100 cP.

In some embodiments, the solubility of the quaternary ammonium salt is at least 7%, at least 10%, at least 15%, or at least 20%, optionally at most 50%, at most 40%, or at most 35%, or further optionally, within a range of 5 to 40%, 5 to 30%, 5 to 25%, 7 to 35%, 10 to 35%, 12 to 35%, or 15 to 35%.

In some embodiments, a concentration of the quaternary ammonium salt within the aqueous treatment formulation is at least 4%, at least 5%, at least 6%, or at least 7%, optionally at most 30%, at most 25%, or at most 20%, or further optionally, within a range of 2 to 30%, 3 to 30%, 4 to 30%, 4 to 20%, 5 to 25%, 6 to 25%, 6 to 20%, or 7 to 20%.

In some embodiments, a concentration of the water soluble polymer within the aqueous treatment formulation is at least 1.5% or at least 2%, at least 2.5%, at least 3%, or at least 3.5%, by weight, optionally at most 10%, or at most 9% or at most 8% or at most 7% or at most 6% or further optionally, within a range of 1.5 to 20% or 2 to 10%, 2 to 8%, 2 to 7%, 2.5 to 10%, 2.5 to 8%, 2.5 to 7%, 2.5 to 6%, 3 to 8%, 3 to 7%, 3 to 6%, 3 to 6%, 3.5 to 10%, 3.5 to 8%, 3.5 to 7%, 3.5 to 6%, or 4 to 6%.

In some embodiments, the solubility in water of the water soluble polymer is at least 7%, is at least 10%, is at least 12%, or at least 15%.

In some embodiments, wherein the water soluble polymer is selected from the group consisting of polyvinyl alcohol, water-soluble cellulose, polyvinylpyrrolidone (PVP), polyethylene oxide, polyethyleneimine, and water-soluble acrylates.

In some embodiments, wherein the 60° C. evaporation load is at most 6:1 or at most 5:1, at most 4:1, at most 3.5:1, or at most 3:1, and optionally, at least 2:1, at least 2.2:1 or at least 2.5:1.

In some embodiments, further comprising a second surfactant selected to reduce a static surface tension of the aqueous treatment formulation, wherein the second surfactant is optionally a silicon polyether, the second surfactant optionally having a concentration within the formulation of at least 1%, at least 1.5%, at least 2%, at least 2.5%, or at least 3%, by weight, optionally at most 15%, at most 12%, at most 10%, at most 8%, or at most 7%, or further optionally, within a range of 1.5 to 13%, 1.5 to 10%, 2 to 13%, 2 to 10%, 2.5 to 13%, 2.5 to 10%, or 3 to 10%.

In some embodiments, the treatment formulation further comprises a water absorbing agent, disposed within the carrier liquid, at least within a range of 25° C. to 60° C.; whereby, when the aqueous treatment solution is evaporated to form a solid film, the water absorbing agent acts as a water absorber.

In some embodiments, further comprising a water absorbing agent, disposed within the carrier liquid, the water absorbing agent being a solid, in a pure state, at least within a range of 25° C. to 60° C.; whereby, when the aqueous treatment solution is evaporated to form a solid film, the water absorbing agent acts as a water absorber.

In some embodiments, the water absorbing agent has a concentration of 1 to 25%, 1 to 15%, 1 to 10%, 2.5 to 20%, 2.5 to 12%, 3 to 15%, 3 to 12%, 3 to 10%, or 3.5 to 12%.

In some embodiments, the concentration of the quaternary ammonium salt is within a range of 3 to 15%; a concentration of the water soluble polymer is within a range of 2.5 to 10% or 2.5 to 8% or 2.5-7% or 2.5-6%, a 60° C. evaporation load is within a range of 2.5:1 to 4:1, and the viscosity is at least 12 cP, and optionally, at least 14 cP or at least 16 cP.

In some embodiments, the static surface tension is within a range of 25 to 36 dynes/cm.

In some embodiments, the water absorbing agent has a concentration of 2.5 to 10%.

In some embodiments, the aqueous treatment formulation has a total surfactant concentration of at least 6%, at least 7%, at least 8%, at least 9%, or at least 10%, and optionally, within a range of 6 to 40%, 6 to 30%, 6 to 20%, 7 to 30%, 7 to 20%, 7 to 15%, 8 to 25%, 8 to 20%, 8 to 15%, or 8 to 13%.

In some embodiments, all components of the aqueous treatment formulation are completely dissolved.

In some embodiments, a total concentration of organic solvents within the aqueous treatment formulation is at most 3%, at most 2%, at most 1%, or at most 0.5%, by weight, or wherein the formulation is organic solvent-free.

In some embodiments, a total concentration of liquid hygroscopic agents within the aqueous treatment formulation is at most 1.5%, at most 1%, at most 0.5%, at most 0.3%, or at most 0.1%, by weight, or wherein the aqueous treatment formulation is liquid-hygroscopic-agent-free.

In some embodiments, the quaternary ammonium salt is an organic quaternary ammonium salt.

In some embodiments, a first carbon chain of the organic quaternary ammonium salt has a length of at least 6 carbon atoms, and optionally, within a range of 6 to 20, 6 to 18, 8 to 20, or 8 to 18 carbon atoms.

In some embodiments, a second carbon chain of the organic quaternary ammonium salt has a length of at most 3 carbon atoms, or at most 2 carbon atoms.

In some embodiments, a third carbon chain of the organic quaternary ammonium salt has a length of at most 3 carbon atoms, at most 2 carbon atoms, or 1 carbon atom.

In some embodiments, the organic quaternary ammonium salt is a cationic organic quaternary ammonium salt optionally having a sulfate or phosphate anion.

In some embodiments, the polyethyleneimine makes up at most 0.8%, 0.6%, 0.4%, or 0.3%, or 0.2%, or 0.1% by weight, of the formulation, or wherein polyethyleneimine makes up at most 30%, at most 20%, at most 15%, at most 10%, or at most 5% of the water soluble polymer.

In some embodiments, the viscosity is at least 12 cP, at least 14 cP or at least 16 cP, optionally, at most 90 cP, at most 80 cP, at most 70 cP, at most 60 cP, at most 55 cP, or at most 50 cP, and further optionally, within a range of 10 to 80 cP, 12 to 80 cP, 12 to 60 cP, 12 to 55 cP, or 14 to 60 cP.

In some embodiments, a water-soluble-polymer concentration, by weight, of water soluble polymer within the aqueous treatment formulation is at most 10% or at most 8% or at most 6% or at most 5%.

In some embodiments, the provided ITM comprising: (a) a support layer; and (b) a release layer having an ink reception surface for receiving an ink image, and a second surface opposing the ink reception surface, the second surface attached to the support layer, the release layer formed of an addition-cured silicone material, the release layer having a thickness of at most 500 micrometers (μm); the ITM satisfying at least one of the following structural properties: (1) a total surface energy of the ink reception surface is at least 2 mN/m, at least 3 mN/m, at least 4 mN/m, at least 5 mN/m, at least 6 mN/m, at least 8 mN/m, or at least 10 mN/m higher than a total surface energy of a modified ink reception surface produced by subjecting an ink reception surface of a corresponding release layer to a standard aging procedure; (2) a total surface energy of the ink reception surface is at least 4 mN/m, at least 6 mN/m, at least 8 mN/m, at least 10 mN/m, at least 12 mN/m, at least 14 mN/m, or at least 16 mN/m higher than a total surface energy of a hydrophobic ink reception surface of a corresponding release layer prepared by standard air curing of a silicone precursor of the cured silicone material; (3) a receding contact angle of a droplet of distilled water on the ink reception surface is at least 7°, at least 8°, at least 10°, at least 12°, at least 14°, at least 16°, at least 18°, or at least 20° lower than a receding contact angle of a droplet of distilled water on an ink reception surface of a corresponding release layer prepared by standard air curing of a silicone precursor of the cured silicone material; (4) a receding contact angle of a droplet of distilled water on the ink reception surface is at least 5°, at least 6°, at least 7°, or at least 8° lower than a receding contact angle of a droplet of distilled water on an aged surface, produced by subjecting the ink reception surface to a standard aging procedure; (5) a surface hydrophobicity of the ink reception surface is less than a bulk hydrophobicity of the cured silicone material within the release layer, the surface hydrophobicity being characterized by a receding contact angle of a droplet of distilled water on the ink reception surface, the bulk hydrophobicity being characterized by a receding contact angle of a droplet of distilled water disposed on an inner surface formed by exposing an area of the cured silicone material within the release layer to form an exposed area; wherein the receding contact angle measured on the ink reception surface is at least 7°, at least 8°, at least 10°, at least 12°, at least 14°, at least 16°, at least 18°, or at least 20° lower than the receding contact angle measured on the exposed area; and (6) a receding contact angle of a droplet of distilled water on the ink reception surface is at most 60°, at most 58°, at most 56°, at most 54°, at most 52°, at most 50°, at most 48°, at most 46°, at most 44°, at most 42°, at most 40°, at most 38°, or at most 36°.

In some embodiments, the addition-cured silicone material consisting essentially of an addition-cured silicone, or containing, by weight, at least 95% of the addition-cured silicone. In some embodiments, in functional groups make up at most 5%, at most 3%, at most 2%, or at most 1%, by weight, of the addition-cured silicone material, or wherein the addition-cured silicone material is substantially devoid of the functional groups.

In some embodiments, a polyether glycol functionalized polydimethyl siloxane is impregnated in the addition-cured silicone material.

In some embodiments, a polyether glycol functionalized siloxane is impregnated in the addition-cured silicone material, but without forming a part of a covalent structure of the addition-cured silicone material.

An intermediate transfer member (ITM) (e.g. this may be the ITM that is the 'provided ITM') for use with a printing system, the ITM comprising: (a) a support layer; and (b) a release layer having an ink reception surface for receiving an ink image, and a second surface opposing the ink reception surface, the second surface attached to the support layer, the release layer formed of an addition-cured silicone material, the release layer having a thickness of at most 500 micrometers (μm); the ink reception surface is adapted to satisfy at least one of the following structural properties: (i) a receding contact angle of a droplet of distilled water on the ink reception surface is at most 60°; (ii) for a droplet of distilled water deposited on the ink reception surface, a 10 second dynamic contact angle (DCA) is at most 108°; and wherein the release layer has at least one of the following structural properties: (1) the addition-cured silicone material consisting essentially of an addition-cured silicone, or containing, by weight, at least 95% of the addition-cured silicone; (2) functional groups make up at most 3%, by weight, of the addition-cured silicone material.

In some embodiments, the receding contact angle is at most 58°, at most 56°, at most 54°, at most 52°, at most 50°, at most 48°, at most 46°, at most 44°, at most 42°, at most 40°, at most 38°, or at most 37°.

In some embodiments, in the provided ITM (i.e. of the method of printing) functional groups make up at most 2%, at most 1%, at most 0.5%, at most 0.2%, or at most 0.1%, by weight, of the addition-cured silicone material or of the release layer surface, or the addition-cured silicone material (or the release layer surface) is substantially devoid of such functional groups. In some embodiments, a polyether glycol functionalized polydimethyl siloxane is impregnated in the addition-cured silicone material.

In some embodiments, the provided ITM (i.e. of the method of printing) has this feature: a polyether glycol functionalized siloxane is impregnated in the addition-cured silicone material, but without forming a part of a covalent structure of the addition-cured silicone material.

In some embodiments, the provided ITM (i.e. of the method of printing) has this feature: the thickness of the release layer is at most 500 μm, at most 100 μm, at most 50 μm, at most 25 μm, or at most 15 μm.

In some embodiments, the provided ITM (i.e. of the method of printing) has this feature: the thickness of the release layer is within a range of 1-100 μm, 5-100 μm, 8-100 μm, 10-100 μm, or 10-80 μm.

In some embodiments, the provided ITM (i.e. of the method of printing) has this feature: a thickness of the support layer is within a range of about 50-1000 micrometers (μ), 100-1000μ, 100-800μ or 100-500μ.

In some embodiments, the provided ITM (i.e. of the method of printing) has this feature: a total surface energy of the ink reception surface is at least 2 $J/m^2$, at least 3 $J/m^2$, at least 4 $J/m^2$, at least 5 $J/m^2$, at least 6 $J/m^2$, at least 8 $J/m^2$, or at least 10 $J/m^2$ higher than a total surface energy of a modified ink reception surface produced by subjecting an ink reception surface of a corresponding release layer to a standard aging procedure.

In some embodiments, the provided ITM (i.e. of the method of printing) has this feature: a total surface energy of the ink reception surface is at least 4 $J/m^2$, at least 6 $J/m^2$, at least 8 $J/m^2$, at least 10 $J/m^2$, at least 12 $J/m^2$, at least 14 $J/m^2$, or at least 16 $J/m^2$ more than a total surface energy of a hydrophobic ink reception surface of a corresponding release layer prepared by standard air curing of a silicone precursor of the cured silicone material.

In some embodiments, the provided ITM (i.e. of the method of printing) has this feature: wherein a receding contact angle of a droplet of distilled water on the ink reception surface is at least 7°, at least 8°, at least 10°, at least 12°, at least 15°, at least 18°, or at least 20° lower than a receding contact angle of a droplet of distilled water on an ink reception surface of a corresponding release layer prepared by standard air curing of a silicone precursor of the cured silicone material.

In some embodiments, a receding contact angle of a droplet of distilled water on the ink reception surface is at least 5°, at least 6°, at least 7°, or at least 8° lower than a receding contact angle of a droplet of distilled water on an aged surface, produced by subjecting the ink reception surface to a standard aging procedure.

In some embodiments, a surface hydrophobicity of the ink reception surface is less than a bulk hydrophobicity of the cured silicone material within the release layer, the surface hydrophobicity being characterized by a receding contact angle of a droplet of distilled water on the ink reception surface, the bulk hydrophobicity being characterized by a receding contact angle of a droplet of distilled water disposed on an inner surface formed by exposing an area of the cured silicone material within the release layer to form an exposed area.

In some embodiments, the provided ITM (i.e. of the method of printing) has this feature: the receding contact angle measured on the ink reception surface is at least 7°, at least 8°, at least 10°, at least 12°, at least 14°, at least 16°, at least 18°, or at least 20° lower than the receding contact angle measured on the exposed area.

In some embodiments, said receding contact angle of the droplet of distilled water on the ink reception surface is at least 25°, at least 28°, at least 30°, at least 32°, at least 34°, or at least 36°, and further optionally, within a range of 25° to 60°, 28° to 60°, 30° to 60°, 30° to 60°, 30° to 55°, 30° to 50°, 32° to 60°, 32° to 55°, 32° to 44°, 35° to 60°, 35° to 55°, 36° to 44°, or 38° to 50°.

In some embodiments, the release layer is adapted such that polar groups of the ink reception surface have an orientation away from or opposite from the second surface.

In some embodiments, the release layer is adapted such that when the ITM is in an operative mode, with the ink reception surface exposed to an ambient environment, the polar groups of the ink reception surface have an orientation towards or facing the ambient environment.

In some embodiments, the provided ITM (i.e. of the method of printing) has this feature: the ITM forming a component in a digital printing system.

In some embodiments, the provided ITM (i.e. of the method of printing) has this feature: the support layer including an elastomeric compliance layer attached to the second surface of the release layer, the elastomeric compliance layer adapted to follow closely a surface contour of a printing substrate onto which the ink image is impressed.

In some embodiments, the provided ITM (i.e. of the method of printing) has this feature: the support layer includes a reinforcement layer attached to the compliance layer.

In some embodiments, the provided ITM (i.e. of the method of printing) has this feature: the release layer contains, within a silicone polymer matrix thereof, a total amount of at most 3%, at most 2%, at most 1%, at most 0.5%, at most 0.2%, or substantially 0% of functional groups, by weight.

In some embodiments, the provided ITM (i.e. of the method of printing) has this feature: the release layer contains, within a silicone polymer matrix thereof, a total amount of at most 3%, at most 2%, at most 1%, at most 0.5%, at most 0.2%, or substantially 0%, by weight, of functional groups selected from the group of moieties consisting of C═O, S═O, O—H, and COO.

In some embodiments, the provided ITM (i.e. of the method of printing) has this feature: the release layer contains, within a silicone polymer matrix thereof, a total amount of at most 3%, at most 2%, at most 1%, at most 0.5%, at most 0.2%, or substantially 0%, by weight, of functional groups selected from the group consisting of silane, alkoxy, amido, and amido-alkoxy moieties.

In some embodiments, the provided ITM (i.e. of the method of printing) has this feature: the release layer contains, within a silicone polymer matrix thereof, a total amount of at most 3%, at most 2%, at most 1%, at most 0.5%, at most 0.2%, or substantially 0%, by weight, of functional groups selected from the group consisting of amine, ammonium, aldehyde, $SO_2$, $SO_3$, $SO_4$, $PO_3$, $PO_4$, and C—O—C.

In some embodiments, the provided ITM (i.e. of the method of printing) has this feature: the addition-cured silicone material has a structure built from a vinyl-functional silicone.

In some embodiments, the provided ITM (i.e. of the method of printing) has this feature: the addition-cured silicone material includes polar groups of the "MQ" type.

In some embodiments, the provided ITM (i.e. of the method of printing) has this feature: the total surface energy of the ink reception surface is evaluated using the Owens-Wendt Surface Energy Model.

In some embodiments, the provided ITM (i.e. of the method of printing) has this feature: the 10 second DCA is at most 108°, at most 106°, at most 103°, at most 100°, at most 96°, at most 92°, or at most 88°, optionally at least 60°, at least 65°, at least 70°, at least 75°, at least 78°, at least 80°, at least 82°, at least 84°, or at least 86°, and further optionally, within a range of 60 to 108°, 65 to 105°, 70 to 105°, 70 to 100°, 70 to 96°, 70 to 92°, 75 to 105°, 75 to 100°, 80 to 105°, 80 to 100°, 85 to 105°, or 85 to 100°.

In some embodiments, the provided ITM (i.e. of the method of printing) has this feature: the ink reception surface is adapted whereby, for the droplet of distilled water deposited on the ink reception surface, the difference between the 70 second dynamic contact angle (DCA) and the 10 second DCA, is at least 7°, at least 8°, at least 10°, or at least 12°, optionally at most 25°, at most 22°, at most 20°, at most 18°, or at most 17°, and further optionally, within a range of 6 to 25°, 6 to 22°, 6 to 20°, 6 to 18°, 6 to 17°, 7 to 25°, 7 to 20°, 7 to 17°, 8 to 25°, 8 to 22°, 18 to 20°, 8 to 18°, 8 to 17°, 10 to 25°, 10 to 22°, 10 to 20°, 10 to 18°, or 10 to 17°.

In some embodiments, the ink reception surface is adapted whereby, for the droplet of distilled water deposited on the ink reception surface, the 70 second DCA is at most 92°, at most 90°, at most 88°, at most 85°, at most 82°, at most 80°, at most 78°, at most 76°, at most 74°, or at most 72°, optionally at least 55°, at least 60°, at least 65°, or at least 68°, and further optionally, within a range of 55 to 92°, 55 to 90°, 55 to 85°, 55 to 80°, 65 to 92°, 65 to 90°, 65 to 85°, 65 to 80°, 68 to 85°, 68 to 80°, 70 to 92°, 70 to 90°, 70 to 85°, or 70 to 80°.

According to aspects of the present invention there is provided a printing system comprising: a. an intermediate transfer member (ITM) comprising a flexible endless belt mounted over a plurality of guide rollers; b. an image forming station configured to form ink images upon a surface of the ITM, first and second of the guide rollers being arranged upstream and downstream of the image forming station to define an upper run passing through the image forming station and a lower run; b. an impression station through which the lower run of the ITM passes, the impression station being disposed downstream of the image forming station and configured to transfer the ink images from the ITM surface to substrate; and d. a treatment station disposed downstream of the impression station and upstream of the image forming station for forming a uniform thin layer of a liquid treatment formulation onto the ITM surface at the lower run thereof, the treatment station comprising: i. a coater for coating the ITM with the liquid treatment formulation; and ii. a coating thickness-regulation assembly for removing excess liquid so as to leave only the desired uniform thin layer of treatment formulation, the coating thickness-regulation assembly comprising a rounded tip facing the ITM surface at the lower run.

In some embodiments, the rounded tip is a tip of a doctor blade.

In some embodiments, the doctor blade is oriented normal to the ITM surface.

In some embodiments, the rounded tip is urged towards the ITM surface and/or vice versa.

In some embodiments, the rounded tip is urged towards the ITM surface and/or vice versa by a backing roller having a soft outer surface.

In some embodiments, (i) the backing roller is disposed inside of closed loop of endless belt and positioned opposite to the blade and/or (ii) the backing roller and the rounded tip are disposed on opposite sides of the lower run of the ITM.

In some embodiments, the outer surface of backing roller has one or more of the following properties: (i) elastic; (ii) zero memory; (iii) maintains its soft outer surface throughout over a range of temperatures, (iv) constructed of polyurethane.

In some embodiments, the difference between a maximum and a minimum of the range of temperature is at least 10° C. or at least 20° C. or at least 50° C. and/or a mean of the temperature range is between 50° C. and 120° C.

In some embodiments, the backing roller has a compressible surface which is compressed when the rounded tip is urged towards the ITM surface and/or vice versa so that the rounded tip penetrates together with the ITM into the compressible surface of the backing roller at a predetermined penetration depth.

In some embodiments, a magnitude of penetration depth is at least 1 mm or at least 2 mm and/or at most 5 mm or at most 4 mm or at most 3 mm.

In some embodiments, the doctor blade extends substantially across the entire width of the ITM.

In some embodiments, the doctor blade has a length (measured in the crossprint direction) of at least 10 cm or at least 30 cm, and more typically, at least 50 cm, at least 70 cm, or at least 100 cm, and optionally at most 250 cm, at most 200 cm, or at most 150 cm.

In some embodiments, the doctor blade has a length (measured in the crossprint direction) within a range of 50 to 250 cm, 70 to 250 cm, 100 to 250 cm, 70 to 200 cm, 70 to 150 cm, or 100 to 200 cm.

In some embodiments, when the rounded tip is urged towards the ITM surface and/or vice versa so that the rounded tip penetrates into the ITM at a particular penetration depth.

In some embodiments, the rounded tip is urged towards the ITM and/or vice versa against liquid solution disposed in a gap between the rounded tip and the portion of the ITM surface facing the rounded tip at a force equilibrium so that the gap is maintained constant.

In some embodiments, a magnitude of the gap regulates a thickness of the desired uniform thin layer of treatment formulation.

In some embodiments, a ratio between the gap and the thickness of the desired uniform thin layer is at least 0.1 or at least 0.25 or at least 0.5 and/or at most 10 or at most 4 or at most 2.

In some embodiments, (i) a magnitude of the gap is at most 2 microns or at most 1 microns or at most 0.8 microns or at most 0.6 microns and/or (ii) a ratio between a magnitude of the gap and a penetration depth to which the rounded tip penetrates the ITM surface at most 0.01 or at most 0.005 or at most 0.001 or at most 0.0005.

In some embodiments, the penetration depth is set to a set-point value and a force-magnitude of the urging is regulated to maintain the penetration depth at the set-point value.

In some embodiments, a radius of curvature of the rounded doctor blade tip is at most 2 mm or at most 1.5 mm or at most 1.25 mm or at most 1 mm.

In some embodiments, the coater for coating the ITM is selected from the group consists of a (i) spray device, and (ii) a wetting tray positioned beneath the ITM lower run within which a quantity of the liquid treatment formulation is disposed.

In some embodiments, the system comprises a cleaning station positioned downstream of the impression station and upstream of the conditioning station, the cleaning station for removing residual material remaining on the ITM surface after the ink-images are transferred to substrate.

In some embodiments, the doctor blade is one of a plurality of doctor blades mounted on a circumference of a turret that is rotatable to facilitate replacement of the doctor blade urged towards the surface.

In some embodiments, the spacing of the blades on the turret circumference is such that, during rotation of the turret to replace the doctor blade, the blade being replaced does not cease to be functional until the replacement blade commences functioning.

In some embodiments, a blade cleaning device is provided adjacent the turret to remove any deposit adhering to a doctor blade that is not currently functional.

In some embodiments, a blade cleaning device is provided adjacent the turret to remove any deposit adhering to a doctor blade that is not currently functional.

In some embodiments, the cleaning device is a rotating brush.

According to aspects of the present invention there is provided a method of printing comprising a. providing an aqueous ink, an aqueous treatment formulation, and an intermediate transfer member (ITM) having a release surface; b. applying the aqueous treatment formulation to the release surface of the ITM to form a wet treatment layer thereon; c. subjecting the wet treatment layer to a drying process to form a dried treatment film from the wet treatment layer and on the ITM; d. depositing droplets of the aqueous ink onto the dried treatment film to form an ink image thereon; e. drying the ink image to leave an ink-image residue on the release surface of the ITM; and f. transferring the ink-image residue onto a printing substrate by pressured contact between the ITM and the substrate.

In some embodiments, the ink-image residue is transferred together with non-printed areas of the dried treatment film onto the printing substrate.

In some embodiments, during transfer and/or immediately thereafter, the dried treatment film mechanically connects and/or bonds the non-printed areas to the ink-image residue.

In some embodiments, immediately after ink-image residue, the dried treatment film is continuous over multiple distinct substrate-residing ink dots.

In some embodiments, at least the release surface of the ITM has a Shore A hardness of at most 50 or at most 45 or at most 40 or at most 35 or at most 30 or at most 25 or at most 20 or at most 15.

In some embodiments, the ITM has the form of an endless belt mounted over a plurality of rollers, the wet treatment layer being formed by applying pressure (e.g. in a normal direction) to a surface of the ITM at an inter-roller location between upstream and downstream rollers. In some embodiments, (i) the aqueous treatment formulation is applied to the ITM while the ITM is in motion, so that at least portion(s) thereof move at a velocity of at least 0.5 or at least 1 or at least 1.5 or at least 2 or at least 2.5 or at least 3 meter/sec (optionally at most 5.5 meter/sec, at most 5.0 meter/sec, at most 4.5 meter/sec, at most 4.0 meter/sec, or at most 3.8 meter/sec, and typically within a range of 0.5 to 5 meter/sec, 1 to 5 meter/sec, 1 to 4.5 meter/sec, 1 to 4 meter/sec, 1.5 to 5 meter/sec, 1.5 to 4.5 meter/sec, 1.5 to 4 meter/sec, 2 to 5 meter/sec, 2 to 4.5 meter/sec, 2.5 to 4.5 meter/sec, or 3 to 4.5 meter/sec; and (ii) the aqueous treatment formulation is applied to the in-motion portion(s) of the ITM to form a wet treatment layer thereon.

In some embodiments, the wet treatment layer is formed by applying force to the ITM from a highly-rounded surface having a radius of curvature of at most 5 mm or at most 3 mm or at most 2.5 mm or at most 2 mm or at most 1.75 mm or at most 1.5 mm or at most 1.25 mm or at most 1 mm.

In some embodiments, the highly-rounded surface is a surface of a doctor blade.

In some embodiments, the doctor blade is oriented in the cross-print direction and is urged against the ITM with a force density in the cross-print direction of at least 250 g/cm or at least 350 g/cm or at least 400 gm/cm and/or at most 1 kg/cm or at most 750 g/cm or at most 600 g/cm.

In some embodiments, the doctor blade is formed of an abrasion resistant material having a Brinell hardness in excess of 100.

In some embodiments, the doctor blade is smooth and/or has a regular cylindrical surface.

In some embodiments, a surface roughness RA of the doctor blade is at most a few microns or at most 1 micron or at most 0.5 microns.

In some embodiments, the doctor blade is one of a plurality of doctor blades mounted on a turret that is rotatable to allow rapid replacement of the doctor blade interacting with the surface of the ITM.

In some embodiments, the spacing of the blades on the turret is such that, during rotation of the turret to replace the doctor blade, the blade being replaced does not cease to interact with the ITM until the replacement blade commences interaction with the ITM.

In some embodiments, a cleaning device, such as a rotating brush, is provided adjacent the turret to a rounded edge of at least one of the doctor blades that does not currently interact with the ITM.

In some embodiments, in which, prior to application of the aqueous treatment solution to the release surface of the ITM, the release surface of the ITM is washed to remove any treatment film remaining on the release surface after completion of a preceding printing cycle.

In some embodiments, the washing of the release surface of the ITM is performed using the aqueous treatment solution to dissolve any dry treatment film on the release layer.

In some embodiments, a thickness of the wet treatment layer is at most 2μ or at most 1.5μ or at most 1μ or at most 0.9μ or at most 0.8μ or at most 0.7μ or at most 0.6μ or at most 0.5μ or at most 0.5μ or at most 0.4μ or at most 0.3μ or at most 0.2μ or at most 0.15μ.

In some embodiments, the wet treatment layer has a uniform thickness.

In some embodiments, over a rectangle having a width of at least w cm and length of at least l cm, an entirety of the rectangle is covered by the wet treatment film such that thickness of the wet treatment film does not deviate from an average thickness value within the rectangle by more than 50% or more than 40% or more than 30% or more than 20% or more than 10% or more than 5% or more than 2.5% or more than 1%, wherein (i) a value of w is at least 10 or at least 20 or at least 30 and/or at most 100 or at most 80 or at most 60 and (ii) a value of l is at least 50 or at least 100 or at least 250 or at least 500 or at least 1000.

In some embodiments, i. the forming of the thin wet treatment layer comprises creating a velocity gradient of the aqueous treatment solution in an intense velocity gradient (IVG) location that is (A) normally displaced from the release surface of the ITM (e.g. by at most 3 microns or at most 2 microns or at most 1 micron) and/or that is (B) between an applicator and the release surface of the applicator; and ii. at the IVG location, a magnitude of the velocity gradient equals or exceeds a VG value that is at least $10^6$ $sec^{-1}$ or at least $2\times10^6$ $sec^{-1}$ or at least $4\times10^6$ $sec^{-1}$ or at least $5\times10^6$ $sec^{-1}$ or at least $7.5\times10^6$ $sec^{-1}$ or at least $10^7$ $sec^{-1}$ or at least $2\times10^7$ $sec^{-1}$ or at least $4\times10^7$ $sec^{-1}$ or at least $5\times10^7$ $sec^{-1}$ or at least $7.5\times10^7$ $sec^{-1}$.

In some embodiments, the velocity gradient is localized along a print direction such that: i. at an upstream location that is upstream of the IVG location, a maximum velocity gradient is at most x % of a value of the velocity gradient at the IVG location; ii. at a downstream location that is downstream of the IVG location, a maximum velocity gradient is at most x % of a value of the velocity gradient at the IVG location; iii. a value of x is at most 50 or at most 30 or at most 20 or at most 10; and/or iv. the upstream and downstream location are each displaced from the IVG location along the print direction by at most by at most 2 cm or at most 1.5 cm or at most 1.25 cm or at most 1 cm or at most 9 mm or at most 8 mm or at most 7.5 mm or at most 7 mm or at most 6 mm or at most 5 mm.

In some embodiments, the drying of the treatment solution is performed sufficiently rapidly to prevent beading and leave a continuous hydrophilic and cohesive polymer treatment film having a thickness (e.g. a substantially uniform thickness) of at most 200 nm, or at most 150 nm, or at most 120 nm, or at most 100 nm, or at most 80 nm, or at most 70 nm, or at most 60 nm, or at most 50 nm, or at most 40 nm, or at most 30 nm.

Nevertheless, in different embodiments, even if the dried treatment film is extremely thin, it is thicker than monolayers or monolayer-type constructs. Thus, in different embodiments, a thickness of the dried treatment layer may be at least 20 nanometers or at least 30 nanometers or at least 40 nanometers or at least 50 nanometers. In some embodiments, providing this much 'bulk' (i.e. minimum thickness features—e.g. together with other feature(s) described below) facilitates formation of a dried treatment film that is cohesive and/or elastic—this may be useful in step S117 where it is desirable for the dried treatment film (i.e. at that stage bearing the dried ink image thereon) to maintain its structural integrity as it is transferred from the ITM to substrate.

In some embodiments, a thickness of the dried treatment film to which ink droplets are deposited is at most 200 nm, or at most 100 nm, or at most 50 nm or at most 30 nm.

In some embodiments, a thickness of the dried treatment film to which ink droplets are deposited is at least 15 nm or at least 20 nm or at least 30 nm or at least 50 nm or at least 75 nm.

In some embodiments, the dried treatment film is continuous over an entirety of a rectangle of the release surface of the ITM, wherein the rectangle has a width of at least w cm and a length of at least l cm, wherein (i) a value of w is at least 10 or at least 20 or at least 30 and/or at most 100 or at most 80 or at most 60 and (ii) a value of l is at least 50 or at least 100 or at least 250 or at least 500 or at least 1000.

In some embodiments, the dried treatment film is continuous, so that for at least 50% or at least 75% or at least 90% or at least 95% or at least 99% or 100% of an area of the rectangle, a thickness of the dried treatment film does not deviate from an average thickness value within the rectangle by more than 50% or more than 40% or more than 30% or more than 20% or more than 10% or more than 5% or more than 2.5% or more than 1%.

In some embodiments, during the drying process of the wet treatment layer, a dynamic viscosity thereof increases by at least a factor of 100, or at least a factor of 500, or at least a factor of 1000, or at least a factor of 2500, or at least a factor of 5000, or at least a factor of 10,000, or at least a factor of 25,000 within a period of time that is at most 1 second or at most 500 milliseconds or at most 250 milliseconds or at most 150 milliseconds, or at most 100 milliseconds or at most 75 milliseconds or at most 50 milliseconds or at most 25 milliseconds or at most 15 milliseconds or at most 10 milliseconds.

In some embodiments, a liquid content of the dried treatment film is at most 10% wt/wt or at most 7.5% wt/wt or at most 5% wt/wt or at most 2.5% wt/wt or at most 1.5% wt/wt or at most 1% wt/wt.

In some embodiments, the drying process removes at least 80% wt/wt or at least 90% wt/wt or at least 95% wt/wt of water in the wet treatment layer (e.g. within a period of time that is at most 1 second or at most 0.5 seconds or at most 100 milliseconds or at most 50 milliseconds or at most 25 milliseconds or at most 10 milliseconds) so as to form the dried treatment film.

In some embodiments, the drying process removes at least 80% wt/wt or at least 90% wt/wt or at least 95% wt/wt of 60 degrees C./one atm liquid of the wet treatment layer so as to form the dried treatment film.

In some embodiments, a surface (e.g. upper surface of) the dried treatment film to which the aqueous ink droplets are deposited is characterized by an average roughness $R_a$ (a commonly used one-dimensional average roughness parameter) of at most 30 nanometers or at most 25 nanometers or at most 20 nanometers or at most 18 nanometers or at most 16 nanometers or at most 15 nanometers or at most 14 nanometers or at most 12 nanometers or at most 10 nanometers or at most 9 nanometers or at most 8 nanometers or at most 7 nanometers or at most 5 nanometers, and/or at least 3 nanometers or at least 5 nanometers.

In some embodiments, the dried treatment film to which the aqueous ink droplets are deposited and a surface (e.g. upper surface of) of the dried treatment film are characterized by a dimensionless ratio between (i) an average roughness $R_a$ and (ii) a thickness of the dried treatment layer, wherein the dimensionless ratio is at least 0.02 or at least 0.03 or at least 0.04 or at least 0.05 or at least 0.06 or at least 0.07 or at least 0.08 or at least 0.09 or at least 0.10 or at least 0.11 or at least 0.12 or at least 0.13 or at least 0.14 or at least 0.15 or at least 0.16 or at least 0.17 or at least 0.18 or at least 0.19 or at least 0.2.

In some embodiments, the dried treatment film to which the aqueous ink droplets are deposited and a surface (e.g. upper surface of) of the dried treatment film are characterized by a dimensionless ratio between (i) an average roughness $R_a$ and (ii) a thickness of the dried treatment layer, wherein the dimensionless ratio is at most 0.5, at most 0.4, at most 0.3, at most 0.25, at most 0.2, at most 0.15, or at most 0.1, and optionally, at least 0.02 or at least 0.03 or at least 0.04 or at least 0.05 or at least 0.06 or at least 0.07 or at least 0.08.

In some embodiments, upon drying, the dried treatment film is continuous.

In some embodiments, the aqueous treatment formulation is provided in the form of a solution.

In some embodiments, the aqueous treatment formulation is provided in the form of a dispersion.

In some embodiments, wherein solids (e.g. nano-pigments and/or resins) of the aqueous ink migrate into the bulk of the dried treatment film to interact with (e.g. bond with) quaternary ammonium salts residing within the dried treatment film (e.g. so as to promote droplet spreading).

In some embodiments, the substrate is selected from the group consisting of an uncoated fibrous printing substrate, a commodity coated fibrous printing substrate, and a plastic printing substrate.

In some embodiments, the printing substrate is a paper, optionally selected from the group of papers consisting of bond paper, uncoated offset paper, coated offset paper, copy paper, groundwood paper, coated groundwood paper, freesheet paper, coated freesheet paper, and laser paper.

In some embodiments, the transfer is performed at a transfer-temperature of at most 120° C., or at most 120° C., or at most 100° C., or at most 90° C. or most 80° C.

In some embodiments, solids (e.g. nano-pigments and/or resins) of the aqueous ink migrate into the bulk of the dried treatment film to interact with (e.g. bond with) quaternary ammonium salts residing within the dried treatment film.

In some embodiments, the method is performed so as to form an ink dot set IDS of ink substrate-residing ink dots.

In some embodiments, the method is performed so that a droplet plurality DP of the aqueous ink droplets that are deposited onto the ITM-residing dried treatment film forms the ink dot set IDS of ink substrate-residing ink dots such that there is a correspondence between (i) each given droplet of the droplet plurality DP and (ii) a respective given substrate-residing ink-dot of the ink-dot set such that the given droplet results in and/or evolves into the given substrate-residing ink-dot.

In some embodiments, the method is performed so that during deposition, whenever a droplet of the droplet plurality collides with the dried treatment film on the ITM, kinetic energy of the colliding droplet deforms the droplet.

In some embodiments, the method is performed so that: (i) a maximum impact radius of each of the deformed droplets over the surface of the ITM has a maximum impact radius value $R_{MAX\_IMPACT}$ and (ii) subsequent to impact and/or during transfer and/or after transfer, physiochemical forces spread the deformed droplets or dots derived therefrom so that each ink dot of substrate-residing ink-dot set IDS has a dried-dot radius $R_{DRIED\_DOT\_ON\_SUBSTRATE}$; (iii) for each droplet of the droplet plurality and corresponding ink dot of the ink dot set IDS, a ratio between i. the substrate-residing dried-dot radius $R_{DRIED\_DOT\_ON\_SUBSTRATE}$; and ii. the deformed-droplet maximum impact radius value $R_{MAX\_IMPACT}$, is at least 1 or at least 1.01 or at least 1.02 or at least 1.03 or at least 1.04 or at least 1.05 or at least 1.1 or at least 1.15 or at least 1.2 or at least 1.25 or at least 1.3 or at least 1.35 or at least 1.4 or at least 1.45 or at least 1.5 and optionally, at most 2, at most 1.8, at most 1.7, at most 1.6, or at most 1.55.

In some embodiments, the method is performed such that: i. a droplet plurality DP of the droplets that are deposited onto the ITM-residing dried treatment film generates an ink-dot set IDS of substrate-residing ink dots (i.e. fixedly adhered to a top substrate surface), each droplet of the droplet plurality DP corresponding to a different respective substrate-residing ink-dot of the ink-dot set IDS; ii. each ink droplet of the droplet plurality DP is deposited, according to jetting parameters, onto the substrate; iii. the jetting parameters together with the physicochemical properties of ink droplets of the droplet plurality DP collectively define an ink-jet-paper dot-radius $R_{DIRECT-JETTING-ONTO-INK-JET-PAPER-THEORETICAL}$ which is the radius of the ink-dot obtained if the ink droplets were directly inn-jetted onto ink-jet-paper instead of the dried treatment film; and iv. a ratio between (A) the dried-dot radius $R_{DRIED\_DOT\_ON\_SUBSTRATE}$ of the dots of the ink-dot set IDS and the (B) ink-jet-paper dot-radius $R_{DIRECT-JETTING-ONTO-INK-JET-PAPER-THEORETICAL}$, is at least 1 or at least 1.01 or at least 1.02 or at least 1.03 or at least 1.04 or at least 1.05 or at least 1.1 or at least 1.15 or at least 1.2 or at least 1.25 or at least 1.3 or at least 1.35 or at least 1.4 or at least 1.45 or at least 1.5 and optionally, at most 2, at most 1.8, at most 1.7, at most 1.6, or at most 1.55.

In some embodiments, a cardinality of the ink dot set is at least 5 or at least 10 or at least 20 or at least 50 or at least 100, each ink dot of the ink dot set being distinct on the substrate.

In some embodiments, the method is performed so that: the ink dots of the ink dot set are contained within a square geometric projection projecting on the printing substrate, each ink-dot of the ink dot set being fixedly adhered to the surface of the printing substrate, all the ink dots within the square geometric projection being counted as individual members of the ink dot set IDS.

In some embodiments, the method is performed so that: each of the ink dots contains at least one colorant dispersed in an organic polymeric resin, each of the dots having an average thickness of less than 2,000 nm, and a diameter of 5 to 300 micrometers.

In some embodiments, the method is performed so that: each ink dot of the ink dots having a generally convex shape in which a deviation from convexity, ($DC_{dot}$), is defined by: $DC_{dot}=1-AA/CSA$, AA being a calculated projected area of the dot, the area disposed generally parallel to the printing substrate; and CSA being a surface area of a convex shape that minimally bounds a contour of the projected area; wherein a mean deviation from convexity ($DC_{dot\ mean}$) of the ink dot set is at most 0.05, at most 0.04, at most 0.03, at most 0.025, at most 0.022, at most 0.02, at most 0.018, at most 0.017, at most 0.016, at most 0.015, or at most 0.014.

In some embodiments, the method is performed so that: wherein each ink dot contains at least one colorant dispersed in an organic polymeric resin, each ink dot covering a continuous area of a top surface of the substrate; each ink dot being disposed entirely above the continuous area, such that (i) a projected perpendicular line, extending down towards the top substrate surface, first meets the ink dot, before meeting the top substrate surface, at every point in the continuous area; and/or (ii) each ink dot having a diameter of 15 to 300 micrometers; and/or (iii) each of the ink dots having an average thickness of at most 1,800 nm; each of the ink dots being characterized by a dimensionless aspect ratio ($R_{aspect}$) defined by: $R_{aspect}=D_{dot}/H_{dot}$ wherein $D_{dot}$ is the diameter; and $H_{dot}$ is the average thickness; and/or (iv) the aspect ratio being at least 50 or at least 60 or at least 75 or at least 95 or at least 110 or at least 120, or at least 135, or at least 150, or at least 170, or at least 180, or at least 190, or at least 200, or at least 220, or at least 240, or at least 260, or at least 280, or at least 300.

In some embodiments, the method is performed so that: the aspect ratio is at most 400, at most 350, or at most 325.

In some embodiments, the method is performed so that: each ink dot contains at least one colorant dispersed in an organic polymeric resin, each ink dot covering a continuous area of a top surface of the substrate; each ink dot being disposed entirely above the continuous area, such that (i) a projected perpendicular line, extending down towards the top substrate surface, first meets the ink dot, before meeting the top substrate surface, at every point in the continuous area; and/or (ii) each ink dot having a diameter of 15 to 300 micrometers; and/or (iii) each of the ink dots having an average thickness of at most 1,800 nm; each of the ink dots being characterized by a dimensionless aspect ratio ($R_{aspect}$) defined by: $R_{aspect}=D_{dot}/H_{dot}$ wherein $D_{dot}$ is the diameter; and $H_{dot}$ is the average thickness; and/or (iv) the aspect ratio being within a range of 140 to 400, 150 to 300, 160 to 300, 180 to 300, 200 to 300, 210 to 300, 220 to 300, 230 to 300, or 240 to 300.

In some embodiments, the method is performed so that: at least one (or at least a majority of or all of) of the ink dots of the ink dot set IDS contains less than 2% of charge directors.

In some embodiments, the method is performed so that: at least one (or at least a majority of or all of) of the ink dots of the ink dot set IDS being devoid of charge directors.

In some embodiments, the method is performed so that: at least one (or at least a majority of or all of) of the ink dots of the ink dot set IDS has a thickness being at most 1,500 nm or at most 1000 nm or at most 800 nm or at most 600 nm or at most 400 nm or at most 350 nm or at most 300 nm or at most 250 nm.

In some embodiments, the method is performed so that: at least one (or at least a majority of or all of) of the ink dots of the ink dot set IDS contains at least 1.2% of the colorant, by weight.

In some embodiments, the method is performed so that: at least one (or at least a majority of or all of) of the ink dots of the ink dot set IDS contains at least 5% of the resin, by weight.

In some embodiments, the method is performed so that: at least one (or at least a majority of or all of) of the ink dots of the ink dot set IDS is such that a total concentration of the colorant and the resin within the ink dots is at least 40%.

In some embodiments, the method is performed so that the weight ratio of the resin to the colorant within the ink dots is at least 1:1.

In some embodiments, the method is performed so that the ink dots of the ink dot set IDS is such is free of adhesive failure when subjected to a standard tape test.

In some embodiments, the method is performed so that a surface concentration of nitrogen at an upper film surface of each the ink dot exceeds a bulk concentration of nitrogen within the film, the bulk concentration measured at a depth of at least 30 nanometers below the upper film surface, and wherein a ratio of the surface concentration to the bulk concentration is at least 1.1 to 1.

In some embodiments, the method is performed so that an upper film surface of each ink dot exhibits an X-Ray Photoelectron Spectroscopy (XPS) peak at 402.0±0.4 eV.

In some embodiments, the method is performed so that the ink dots of the ink drop set has a first dynamic viscosity within a range of $10^6$ cP to 3.108 cP for a temperature within a range of 90° C. to 195° C.

In some embodiments, the method is performed so that the first dynamic viscosity is at most $7 \cdot 10^7$ cP.

In some embodiments, the method is performed so that: the first dynamic viscosity is within a range of $10^6$ cP to $10^8$ cP.

In some embodiments, the method is performed so that: the first dynamic viscosity is at least $4 \cdot 10^6$ cP.

In some embodiments, the method is performed so that at least one ink dot (or at least a majority of or all of the ink dots) is a plurality of continuous ink dots.

In some embodiments, the method is performed so that: for at least one ink dot (or at least a majority of or all of the ink dots), a dot thickness is at most 1,200 nm, or at most 1,000 nm, or at most 800 nm or at most 650 nm or at most 500 nm or at most 450 nm or at most 400 nm.

In some embodiments, the method is performed so that the ITM is any ITM disclosed herein and/or the aqueous treatment solution is any aqueous treatment solution disclosed herein.

In some embodiments, the aqueous ink comprises a pigment, binder, dispersant and at least one additive.

BRIEF DESCRIPTION OF THE DRAWINGS

Some embodiments of the printing system are described herein with reference to the accompanying drawings. The description, together with the figures, makes apparent to a person having ordinary skill in the art how the teachings of the disclosure may be practiced, by way of non-limiting examples. The figures are for the purpose of illustrative discussion and no attempt is made to show structural details of an embodiment in more detail than is necessary for a fundamental understanding of the disclosure. For the sake of clarity and simplicity, some objects depicted in the figures are not to scale.

In the Figures:

FIGS. 25A-25C are images of various ink patterns printed onto a release layer of an ITM of the present invention, in which the release layer was cured against a PET carrier surface; and FIGS. 26A-26C are images of various ink patterns printed onto a release layer of an ITM of the prior art, in which the release layer was air cured.

DETAILED DESCRIPTION OF EMBODIMENTS

Figure 1:
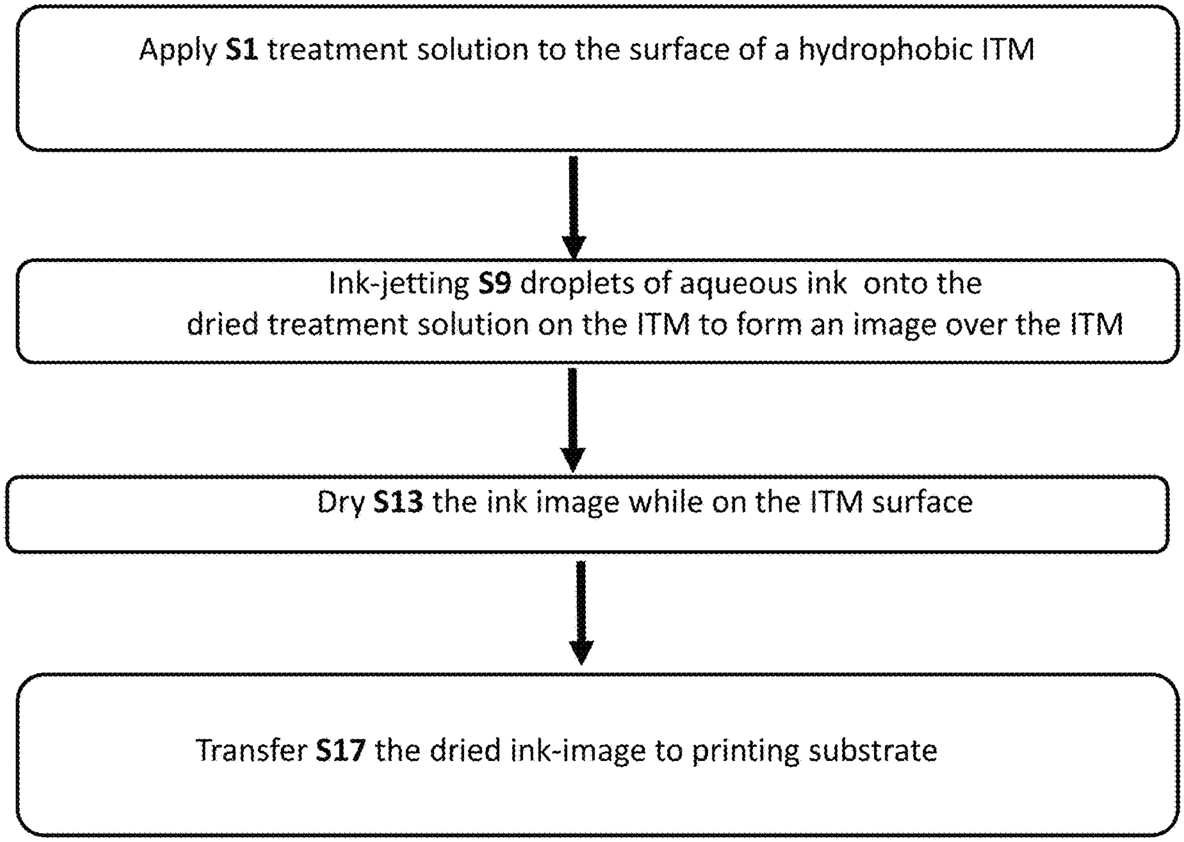
PRIOR ART FIG .1
FIG. 1 is a flow chart of a prior art printing process.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Definitions

Within this application the following terms should be understood to have the following meaning:

a) the term “receding contact angle” or “RCA”, refers to a receding contact angle as measured using a Dataphysics OCA15 Pro Contact Angle measuring device, or a comparable Video-Based Optical Contact Angle Measuring System, using the Drop Shape Method. The analogous “advancing contact angle”, or “ACA”, refers to an advancing contact angle measured substantially in the same fashion.

b) the term “standard aging procedure” refers to an accelerated aging protocol performed on each tested release layer at 160° C., for 2 hours, in a standard convection oven.

c) the term “standard air curing” refers to a conventional curing process for curing the release layer, in which, during the curing of the release layer, the release layer surface (or “ink reception surface”) is exposed to air.

d) the term “bulk hydrophobicity” is characterized by a receding contact angle of a droplet of distilled water disposed on an inner surface of the release layer, the inner surface formed by exposing an area of the cured silicone material within the release layer.

e) the term “image transfer member” or “intermediate transfer member” or “transfer member” refers to the component of a printing system upon which the ink is initially applied by the printing heads, for instance by inkjet heads, and from which the jetted image is subsequently transferred to another substrate or substrates, typically, the final printing substrates.

f) the term “blanket” refers to a flexible transfer member that can be mounted within a printing device to form a belt-like structure on two or more rollers, at least one of which is able to rotate and move the blanket (e.g. by moving the belt thereof) to travel around the rollers.

g) the term “on the release surface” with respect to an object such as an ink image or ink residue, means supported by and/or over that release surface. The term “on the release surface” does not necessarily imply direct contact between the ink image or ink residue and the release surface.

h) the term “has a static surface tension sufficiently high so as to increase the static surface tension of the aqueous treatment formulation”, and the like, with regard to a particular surfactant within that formulation, is evaluated by adding an additional quantities or aliquots of that particular surfactant to the formulation, and comparing the attained static surface tension of the formulation with the static surface tension of the formulation prior to the addition of those aliquots.

i) the term “liquid hygroscopic agent” refers to a hygroscopic agent that is liquid at least one temperature within the range of 25° C.-90° C., and has, in a pure state and at 90° C., a vapor pressure of at most 0.05 ata, and more typically, at most 0.02 ata, at most 0.01 ata, or at most 0.003 ata. The term “liquid hygroscopic agent” is specifically meant to refer to materials like glycerol.

j) the terms “hydrophobicity” and “hydrophilicity” and the like, may be used in a relative sense, and not necessarily in an absolute sense.

k) the term ‘(treatment) formulation’ refers to either a solution or a dispersion.

l) an x degrees Celsius evaporation load is now defined, where x is a positive number. When a solution is y % solids wt/wt and z % liquid wt/wt at x degrees Celsius, the ‘x-degrees Celsius evaporation load’ of the solution is that ratio z/y. The units of ‘evaporation load’ are “weight solvent per weight total solute.’ For the present disclosure, evaporation load is always defined at atmospheric pressure. For the present disclosure, a default value of ‘x’ is 60 degrees C.—the term ‘evaporation load’ without a prefix specifying a temperature refers to a 60 degrees Celsius evaporation load at atmospheric pressure.

m) when a portion of an ITM is in motion at a speed of v meters/second, this means that the portion of the blanket ITM moves in a direction parallel to its local surface/plane at a speed of at least v meters/second—e.g. relative to an applicator which is stationary.

n) the term ‘Static surface tension’ refers to the static surface tension at 25° C. and atmospheric pressure.

o) the term ‘thickness’ of a wet layer is defined as follows. When a volume of material vol covers a surface area of a surface having an area SA with a wet layer—the thickness of the wet layer is assumed to be vol/SA.

p) the term ‘thickness’ of a dry film is defined as follows. When a volume of material vol that is x % liquid, by weight, wets or covers a surface area SA of a surface, and all the liquid is evaporated away to convert the wet layer into a dry film, a thickness of the dry film is assumed to be:

$$vol/\rho_{wet\ layer}(100-x)/(\ )SA\cdot\rho_{dry\ layer})$$

where $\rho_{wet\ layer}$ is the specific gravity of the wet layer and $\rho_{dry\ layer}$ is the specific gravity of the dry layer.

q) the term ‘continuous wet layer’ refers to a continuous wet layer that covers a convex region without any bare sub-regions within a perimeter of the convex region.

r) the term ‘continuous thin dried film’ refers to a continuous dried film that covers a convex region without any discontinuities within a perimeter of the convex region.

s) the term ‘cohesive film/tensile strength’ refers to a construct which stays together when peeled away from a surface to which it is adhered—i.e. when peeled away from the surface, the ‘cohesive film’ retains it structural integrity and is peeled as a skin, rather than breaking into little pieces.

t) the term ‘a force applied normally’ refers to a force having at least one component in the normal direction—and optionally the ‘normally applied’ force may have an additional component in other directions (e.g. along a surface to which the force is applied).

u) unless stated otherwise, physical properties of a liquid (e.g. treatment formulation) such as viscosity and surface tension, refer to the properties at 25° C.

v) unless stated otherwise, a ‘concentration’ refers to a wt/wt—i.e. a weight of a component of formulation per total weight of that formulation.

Figure 2:
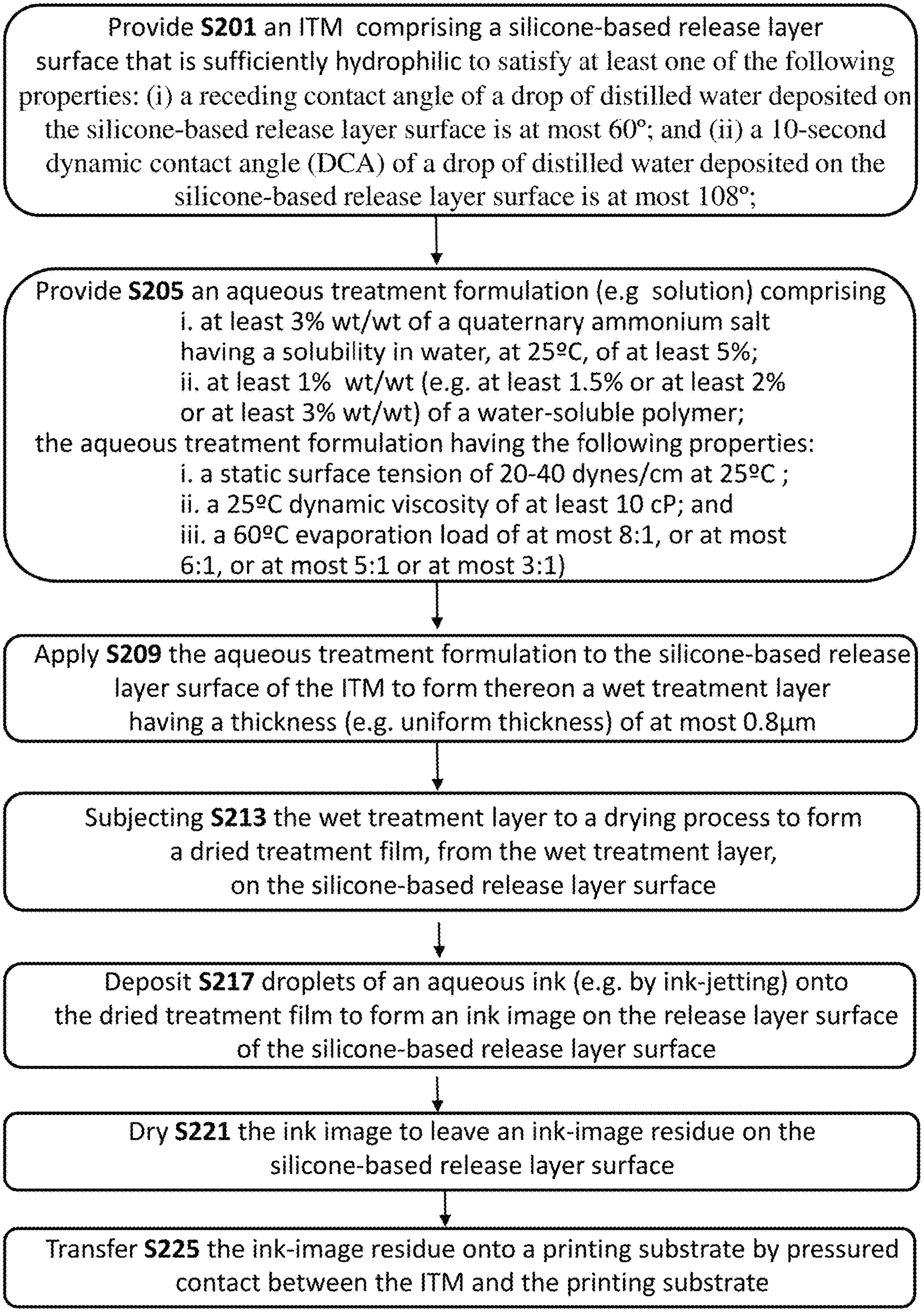
FIGS. 2 and 12 are flow charts of a printing process in accordance with some embodiments of the invention.

A Discussion of FIG. 2

FIG. 2 is a flow-chart of a method of indirect printing by an aqueous ink onto a silicone-based release later surface of an intermediate transfer member (ITM). In some embodiments, the method of FIG. 2 (or any combination of steps thereof) may be performed using apparatus (or component(s) thereof) disclosed in FIGS. 3A-3B, 4A-4B, 5-9, 10A-10B and 11A-11C. In particular and as will be discussed below, embodiments of the invention relate to methods and apparatus useful for producing a wet treatment layer of uniform sub-micron thickness over large areas of the ITM and/or at high print speeds.

In different embodiments, FIG. 2 may be performed to produce an ink image characterized by any combination of the following features: uniform and controlled dot gain, good and uniform print gloss, and good image quality due to high quality dots having consistent dot convexity and/or well-defined boundaries.

Steps S201-S205 relate to the ingredients or components or consumables used in the printing process of FIG. 2, while steps S209-S225 relate to the process itself.

Briefly, the steps of FIG. 2 are as follows: in steps S201 and S205, an ITM (i.e. comprising a silicone-based release layer surface) and an aqueous treatment formulation (e.g. a solution) are provided, each having specific properties that are discussed below. In step S209, the aqueous treatment formulation is applied to the release layer surface of the ITM to form thereon a wet treatment layer. In step S213, the wet treatment layer is subjected to a drying process to form therefrom a dried treatment film on the ITM. In step S217, droplets of aqueous ink are deposited onto this dried treatment film to form an ink image on the ITM surface. In step S221, this ink image is dried to leave an ink-image residue on the ITM surface, and in step S225 this ink-image residue is transferred to the printing substrate.

Embodiments of the invention relate to methods, apparatus and kits for achieving the potentially-competing goals of dot gain, image gloss and dot quality, preferably in a production environment in which high print speed is paramount. According to some embodiments, the inventors have found that it is useful to perform the method of FIG. 2 so that the dried treatment film formed in step S213 is very thin (e.g. at most 150 nanometers or at most 120 nanometers or at most 100 nanometers or at most 80 nanometers or at most 70 nanometers or at most 60 nanometers or at most 50 nanometers, and optionally at least 20 nanometers, or at least 30 nanometers) and/or continuous over large areas and/or characterized by a very smooth upper surface and/or rich in quaternary ammonium salts (e.g. to promote dot gain) and/or having properties (i.e. properties of the film per se, or of the film relative to the ITM surface) that promote good transfer from the ITM to substrate.

For example, thicker treatment films may negatively impact gloss or a uniformity thereof, since after transfer the dried ink residue may reside beneath the treatment film and on the substrate surface. Therefore, it may be preferred to produce a treatment film that is very thin.

For example, discontinuities in the treatment film and/or treatment film of varying thickness may yield images of a non-uniform gloss on the substrate, or may produce an ink-image residue (in step S113) that loses its mechanical integrity upon transfer to substrate. Therefore, it may be preferred to produce a treatment film that is continuous over large areas—preferably, sufficiently cohesive to retain structural integrity when to the printing substrate and/or having thermorheological properties so the treatment film is tacky at transfer temperatures between 75 degrees and 150 degrees Celsius.

For example, the presence of quaternary ammonium salts in the dried treatment film may promote spreading of the ink drop, but not necessarily uniform drop spreading. However, the combination of (i) a high concentration of quaternary ammonium salts in the dried treatment film and (ii) a treatment film of uniform thickness having an upper surface that is very smooth may promote uniform ink drop spreading.

Embodiments of the invention relate to techniques for achieving these results simultaneously, even if they entail potentially-competing goals. For example, the need for the treatment film to be very thin makes it more challenging to form a treatment film that is continuous over a large area and/or sufficiently cohesive for good transfer to substrate and/or having a very smooth and uniform upper surface.

A Discussion of Step S201

Although the ITM provided in step S201 has a silicone based release layer, the release surface thereof may be less hydrophobic or appreciably less hydrophobic than many conventional silicone based release layers. This structural property can be measured and characterized in various ways.

For example, as illustrated in step S201 of FIG. 2, the intermediate transfer member (ITM) comprises a silicone-based release layer surface that is sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°.

Any one of a number of techniques for reducing the hydrophobicity of the silicone based release layer may be employed.

In some embodiments, polar functional groups are introduced into and/or generated in the silicone based release layer. In one example, functional groups may be added to the pre-polymeric batch (e.g. monomers in solution)—these functional groups may, upon curing, become integral part of the silicone polymer network. Alternatively or additionally, the silicone-based release layer is pre-treated (e.g. by a corona discharge, or by an electron beam), thereby increasing a surface energy thereof.

Alternatively, the silicone based release layer may be manufactured to have a reduced hydrophobicity, even when substantially devoid of functional groups. In one example, the silicone polymer backbone of the release layer may be structured so that the polar groups thereof (e.g., O—Si—O) are oriented in a direction that is generally normal to the local plane of the ITM surface and facing 'upwards' towards the release layer surface.

To date, the inventors believe that the technique of the previous paragraph may provide superior image-transfer (step S225).

A Discussion of Step S205 of FIG. 2

One feature of the aqueous treatment formulation provided in step S205 is that a static surface tension of the aqueous treatment formulation is within a range of 20 and 40 dynes/cm. For example, the aqueous treatment formulation comprises one or more surfactants.

Thus, the aqueous treatment formulation of step S205 is less hydrophilic than many conventional treatment solutions, and significantly less hydrophilic than water.

In some embodiments, the combination of (i) a silicone based release layer having a reduced hydrophobicity (step S201) and (ii) an aqueous treatment formulation having a reduced hydrophilicity, reduces (but does not necessarily eliminate) surface-tension effects which promote beading of the conventional aqueous treatment solution.

In addition to the static surface tension within a range of 20 and 40 dynes/cm, the aqueous treatment formulation provided in step S205 has the following properties:

a. the aqueous treatment formulation comprises at least 3%, by weight, of a quaternary ammonium salt. This may be useful for ensuring that the dried treatment film (i.e. produced in step S217) is rich in quaternary ammonium salts, which may be useful for promoting good dot gain;

b. the aqueous treatment formulation comprises at least 1% (e.g. at least 1.5% or at least 2% or at least 3%), by weight, of at least one water soluble polymer having a solubility in water of at least 5% at 25° C. This may be useful for promoting formation of a polymer film or matrix in the dried treatment film (produced in step S217) that is sufficiently cohesive for good transfer in step 225.
c. a 25° C. dynamic viscosity that is at least 10 cP. As discussed below, it is believed that elevated viscosity is useful for counteracting any surface-tension driven tendency towards beading.
d. a 60° C. evaporation load of at most 8:1 (e.g. at most 7:1 or at most 6:1 or at most 5:1 or at most 4:1), by weight. Thus, the solution has a low specific heat capacity relative to conventional treatment formulations having higher evaporation load. Moreover, for a particular requisite residue thickness for the aqueous treatment solution, and for a given heat output delivered to the aqueous treatment solution, the viscosity of the aqueous treatment formulation will increase rapidly as a function of evaporation to achieve a high absolute viscosity that effectively counteracts the surface tension.

Physically, it is more difficult to induce flow of fluids having a higher viscosity than fluids having a lower viscosity—i.e. to induce flow of fluids having the higher viscosity, a greater driving force is required. The combination of at least moderate initial viscosity (i.e. a 25° C. dynamic viscosity that is at least 10 cP) and rapid viscosity increase after evaporation (e.g. due to the low evaporation load) on the ITM surface ensures that the aqueous treatment formulation reaches a relatively 'high' (e.g. at least 10,000 cP) viscosity in a relatively short period of time (e.g. at most 1 second or at most 0.5 seconds). Therefore, even if there is some thermodynamic tendency towards beading, actual beading, which could negatively impact the properties of the dried treatment film (i.e. formed in step S213) is inhibited or appreciably mitigated.

In some embodiments, the 25° C. dynamic viscosity of initial aqueous treatment formulation may be at least 12 cP or at least 14 cP—for example, within a range of 10 to 100 cP, 12 to 100 cP, 14 to 100 cP, 10 to 60 cP, or 12 to 40 cP.

To summarize: the combination (A) of the release layer that is sufficiently hydrophilic sufficiently hydrophilic to satisfy at least one of the following properties: (i) a receding contact angle of a drop of distilled water deposited on the silicone-based release layer surface is at most 60°; and (ii) a 10-second dynamic contact angle (DCA) of a drop of distilled water deposited on the silicone-based release layer surface is at most 108°; and (B) the static surface tension of the aqueous treatment formulation in the range of 20-40 dynes/cm is useful for minimizing a magnitude of a thermodynamic driving force that would cause beading. Furthermore, the aforementioned viscosity-related features are useful for countering this driving force.

This reduction of a magnitude of a thermodynamic force that drives beading, along with the counteracting of this tendency, ensures that any tendency to bead does not prevent the formulation, in step S209, of a wet layer of treatment formulation in step S209 having a uniform thickness.

In embodiments of the invention, the aqueous treatment formulation comprises a carrier liquid containing water, the water making up at least 65% (e.g. at least 70% or at least 75%), by weight of the aqueous treatment formulation;

A Discussion of Step S209

In step S209, the aqueous treatment formulation is applied to the silicone-based release layer surface of the ITM to form thereon a wet treatment layer having a thickness of at most 0.8 μm (e.g. at most at most 0.7 μm, or at most 0.6 μm, or at most 0.5 μm).

The "thickness of a wet layer" is defined as follows—when a volume of material vol covers a surface area of a surface having an area SA with a wet layer, the thickness of the wet layer is assumed to be vol/SA.

Preferably, step S209 is performed so that the wet treatment layer has a uniform thickness and is defect free, preferably over a large area such as over the entire area of the release layer. This may be particularly challenging when the wet treatment layer is of sub-micron thickness.

As noted above, it is useful for the aqueous treatment formulation to have at least 'moderate viscosity' (e.g. a 25° C. dynamic viscosity that is at least 10 cP) in order to counteract beading. Nevertheless, there may be challenges associated with obtaining a layer of uniform, sub-micron thickness of the aqueous treatment formulation at such viscosities.

In step S209, an aqueous treatment formulation is applied to the silicone-based release layer surface to form a wet treatment layer having a thickness of at most 0.8 μm.

Embodiments of the invention relate to apparatus and methods for applying this wet treatment layer so that the thickness is uniform, preferably over large areas of the ITM.

In some embodiments, after coating the ITM surface with an initial coating of aqueous treatment formulation, excess treatment formulation may be removed from the initial coating or obtain a wet treatment layer having a uniform thickness of at most 0.8 μm.

In some embodiments, this may be accomplished by urging a highly-rounded surface (e.g. of a doctor blade) towards the ITM or vice versa. For example, a radius of curvature of the highly-rounded surface may be at most 1.5 mm or at most 1.25 mm or at most 1 mm.

At high print speeds (e.g. where the surface velocity of the ITM is relatively large (e.g. at least 1 meter/second or at least 1.25 meters/second or at least 1.5 meters/second)), the removing of excess liquid to form the treatment layer having a sub-micron thickness may entail establishing a relatively large velocity gradient (i.e. shear) in the gap region (e.g. the velocity gradient is normal to the ITM surface) in the between the highly surface and the ITM—e.g. a velocity gradient of at least $10^6$ $sec^{-1}$ or at least $2\times10^6$ $sec^{-1}$.

As noted above, the 25° C. dynamic viscosity of treatment formulation may be at least 10 cP. Even if step S209 is performed at a higher temperature, the dynamic viscosity at these higher temperatures may be at least 3 cP or at least 5 cP or at least 10 cP. Thus, in some embodiments of the invention, a relatively large force is required (e.g. force to urge the highly-rounded surface towards the ITM or vice versa) to achieve the requisite uniform sub-0.8 μm (preferably) uniform thickness.

In some embodiments, the rounded surface is urged to the ITM or vice versa, at a force density in the cross-print direction of at least 250 g/cm or at least 350 g/cm or at least 400 gm/cm and/or at most 1 kg/cm or at most 750 g/cm or at most 600 g/cm.

In some embodiments, the wet treatment layer is formed by applying a pressure between an applicator and the ITM, a magnitude of the pressure being at least 0.1 bar or at least 0.25 bar or at least 0.35 bar or at least 0.5 bar, and optionally at most 2 bar or at most 1.5 bar, or at most 1 bar.

A Discussion of Step S213

In step S213, the wet treatment layer is subjected to a drying process form a dried treatment film therefrom.

For example, during the drying process of the wet treatment layer, a dynamic viscosity thereof increases by at least a factor of 1000 within a period of time of at most 0.5 seconds or at most 0.25 seconds.

In some embodiments, a thickness of the dried treatment film (e.g. cohesive polymer treatment film) is at most 150 nanometers, or at most 120 nanometers, or at most 100 nanometers, or at most 80 nanometers, or at most 60 nanometers.

In some embodiments, the dried treatment film has a smooth upper surface. For example, the drying process of the wet treatment layer is sufficiently rapid such that the viscosity of the aqueous treatment formulation increases rapidly enough to inhibit surface-tension-driven beading such that the dried treatment film has a smooth upper surface.

In some embodiments, the smooth upper surface of the dried treatment film is characterized by an average roughness $R_a$ of at most 12 nanometers or at most 10 nanometers or at most 9 nanometers or at most 8 nanometers or at most 7 nanometers or at most 5 nanometers. The skilled artisan is directed to FIG. 13 and to the accompanying discussion.

In some embodiments, the dried treatment film is continuous over an entirety of a rectangle of the release surface of the ITM, wherein the rectangle has a width of at least 10 cm and a length of at least 10 meters.

In some embodiments, the treatment film is transparent.

One of the purposes of the dried treatment film is to protect the ITM surface from direct contact with droplets of aqueous ink deposited on the treatment film. However, droplets of aqueous inks could 'erode through' a thickness of the dried treatment film, especially when the dried treatment film is thin (e.g. at most 150 or at most 120 or at most 100 or at most 80 nanometers). Thus, in some embodiments, a water-soluble-polymer concentration, by weight, of water soluble polymer within the provided aqueous treatment formulation (e.g. in step S205 of FIG. 2 or in step S95 of FIG. 12) is at most 10% or at most 8% or at most 6% or at most 5%.

A Discussion of Steps S217-S221

In step S217, droplets of aqueous ink are deposited (e.g. by ink-droplet deposition) onto the dried treatment film to form an ink image on the ITM surface. In step S221, this ink image is dried to leave an ink-image residue on the ITM surface.

For example, a presence of quaternary ammonium salts in the dried treatment film is useful for promoting dot spreading and/or dot gain (e.g. uniform dot spreading and/or dot gain) when the droplets are deposited or immediately thereafter—the skilled artisan is directed to the discussion below with reference to FIGS. 13A-13E. As noted above, the formation (in step S213) of a dried treatment film of uniform thickness and/or free of defects and/or having a very smooth upper surface may facilitate uniform flow of aqueous ink on the film upper surface.

A Discussion of Step S225

In step SS25, the ink-image residue is transferred to substrate. For example, the ink-image residue may be transferred together with non-printed areas of the dried treatment film onto the printing substrate.

In embodiments, the dried treatment film is sufficiently cohesive such that during transfer of the ink-image residue, the dried treatment film completely separates from the ITM and transfers to the printing substrate with the dried ink image, both in printed and non-printed areas.

In some embodiments, a temperature of the ITM during transfer is in the range between 80° C. and 120° C. In some embodiments, the ITM temperature is at most 100° C. or at most 90° C. In some embodiments, the ITM temperature is at least 100° C. or at least 110° C. or at least 120° C. In some embodiments, a presence of water-soluble polymers in the aqueous treatment solution provided in step S205 helps to ensure (i.e. by forming a polymer film or matrix) that the dried treatment film formed in step S213 is sufficiently cohesive during transfer.

In some embodiments, the substrate to which the ink image residue is glossy paper—e.g. glossy coated paper.

The transfer may be perfect (i.e. an entirety of the ink image residue and the dried treatment film is transferred to substrate). Alternatively, the transfer may be less than perfect—towards this end, a cleaning station may clean away material remaining on the ITM surface after the transfer step of S225.

Figure 3A:
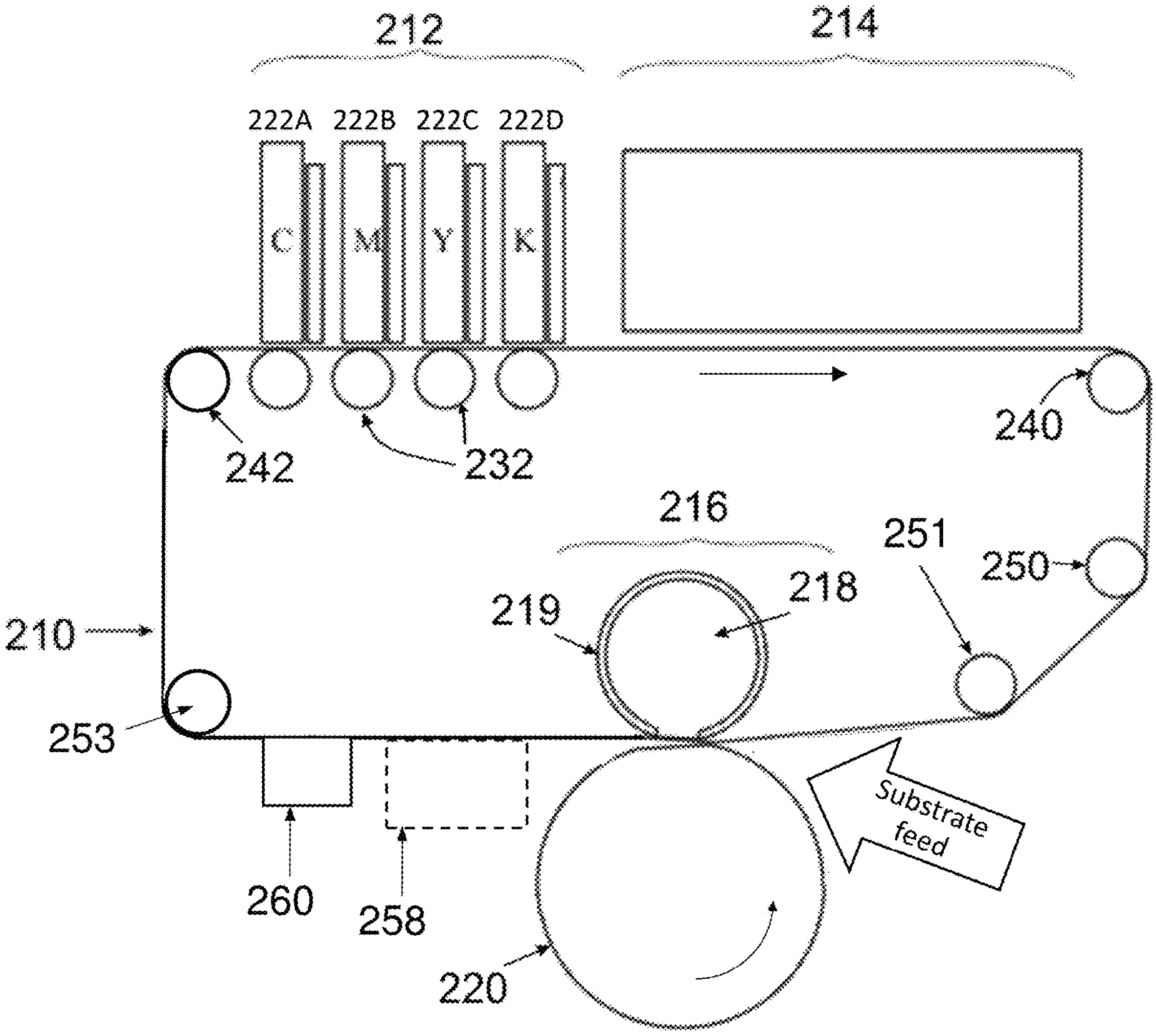
FIGS. 3A-3B, 3C-3D, 4A-4B, 5, 6-9, 10A-10B and 11A-11C illustrate printing systems or components thereof.
Figure 3B:
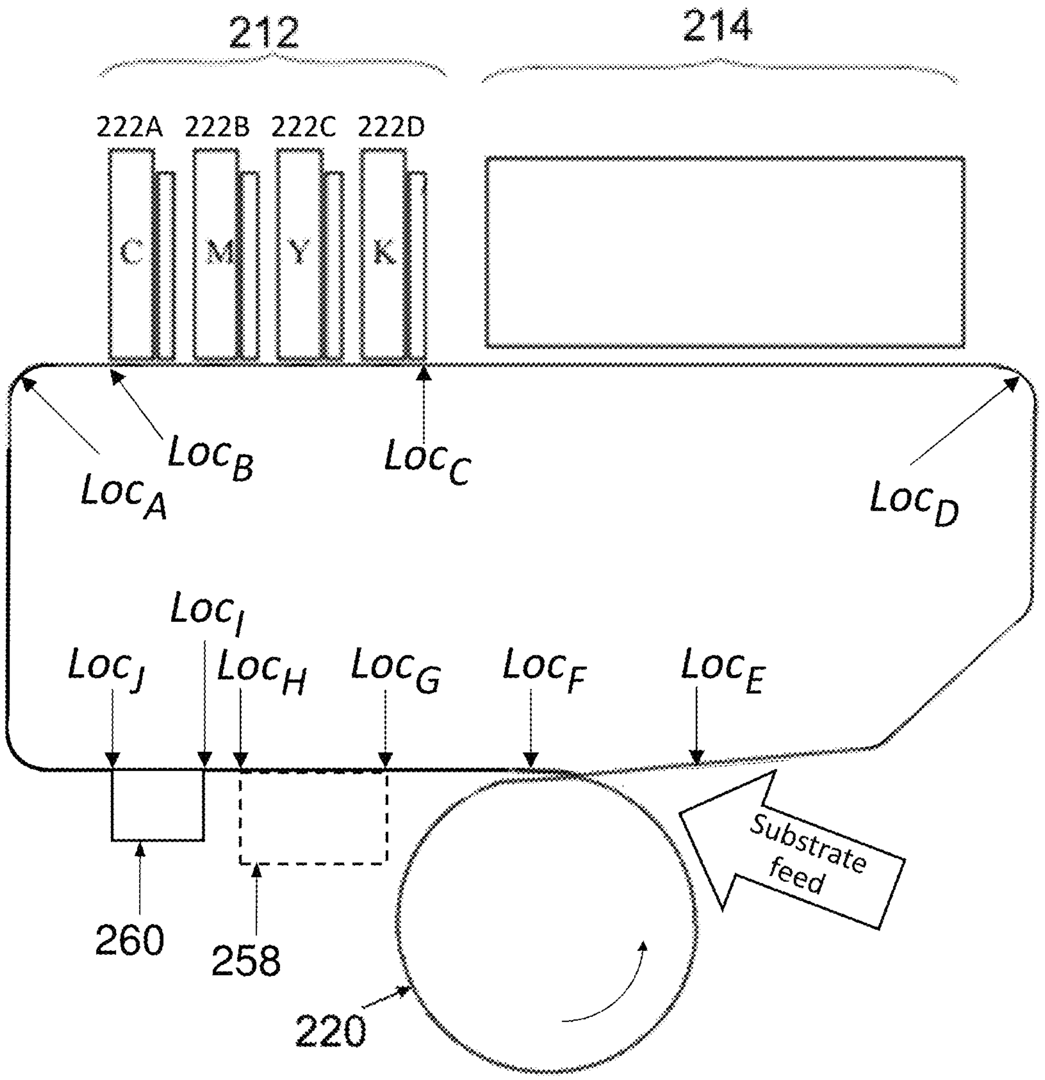

A Discussion of FIGS. 3A-3B

FIG. 3A is a schematic diagram of a system for indirect printing according to some embodiments of the present invention. The system of FIG. 3A comprises an intermediate transfer member (ITM) 210 comprising a flexible endless belt mounted over a plurality of guide rollers 232, 240, 250, 253, 242. In other examples (NOT SHOWN), the ITM 220 is a drum or a belt wrapped around a drum.

In the example of FIG. 3A, the ITM 210 (i.e. belt thereof) moves in the clockwise direction. The direction of belt movement defines upstream and downstream directions. Rollers 242, 240 are respectively positioned upstream and downstream of the image forming station 212—thus, roller 242 may be referred to as a "upstream roller" while roller 240 may be referred to as a "downstream roller".

Figure 12:
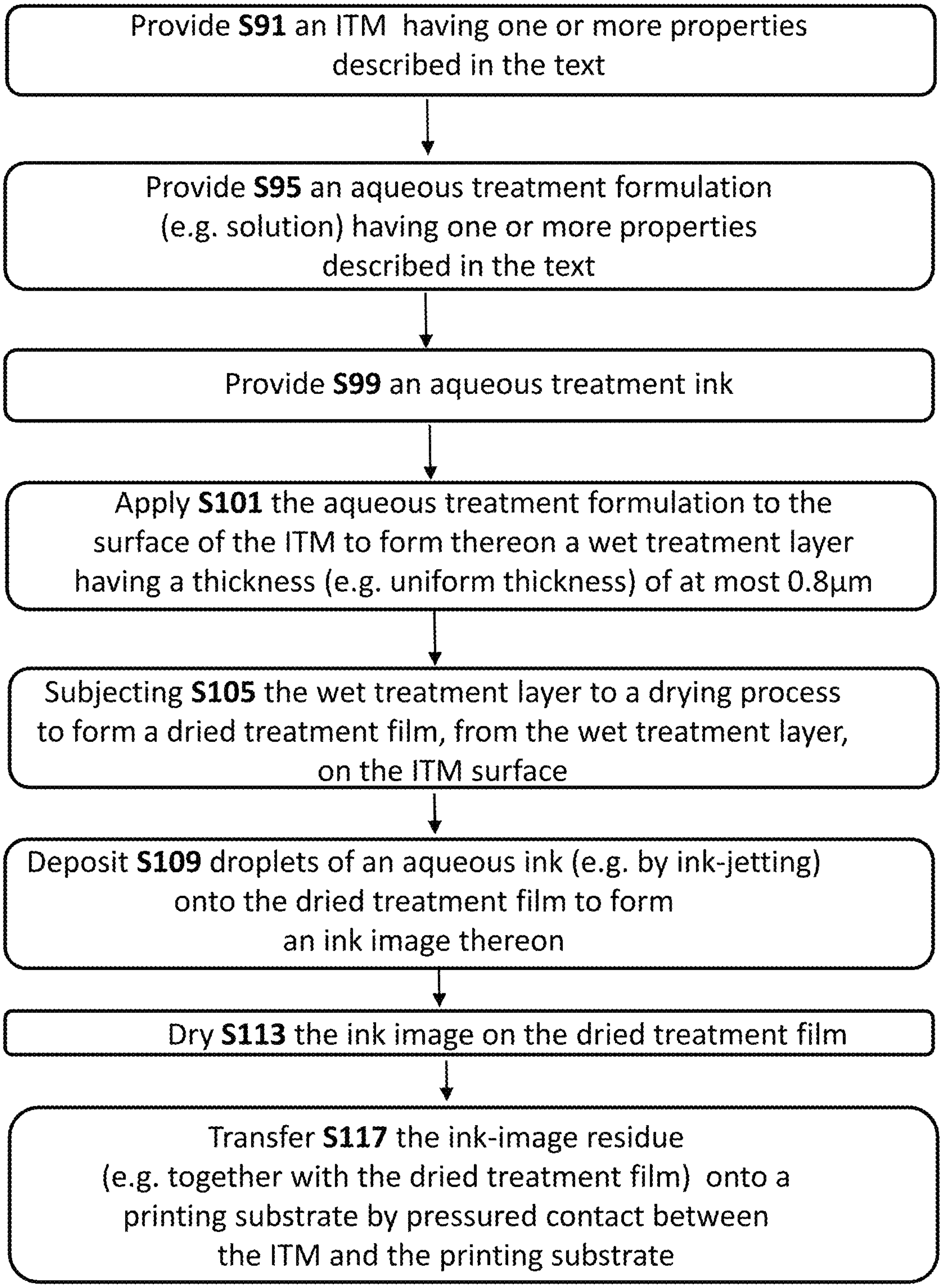

The system of FIG. 3A further comprises:

(a) an image forming station 212 (e.g. comprising print bars 222A-222D, where each print bar comprises ink jet head(s)) configured to form ink images (NOT SHOWN) upon a surface of the ITM 210 (e.g. by droplet deposition upon a dried treatment film—e.g. see step S217 of FIG. 2 or step S109 of FIG. 12);

(b) a drying station 214 for drying the ink images (e.g. see step S221 of FIG. 2 or step S113 of FIG. 12)

(c) an impression station 216 where the ink images are transferred from the surface of the ITM 210 to sheet or web substrate (e.g. see step S225 of FIG. 2 or step S117 of FIG. 12).

In the particular non-limiting example of FIG. 3A, impression station 216 comprises an impression cylinder 220 and a blanket cylinder 218 that carries a compressible blanket 219. In some embodiments, a heater 231 may be provided shortly prior to the nip between the two cylinders 218 and 220 of the image transfer station to assist in rendering the ink film tacky, so as to facilitate transfer to the substrate (e.g. sheet substrate or web substrate). The substrate feed is illustrated schematically.

(d) a cleaning station 258 (i.e. in FIG. 3A illustrated schematically as a block) where residual material (e.g. treatment film and/or ink images or portions thereof) is cleaned (cleaning step is NOT SHOWN in FIG. 2) from the surface of the ITM 210.

(e) a treatment station 260 (i.e. in FIG. 3A illustrated schematically as a block) where forming a layer (e.g. of uniform thickness) of liquid treatment formulation (e.g. aqueous treatment formulation) on the ITM surface (e.g. see step S209 of FIG. 2 or step S101 of FIG. 12).

The skilled artisan will appreciate that not every component illustrated in FIG. 3A is required.

FIG. 3B illustrates a plurality of 'locations' $Loc_A$-$Loc_J$. that are fixed in space—$Loc_A$ is at roller 242, $Loc_B$ is at the 'beginning' of image station 212, $Loc_C$ is at the 'end' of image station 212, and so on. Thus, ink images (e.g. in step S217 of FIG. 2) are formed in the region between locations $Loc_A$ and $Loc_B$, at image forming station 212 on the upper run of ITM 210. The ink images are dried (e.g. see step S221 of FIG. 2 or step S105 of FIG. 12) in the region between locations $Loc_C$ and $Loc_E$ to form ink-image residues—this may occur as the ink images move (e.g. due to clock-wise rotation of the ITM) through drying station 214. The ink image residues are transferred from the ITM surface to substrate at the impression station 216 between locations $Loc_E$ and $Loc_F$ (e.g. see step S225 of FIG. 2 or step S117 of FIG. 12). Material remaining on the surface of the ITM 210 after transfer of the ink image residues may be cleaned from the surface of the ITM 210 at cleaning station 258 between $Loc_G$ and $Loc_H$. A wet treatment layer may be formed in step S209 of FIG. 2 (or step S101 of FIG. 12) on the surface of the ITM 210 at treatment station 260 between locations $Loc_I$ and $Loc_J$ (e.g. see step S209 of FIG. 2 or step S101 of FIG. 12). This wet treatment layer subjected to a drying process (i.e. to convert the wet treatment layer into a dried treatment film) (e.g. see step S213 of FIG. 2 or step S105 of FIG. 12)—this may occur between locations $Loc_J$ and $Loc_A$ on the right hand side. After the dried treatment film is transported (e.g. by counterclockwise rotation of ITM 210) to image forming station 212, ink images may subsequently be formed by droplet deposition to the dried treatment film (e.g. see step S217 of FIG. 2 or step S109 of FIG. 2).

Figure 3C:
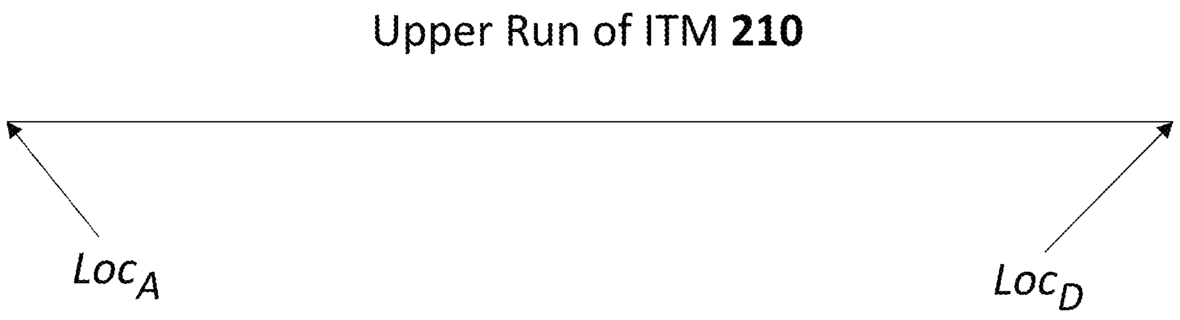

As illustrated in FIGS. 3A-3B, the portion of the ITM between locations $Loc_A$ and $Loc_D$ are an upper run of the ITM 210 (i.e of a belt thereof). This upper run (illustrated in FIG. 3C) is between (i) an upstream guide roller 242 that is upstream to image forming station 212 and (ii) a downstream guide roller 240 that is downstream to image forming station. The upper run passes though the image forming station 212.

Figure 3D:
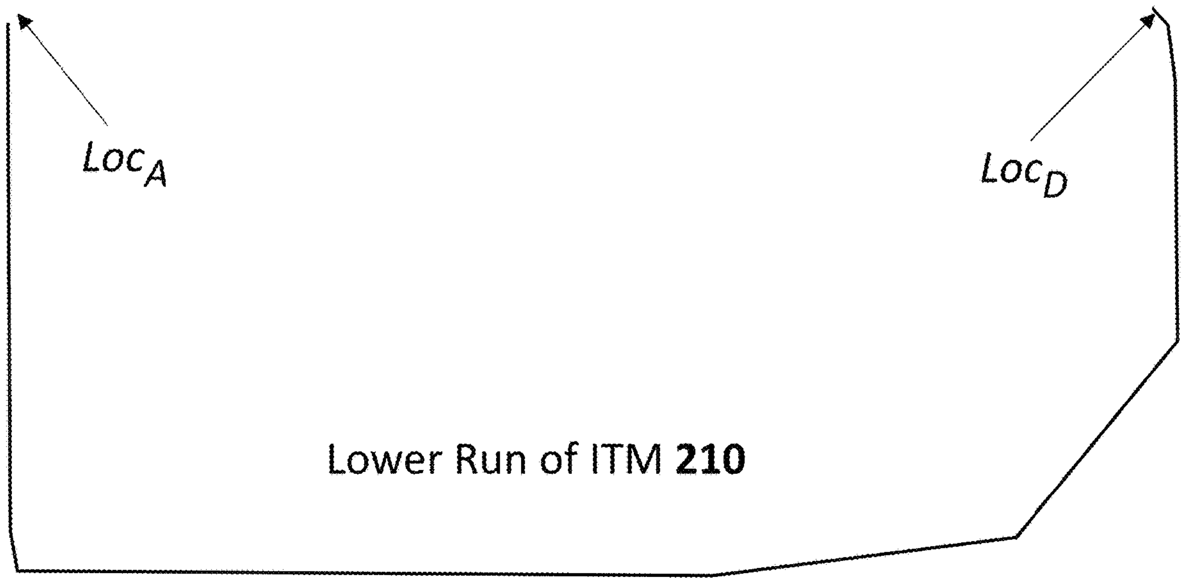

A lower run of the ITM is between locations $Loc_D$ and $Loc_A$ of ITM 210 and is illustrated in FIG. 3D. This lower run passes through impression station 216, cleaning station 258 and treatment station 260.

Figure 4A:
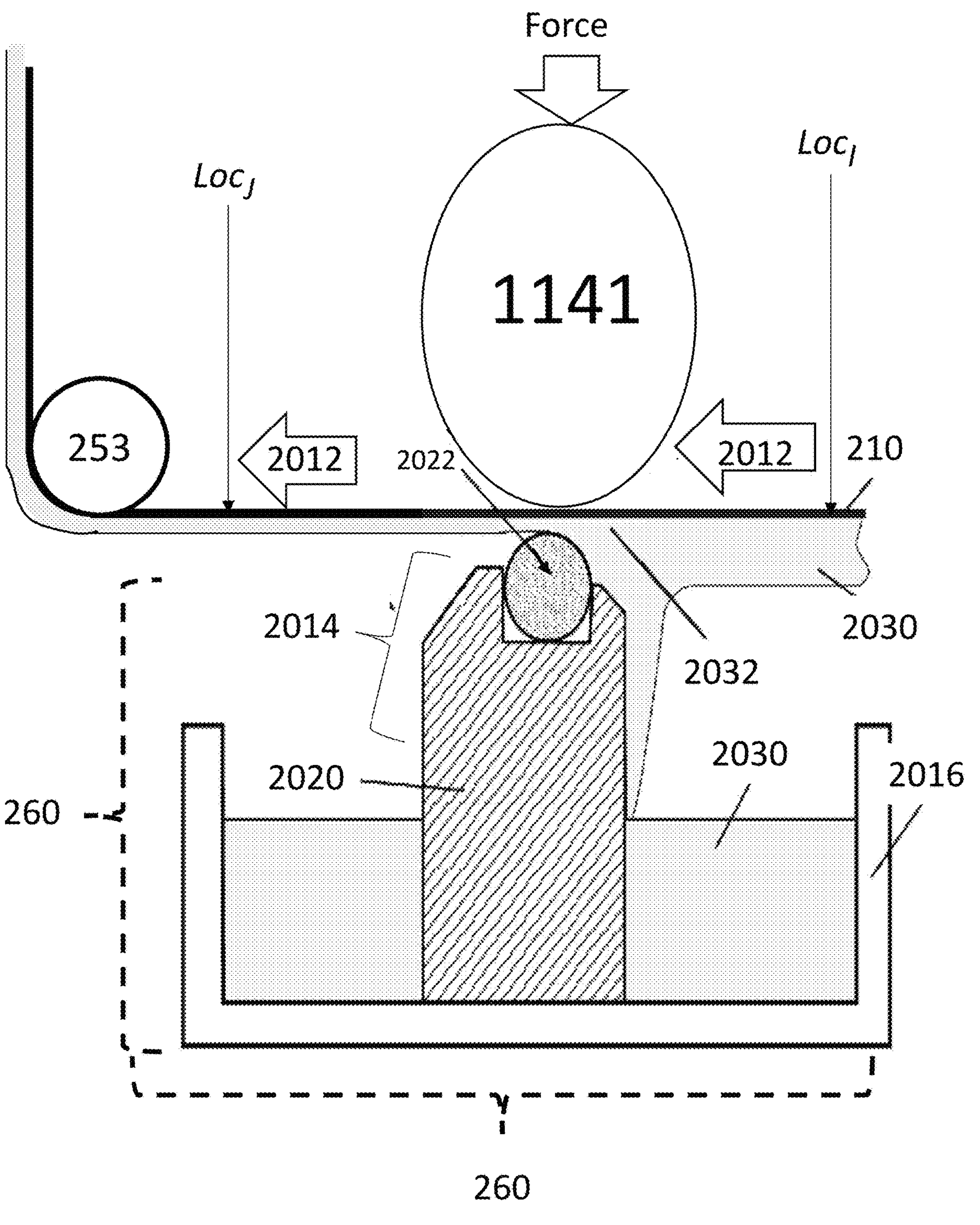

One example of a treatment station is shown in FIG. 4A.

In the particular non-limiting embodiment of FIG. 4A, the ITM 210 is moved from right to left as viewed, as represented by an arrow 2012, over a doctor blade that is generally designated 2014 and is suitably mounted within a tank 2016. In FIG. 4A, the doctor blade 2014 is of the doctor rod type and is formed of a rigid bar or holder 2020 that extends across the entire width of the ITM 210. In its upper surface facing the underside of the ITM 210, the bar 2020 is formed with a channel or groove 24 within which there is supported a rod 2022 made of fused quartz and having a smooth and regular cylindrical surface with a roughness of no more than a few microns, preferably less than 10 microns and in particular less than 0.5 microns.

Figure 5:
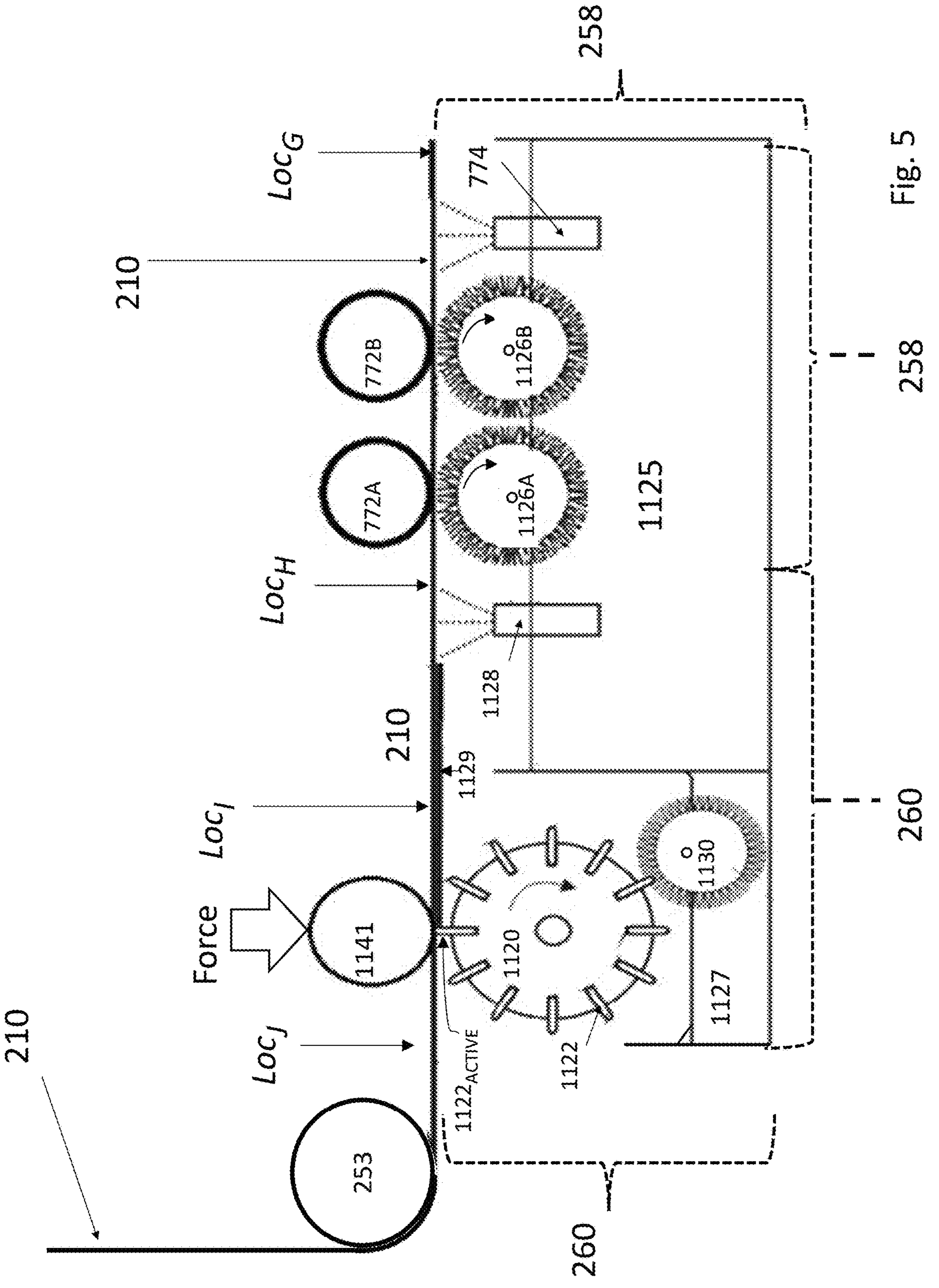
Figure 6:
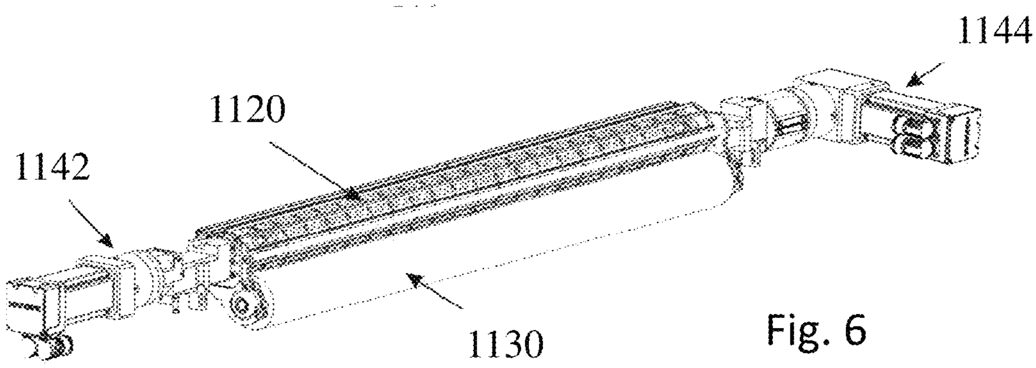
Figure 7:
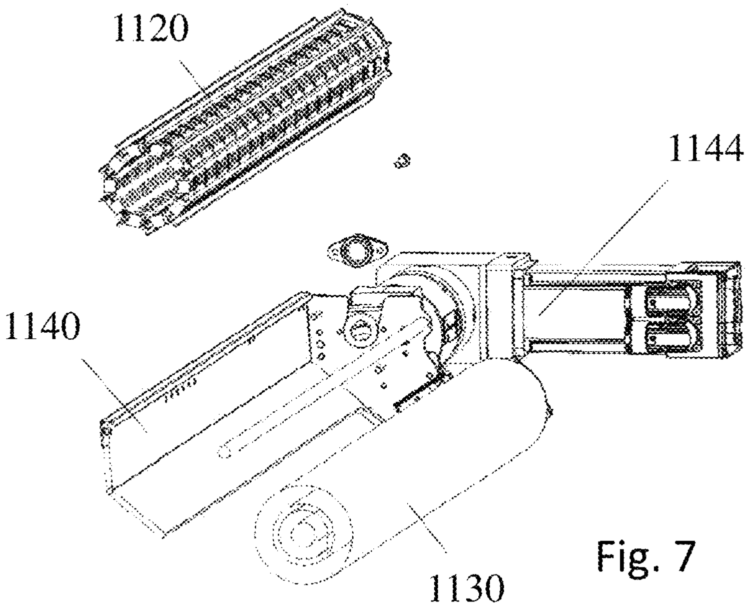

Prior to passing over the doctor blade 2014, the underside of the ITM 210 (or lower run) is coated with an excess of treatment formulation (e.g. solution) 2030 (e.g. provided in step S205 of FIG. 2 or step S95 of FIG. 12). The manner in which the excess of treatment formulation (e.g. solution) is applied to the ITM 210, specifically to its underside in the present illustration, is described below by reference to FIG. 5, but is not of fundamental importance to the present invention. The ITM 210 may for example simply be immersed in a tank containing the liquid, passed over a fountain of the treatment formulation (e.g. solution), or, as shown in FIG. 5, sprayed with an upwardly directed jet 1128.

In an embodiment of the invention, a liquid-permeable cloth is placed above upwardly directed spray heads, so that the liquid seeps through the cloth and forms a layer on the side of the cloth facing the surface to be coated. In this case, the spray heads will act to urge the cloth towards the surface, but it will be prevented by the liquid seeping through it from contacting the surface, the liquid acting in the same manner as in a hydrodynamic bearing.

As shown in the drawing, as the ITM 210 approaches the doctor blade 2014 it has a coating 2030 of liquid that is significantly greater than the desired thickness of the thin film that is to be applied to the ITM 210.

The function of the doctor blade 2014 is to remove excess liquid 2030 from the ITM 210 and ensure that the remaining liquid is spread evenly and uniformly over the entire surface of the ITM 210. To achieve this, the ITM 210 is urged towards the doctor blade 2014, for example by means of air pressure (NOT SHOWN). Alternatively, the force urging the ITM 210 towards the doctor blade 2014 may be a backing roller 1141, such as a compressible (e.g. sponge) roller in some embodiments, pressing down on the upper or opposite side of the web, either by virtue of its own weight or by the action of springs. As a further alternative, the doctor blade 2014 may itself be urged towards the ITM 210 while the latter is maintained under tension.

The tip of the doctor blade 2014, being constituted by a cylindrical smooth rod 2022, has a uniform radius over the width of the ITM 210 and its smoothness ensures laminar flow of the liquid in the gap between it and the underside of the ITM 210. The nature of the flow may be similar to that of the liquid lubricant in a hydrodynamic bearing and reduces the film of liquid 2030 that remains adhering to the underside of the ITM 210 (i.e. the surface of a low run' of the ITM) to a thickness dependent upon the force urging the ITM against the doctor blade 2014 and the radius of curvature of the rod 2022. As both the radius and the force are constant over the width of the web, the resulting film is uniform and its thickness can be set by appropriate selection of the applied force and the rod diameter. The excess of liquid removed by the doctor blade 2014 creates a small pool 2032 immediately upstream of the rod 2022 before falling into the tank 2016.

In an alternative embodiment of the invention, the surface of the ITM 210 to be coated with liquid may face upwards instead of downwards. In this case, instead of applying an excess of liquid to the ITM 210 (i.e. the surface of a low run' of the ITM), the liquid may be metered onto the surface to develop and maintain a similar small pool of liquid upstream of the line of contact between the wiper blade and the surface on the upper side of the web. Air knives may be provided in this case to prevent treatment formulation (e.g. solution) from the pool from spilling over the lateral edges of the ITM 210.

In embodiments of the invention, pool 2032 provides a constant supply of treatment formulation (e.g. solution) across the entire width of the ITM 210 so that all areas of the ITM 210 are coated even if the liquid has been, for any reason, repelled (e.g due to 'beading') from parts of the surface of the web prior to reaching the doctor blade 2014.

The tank 2016 into which the surplus treatment formulation (e.g. solution) falls may be the main reservoir tank from which liquid is drawn to coat the underside of the web with an excess of treatment formulation (e.g. solution) or it may be a separate tank that is drained into the main reservoir tank and/or emptied to suitable discard systems.

The rod 2022 is made of a hard material such as fused quartz in order to resist abrasion. There may be small particles of grit or dust in the liquid which could damage the rounded edge over which the liquid flows. It would be possible to use materials other than fused quartz but the material should preferably have a Brinell hardness in excess of 100 (e.g. in excess of 200, or in excess of 500, or even in excess of 1000). In embodiments of the invention, the material should be capable of being formed into a smooth rod of uniform diameter and a surface roughness of less than 10 micron, in particular of less than 0.5 micron.

The rod 2022 which may have a radius of 6 mm but possibly of only 0.5 mm is relatively fragile and may require a bar 2020 for support. To hold the rod 2022 accurately in position, the bar is formed with a groove 24 within which the rod 2022 rests. The rod may be retained in the groove 24 in any suitable manner. For example, it is possible to use an adhesive and to use the bar 2020 to press the rod 2022 against a flat surface, such as a glass sheet, until the adhesive sets. As a further alternative, the groove may be accurately machined to be slightly narrower than the rod diameter and heat shrinking may be used to hold the rod in position within the groove.

Sometimes when using such a doctor blade to apply certain formulations (e.g. solution), a deposit 34 of the solute builds up on the downstream side of the doctor blade 2014. While not wishing to be bound by theory, it is believed that this may be caused by the fact that a stationary film of the formulation (e.g. solution) adheres to the downstream side of the doctor blade and as it dries leaves behind the solute. Regardless of the reason for the formation of such a deposit and its composition, if allowed to grow excessively, it will eventually interfere with the layer of treatment formulation (e.g. solution) applied to the ITM 210.

Figure 4B:
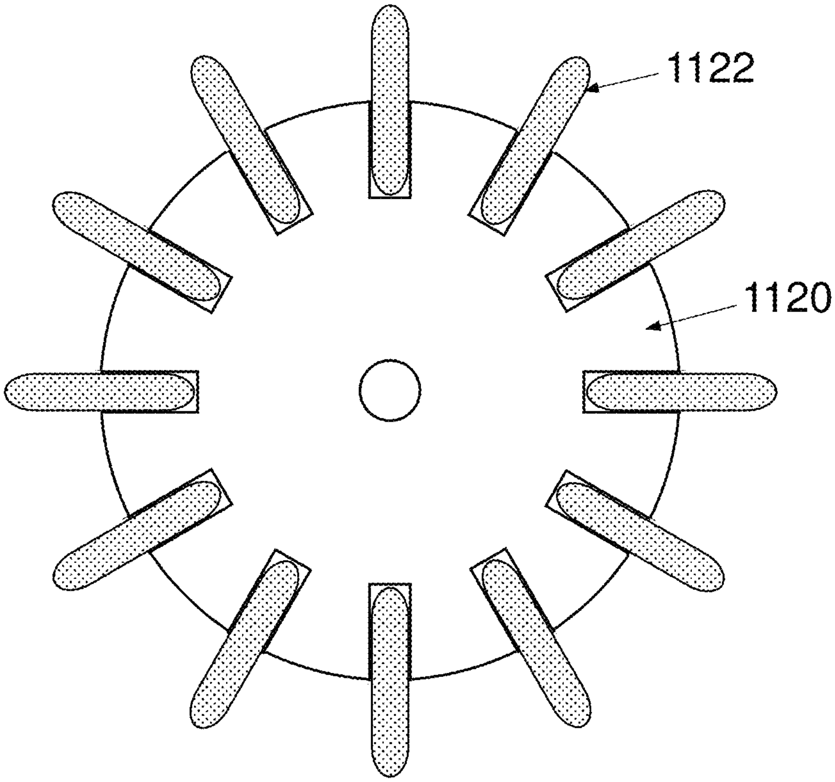

Embodiments of the invention relate to apparatus and methods for changing the doctor blade 2014 when it becomes soiled. FIG. 4B illustrate an example of how the doctor blade may be changed easily, and preferably without the need to interrupt the web coating process, or the printing system that requires a conditioning agent to be applied to its ITM.

In FIG. 4B, twelve doctor blades 1122 are mounted uniformly in recesses around the circumference of a cylindrical rotatable turret 1120. The axially extending doctor blades 1122 behave in the same way as the doctor rods 1122 in FIG. 4A and the turret 1120 serves the same purpose as the rod holder 2020. Instead of using rods of circular cross section, the doctor blades 1122 are constructed as strips having smooth rounded and polished edges. Strips having rounded edges of uniform radius of curvature may be produced, for example, by flattening rods of circular cross section. The doctor blades 1122 may suitably be made of stainless steel but other hard materials resistant to abrasion may alternatively be used.

The manner in which the turret 1120 and the doctor blades 122 interact with the ITM 110 is shown in FIG. 5 which illustrates one example of a cleaning station 258 and treatment station 260 (e.g. for applying a wet layer of treatment formulation—e.g. as in step S209 of FIG. 2 or step S101 of FIG. 2).

In the example of FIG. 5, two separate tanks 1125, 1127 are shown. A quantity of treatment solution (e.g. having one or properties of step S205 of FIG. 2 or step S95 of FIG. 12) is stored in tank 1125. For example, this treatment solution may be jetted (i.e. by jetting apparatus 774) to the surface of the ITM 210. Also illustrated in FIG. 5 are brushes 1126A and 1126B for mechanically removing material from the surface of the ITM 210 to clean the ITM surface—e.g. pressure may be applied between backing rollers 772A-772B respectively disposed opposite brushes 1126A-1126B.

In some embodiments, material removed from the surface of the ITM comprises dried treatment film which may be, for example, resoluble in liquid treatment formulation (e.g. having one or properties of step S205 of FIG. 2 or step S95 of FIG. 12) stored in tank 1125—this may allow for recycle of treatment formulation. Thus, the cleaning of the ITM surface may be effected by the treatment solution itself.

Irrespective of any mechanical properties of the system, in embodiments of the invention, the aqueous treatment formulation provided in step S205 of FIG. 2 or in step S95 of FIG. 12 may be fully resoluble (e.g. after drying, it may fully dissolves in aqueous treatment formulation).

Treatment formulation 1128 may be jetted by jetting apparatus 1128. In the example of FIG. 5, one of the doctor blades 1122 is active—this is labelled $\mathbf{1122}_{ACTIVE}$. A relatively thick layer of treatment formulation may be applied (e.g. by apparatus 1128), and excess treatment formulation may be removed by the combination of doctor blade $\mathbf{1122}_{ACTIVE}$ and a backing roller 1141 which is urged towards doctor blade $\mathbf{1122}_{ACTIVE}$.

Jetting apparatus 1128 is one example of a 'coater' for applying a coating of treatment formulation to the surface of ITM 210. Another example of a coater is a pool 2032 when liquid content of the pool is retained on the ITM surface.

Figure 10A:
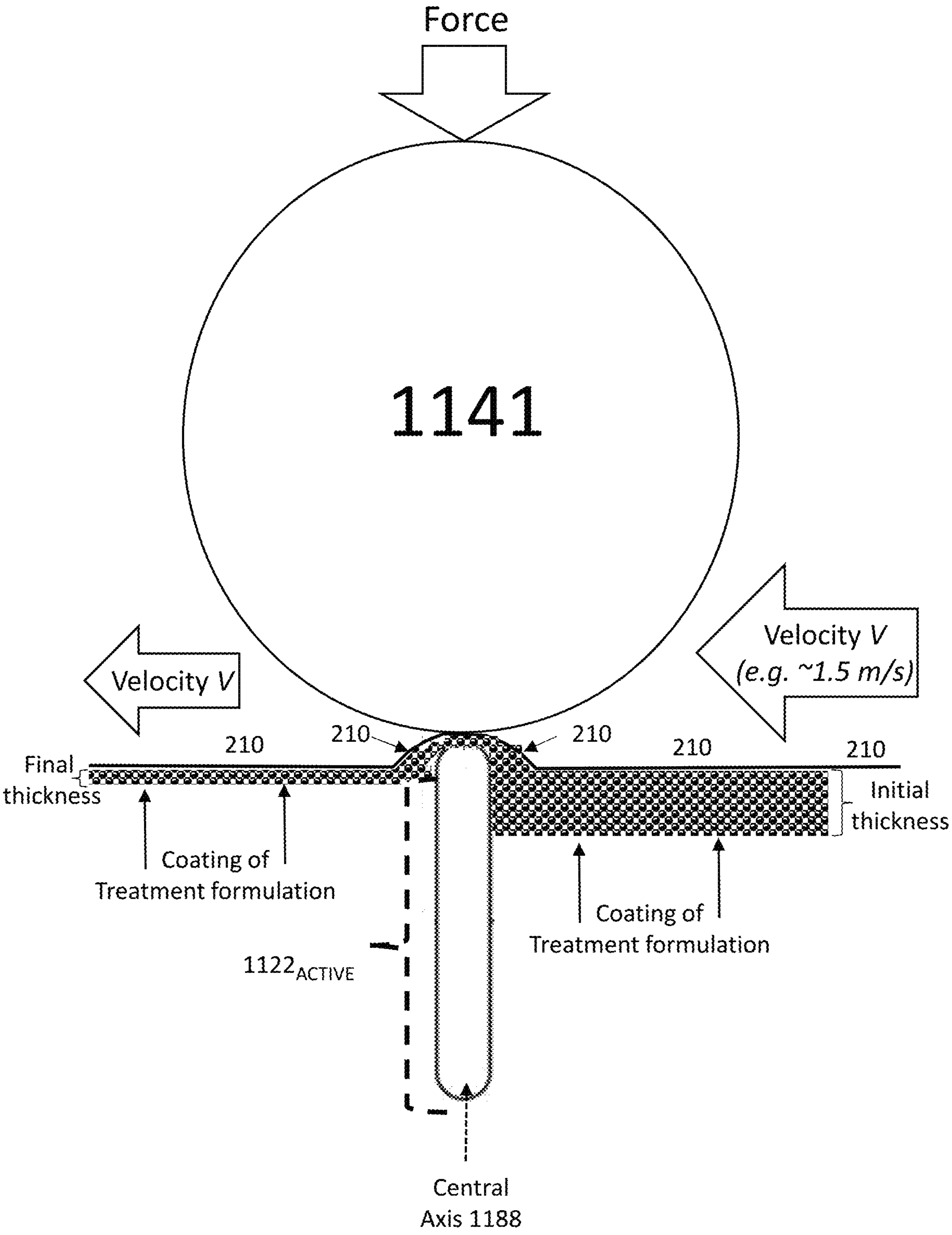
Figure 11A:
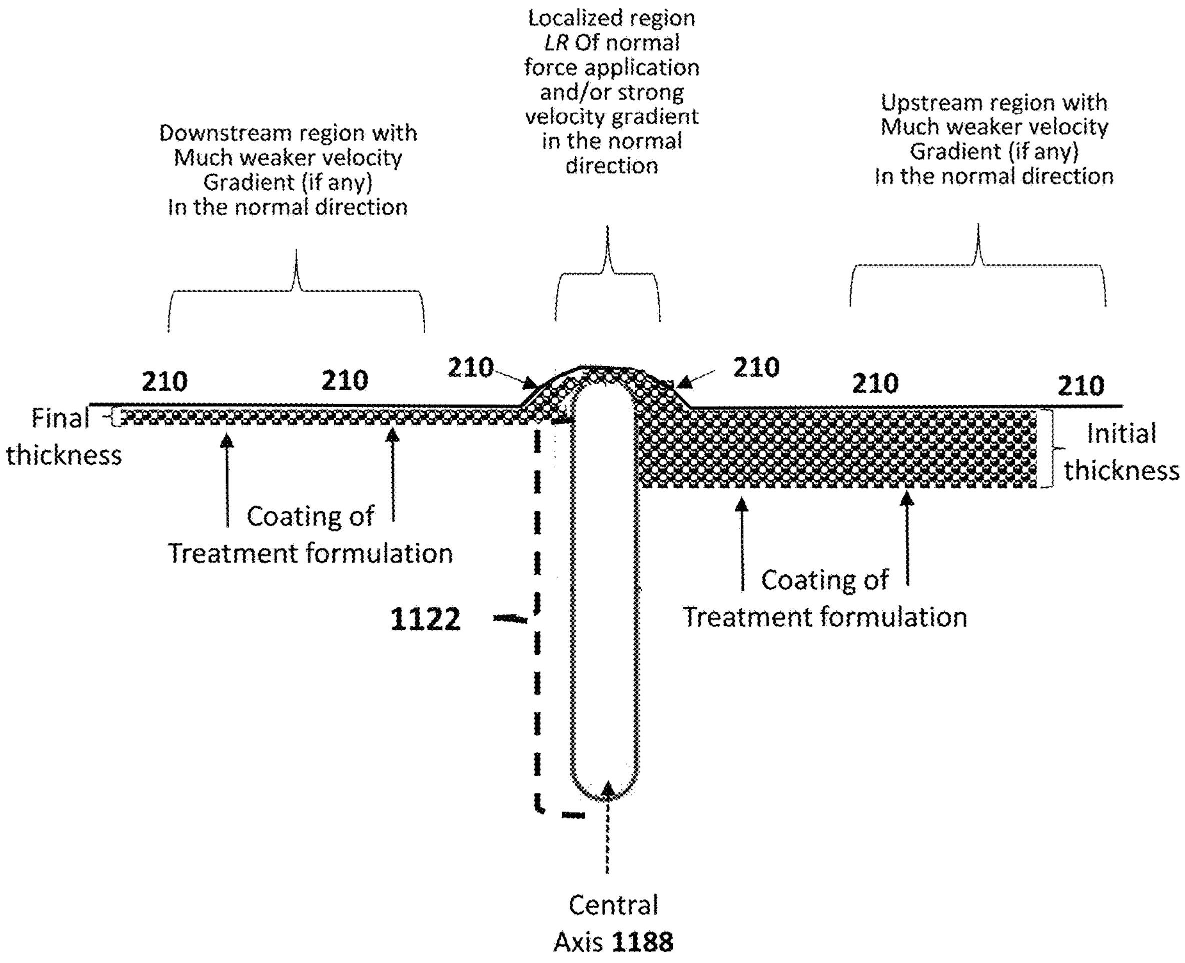

Collectively, doctor blade $\mathbf{1122}_{ACTIVE}$ (or rounded tip thereof) and backing roller 1141 (or alternatively a device for providing air pressure towards rounded tip 1122) collectively a coating thickness-regulation assembly—thus, in FIGS. 10A and 11A the "final thickness' of the treating formulation may be regulated by according to an amount of force urgent the tip 1123 towards the opposing portion of ITM 210 (e.g. towards backing roller 1141) or vice versa.

In the example of FIG. 5, only one doctor blade 122 interacts with the ITM 110 at any given time but when a blade becomes soiled, the turret 120 is rotated to bring the next adjacent doctor blade into the operating position in which the blade is functional, i.e. sufficiently close to the surface to remove excess liquid and allow only a film of the desired thickness to adhere to the surface downstream of the apparatus.

Prior to returning to the operating position, at some later stage in the turret rotation cycle, the soiled blade 1122 passes through a cleaning device, for example a brush 1130, which removes any deposit and cleans the blade before it becomes functional again.

The rotation of the turret 1120 may be instigated on demand by an operator or it may be performed at regular intervals.

Figure 8:
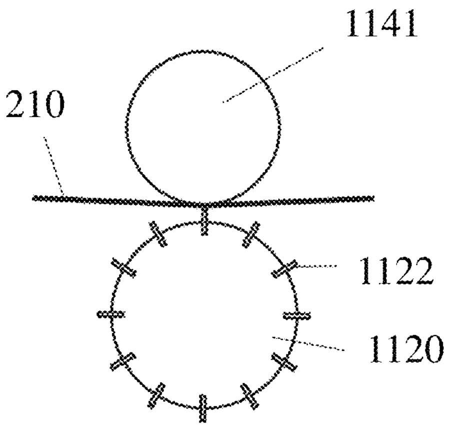
Figure 9:
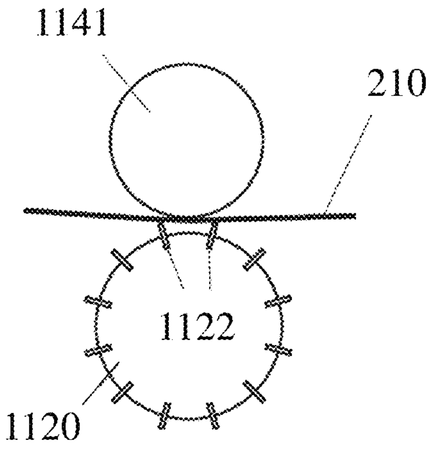

The number of doctor blades on the turret 1120 need not be twelve but it is desirable for there to be a sufficient number that during a changeover, as shown in FIGS. 8-9, there should be a time when two doctor blades 1122 are functional and interact with the ITM 110 at the same time. As a consequence, there is a substantially continuous replacement of the blades, so that no interruption in the film metering operation, and this in turn permits the doctor blade to be changed without interruption of the printing system.

FIGS. 8-9 are more detailed perspective and exploded sectional views, respectively, of the turret 1120 and the doctor blade cleaning brush 1130. Both are mounted on axles rotatably supported in a metal frame 1140 immersed in the tank 1127. The axles of the turret 1120 and the doctor blade cleaning brush 1130 are connected to respective drive motors 1412 and 1144 mounted outside the tank 1127. As can be seen from FIG. 7, the turret 1120 is made of a hollow cylinder and its cylindrical surface may be perforated to reduce it weight and moment of inertia, while still providing adequate strength to support the doctor blades 1122.

While the doctor blades 1122 supported by the turret 1120 have been shown as flat strips, it should be understood that they may alternatively be formed as circular rod as described by reference to FIG. 4.

It has been found that the vigorous agitation of the solution of the conditioning or treatment agent can, for certain conditioning agents, result in the formation of a foam or froth. It is possible to destroy the foam using ultrasound and such an anti-foaming device may be incorporated in the tank 1125.

Figure 10B:
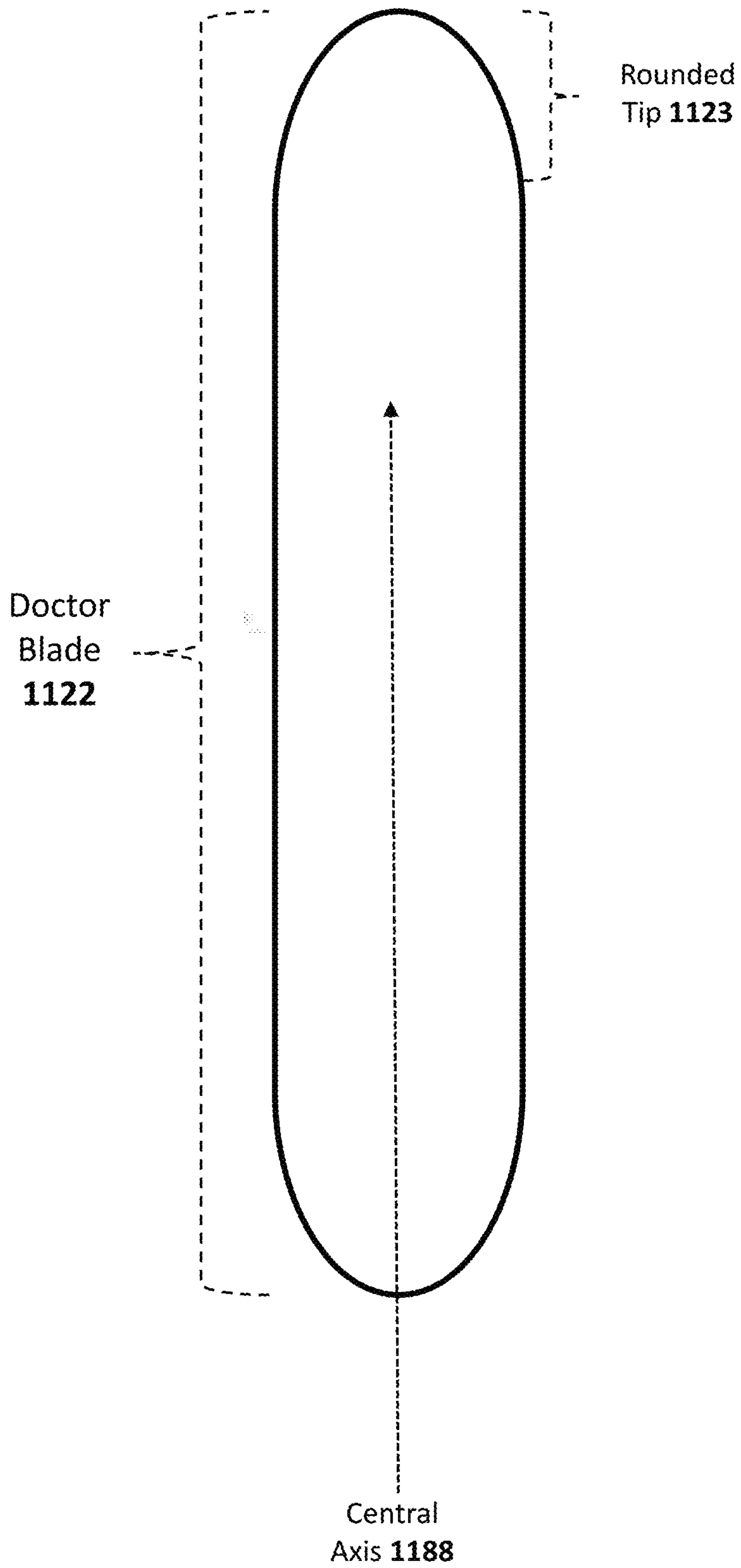

As illustrated in FIGS. 10A and 10B, when doctor blade $\mathbf{1122}_{ACTIVE}$ is urged towards backing roller 1141, or vice versa, doctor blade may penetrate into a lower run of the ITM 210. As shown in FIG. 10A, ITM 210 (i.e. a lower run thereof) is disposed in between roller 1141 and doctor blade $\mathbf{1122}_{ACTIVE}$. Therefore, when roller 1141 is urged towards doctor blade $\mathbf{1122}_{ACTIVE}$, roller 1141 pushes on ITM 210 (i.e. a lower run thereof) and ITM 210 is urged towards doctor blade $\mathbf{1122}_{ACTIVE}$—the converse is true.

In the examples of FIGS. 10A-10B, a central axis 1188 of doctor blade $\mathbf{1122}_{ACTIVE}$ is illustrated. In FIGS. 10A-10B, a rounded tip of doctor blade $\mathbf{1122}_{ACTIVE}$ is labelled as 1123.

In the example of FIG. 10A, tip 1123 faces a surface (i.e. local normal) of the ITM 210. In the example of FIG. 10A doctor blade $\mathbf{1122}_{ACTIVE}$ is oriented substantially normal to a local surface of the ITM 210 that faces rounded tip 1123.

In the example of FIG. 10A, downward force may be applied (i.e. via the ITM) by roller 1141 towards rounded tip 1123. Alternative, air pressure may be used to bias the ITM 210 towards the rounded tip 1123. This results in the doctor blade $\mathbf{122}_{ACTIVE}$ removing all but a thin liquid film (e.g. less than typically less than 1 micrometer) having a thickness determined by the radius of curvature and the applied pressure.

All of the above may apply as well to the exemplary structure provided in FIG. 10A. In the embodiment of FIG. 10A, the backing roller has a compressible surface which is compressed when the rounded tip is urged towards the ITM surface and/or vice versa (i.e. any configuration in which the backing roller and the rounded tip are urged toward one another) so that the rounded tip penetrates into the backing roller together with the ITM at a particular or desired penetration depth.

Jetting device 1128 or a bath in which the ITM surface may be soaked or any other device for applying an initial coating may be considered a 'coater' for coating the ITM with liquid treatment formulation. Furthermore, the combination of (i) rounded surface 1123 (e.g. rounded tip) and a device for applying a counter force (e.g. roller 1141) to urge rounded surface 1112 towards an opposing of the ITM 210 (or vice versa) form a thickness-regulation assembly for removing excess liquid so as to leave only the desired uniform thin layer of treatment formulation (e.g. of submicron thickness).

In embodiments of the invention, even though the rounded tip 1123 is out contact from an opposing ITM surface (e.g. to maintain a gap therebetween, the applicator may still indirectly apply pressure to the ITM via the treatment fluid.

In some embodiments, the rounded tip applies a pressure of at least 0.1 bar or at least 0.25 bar or at least 0.35 bar or at least 0.5 bar, and optionally at most 2 bar or at most 1.5 bar, or at most 1 bar.

This pressure may be localized in the print direction. For example, a 'strip of pressure' (e.g. the strip may be elongated in a cross print direction) (e.g. having a length in the crossprint direction of at least 10 cm, at least 30 cm, at least 50 cm, at least 70 cm, or at least 100 cm, and typically at most 250 cm, at most 200 cm, or at most 150 cm) may be applied to the ITM by the applicator so that (i) a maximum pressure applied to the ITM within the strip is P_STRIP_MAX, a value of which is at least at least 0.1 bar or at least 0.25 bar or at least 0.35 bar or at least 0.5 bar, and optionally at most 2 bar or at most 1.5 bar, or at most 1 bar; (ii) at all locations within the strip, a local pressure applied to the ITM by the applicator is at least 0.5*P_STRIP_MAX and (iii) on all locations in a cross-print direction on opposite sides of the strip (upstream and downstream to the strip—displaced from the strip by at most 2 cm or at most 1 cm or at most 5 mm or most 3 mm or at most 2 mm or at most 1 mm or at most 0.5 mm), a maximum pressure is at most 0.2*P_STRIP_MAX or at most 0.1*P_STRIP_MAX.

Figure 11B:
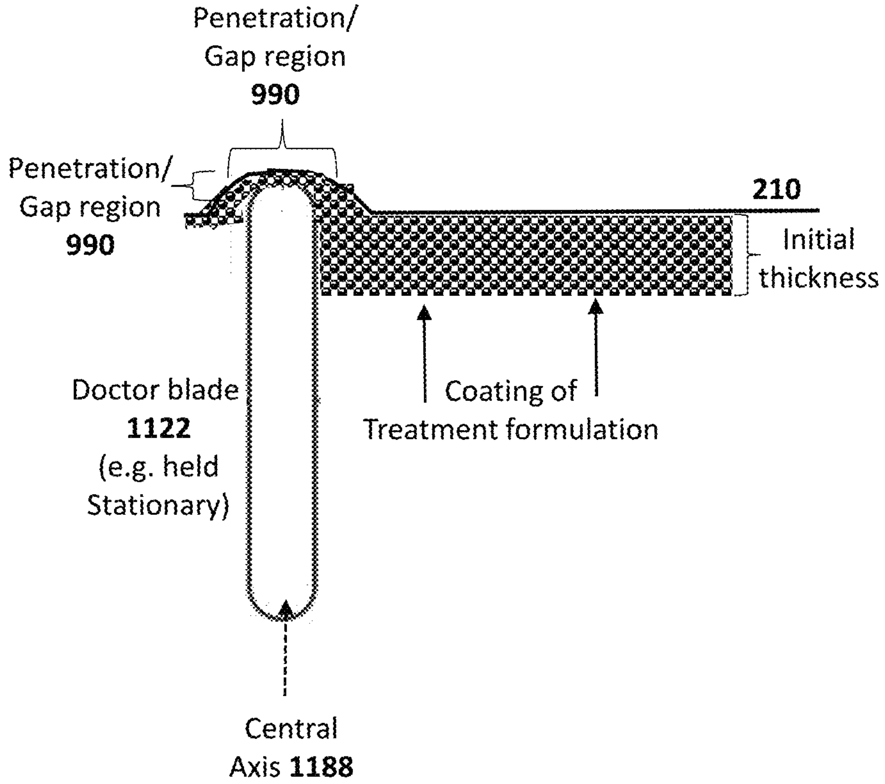
Figure 11C:
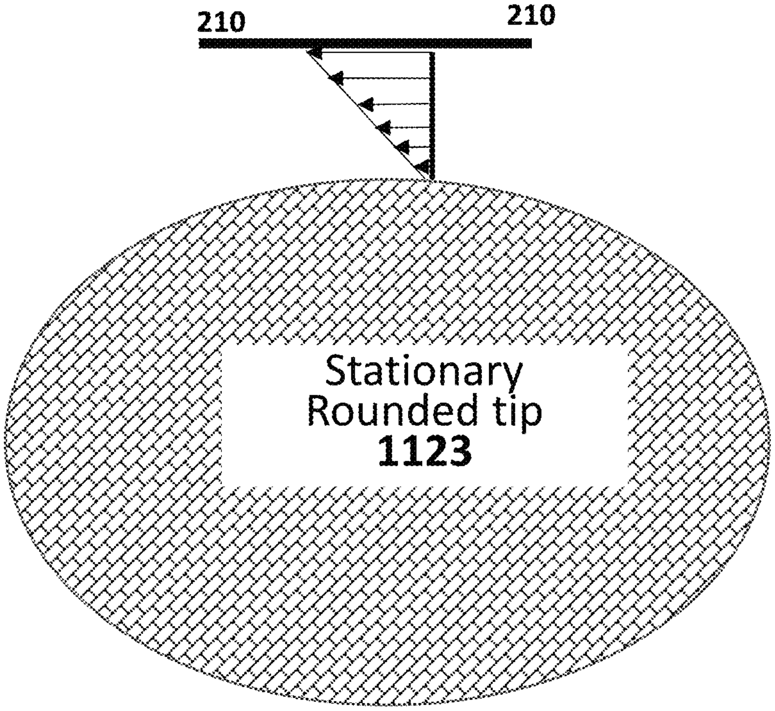
Figure 11D:
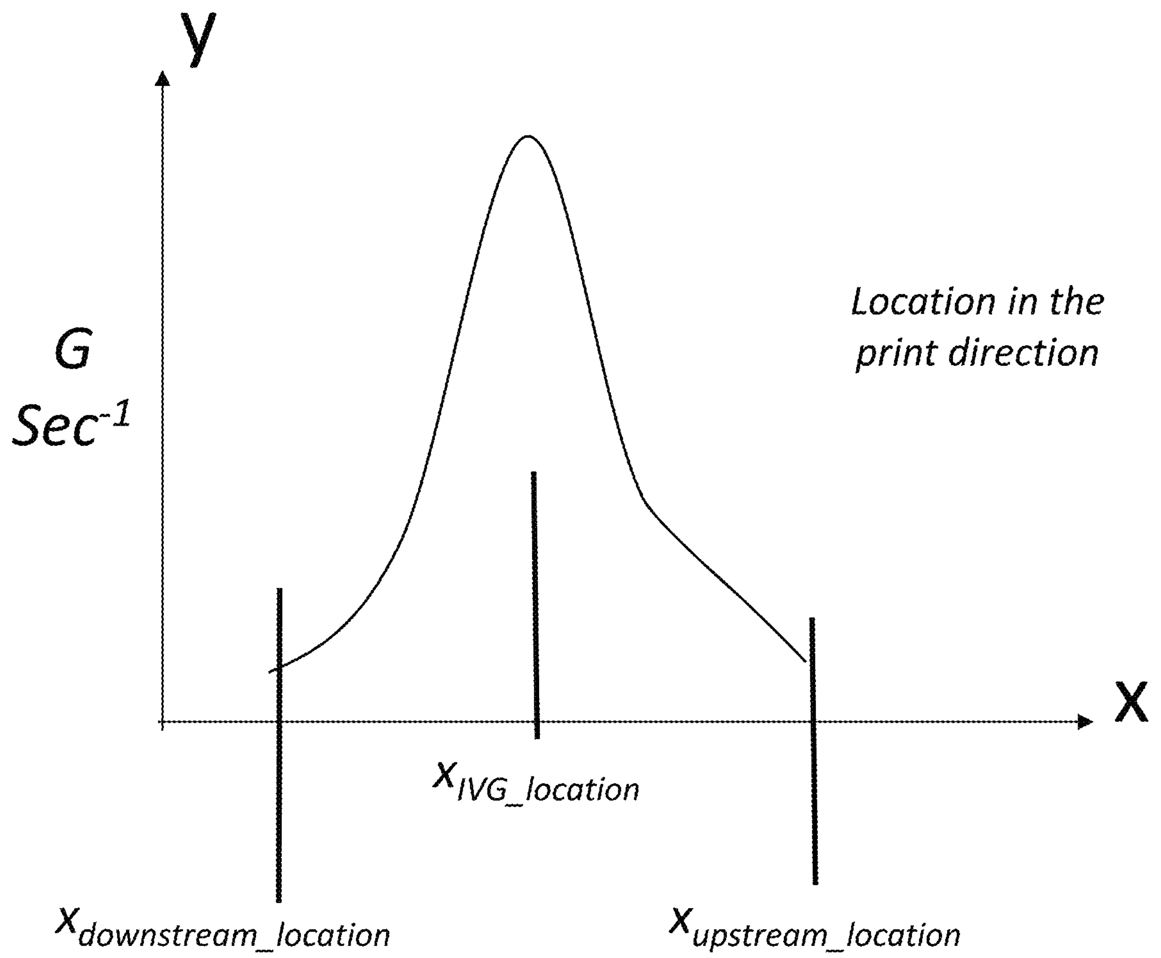
FIG. 11D illustrates shear intensity as a function of location.

As shown in FIG. 11A, a presence of the rounded tip 1123 (e.g. doctor blade) (e.g. held stationary) may cause a shear field or velocity gradient—see, for example, FIG. 11B and FIG. 11C. At locations on the ITM surface, the velocity of treatment fluid may be non-zero (e.g substantially equal to a velocity of the ITM) due to a no-stick boundary condition with the ITM surface; at the applicator the velocity of treatment fluid may be zero.

In some embodiments, i. the forming of the thin wet treatment layer (e.g. in step S209 of FIG. 2 or in step S101 of FIG. 12) comprises creating a velocity gradient (e.g. in the direction normal to the ITM surface) of the aqueous treatment solution in an Intense velocity Gradient IVG location $x=x_{IVG\_location}$ location that is (i) normally displaced from the release surface of the ITM (e.g. by at most 3 microns or at most 2 microns or at most 1 micron) and/or between an applicator and the release surface of the applicator; and ii. in the IVG location, a magnitude of the velocity gradient equals or exceeds a VG value that is at least $10^6$ $sec^{-1}$ or at least $2\times10^6$ $sec^{-1}$ or at least $4\times10^6$ $sec^{-1}$ or at least $5\times10^6$ $sec^{-1}$ or at least $7.5\times10^6$ $sec^{-1}$ or at least $10^7$ $sec^{-1}$ or at least $2\times10^7$ $sec^{-1}$ or at least $4\times10^7$ $sec^{-1}$ or at least $5\times10^7$ $sec^{-1}$ or at least $7.5\times10^7$ $sec^{-1}$.

In some embodiments, the velocity gradient is localized along a print direction such that:

i. at an upstream location that is upstream of the IVG location, a maximum velocity gradient is at most x % of a value of the velocity gradient at the IVG location;
ii. at a downstream location that is downstream of the IVG location, a maximum velocity gradient is at most x % of a value of the velocity gradient at the IVG location;
iii. a value of x is at most 50 or at most 30 or at most 20 or at most 10; and/or
iv. the upstream and downstream locations are each displaced from the IVG location by at most by at most 2 cm or at most 1.5 cm or at most 1.25 cm or at most 1 cm or at most 9 mm or at most 8 mm or at most 7.5 mm or at most 7 mm or at most 6 mm or at most 5 mm.

In some embodiments, the rounded surface is urged to the ITM or vice versa, at a force density in the cross-print direction of at least 250 g/cm or at least 350 g/cm or at least 400 gm/cm and/or at most 1 kg/cm or at most 750 g/cm or at most 600 g/cm.

Discussion of FIG. 12

Embodiments of the present invention relate to a printing process described in FIG. 12. In some non-limiting embodiments, apparatus, systems and devices described in of FIGS. 3-11 may be employed to perform the method of FIG. 12. The order of steps in FIG. 12 is not intended as limiting—in particular, steps S91-S99 may be performed in any order. In some embodiments, steps S101-S117 are performed in the order indicated in FIG. 12.

In some embodiments, step S91 may be performed to provide any feature or combination of features of step S201 of FIG. 2.

In some embodiments, step S95 may be performed to provide any feature or combination of features of step S205 of FIG. 2.

In some embodiments, step S101 may be performed to provide any feature or combination of features of step S209 of FIG. 2.

In some embodiments, step S105 may be performed to provide any feature or combination of features of step S213 of FIG. 2.

In some embodiments, step S109 may be performed to provide any feature or combination of features of step S217 of FIG. 2.

In some embodiments, step S113 may be performed to provide any feature or combination of features of step S221 of FIG. 2.

In some embodiments, step S117 may be performed to provide any feature or combination of features of step S225 of FIG. 2.

Steps S91-99 relate to the ingredients or components or consumables used in the process of FIG. 12, while steps S101-S117 relate to the process itself. Briefly, (i) in step S101 a thin treatment layer of a wet treatment formulation is applied to an intermediate transfer member (ITM) (e.g. having a release layer with hydrophobic properties), (ii) in step S105 this treatment layer is dried (e.g. rapidly dried) into a thin dried treatment film on a release surface of the ITM, (iii) in step S109 droplets of an aqueous ink are deposited (e.g. by jetting) onto the thin dried treatment film, (iv) in step S113 the ink image is dried to leave an ink image on the dried treatment film on the ITM and (v) in step S117 the ink-image is transferred to printing substrate (e.g. together with the dried treatment film).

The details of the ingredients of steps S91-S99, as well as the process steps S101-S117 are described below.

In embodiments of the inventions, steps S91-S117 are performed as follows:

- (A) in step S91, an ITM is provided—e.g. at most moderately hydrophobic and/or having hydrophobic properties and/or having a release layer that is silicone based and/or only moderately hydrophobic and/or lacking functional groups;
- (B) in step S95, an aqueous treatment solution is provided (e.g. (i) having a low evaporation load and/or (ii) that is surfactant rich and/or (ii) that is only moderately hydrophilic and/or (iii) comprising a water soluble polymer and/or (iv) comprising quaternary ammonium salts and/or (v) having a viscosity that is low enough so that the solution may be spread into a uniform thin layer and/or (vi) comprising hygroscopic material and/or (vii) substantially devoid of organic solvents and/or (viii) having at most a low concentration of flocculants containing polyvalent cations;
- (C) in step S99 an aqueous ink is provided;
- (D) in step S101 an aqueous treatment formulation is applied to the release surface of the ITM (e.g. an in-motion ITM) to form thereon a thin wet treatment layer (e.g. thickness ≤0.8μ);
- (E) in step S105, the wet thin treatment layer is subjected to a drying process (e.g. rapid drying) on the ITM release surface to leave a thin dried treatment film (e.g. thickness ≤0.08μ) of the water soluble polymer on the ITM release surface. For example, the thin dried treatment film may have one or both of the following properties: (i) for example, the treatment film is continuous and/or cohesive film; (ii) an upper surface of the dried treatment film is characterized by a very low roughness;
- (F) in step S109, droplets of aqueous ink are deposited (e.g. by ink-jetting) onto the thin dried treatment film to form an ink image thereon;
- (G) in step S119, the ink-image to leave an ink residue on the dried treatment film (e.g. to achieve good ink-dot spreading)
- (H) in step S119, the dried ink-image is transferred (e.g. at a relatively low temperature) (e.g. together with the dried treatment film) from the ITM surface to printing substrate (e.g. paper-based or plastic-based).

In some embodiments the process of FIG. 12 is performed so that when the aqueous treatment solution is applied to the ITM in step S101, there is little or no beading so that the resulting thin dried treatment film (i.e. obtained in step S105) is continuous and/or has a smooth (e.g. extremely smooth) upper surface. This smooth upper surface may be important for obtaining a substrate-residing ink image of high quality.

One feature associated with conventional processes where the ITM is pre-treated and the ink image is applied on top of the pre-treated ITM, is that after transfer to substrate, the dried treatment formulation (e.g. after drying) resides over the ink image, and may add to the ink image an undesired gloss. To overcome or minimize this potentially undesirable effect, the thin dried treatment film is obtained in step S105 (for example, having a thickness of at most 400 nanometers or at most 200 nanometers or at most 100 nanometers or even less). Furthermore, in some embodiments, this thin dried treatment film (i.e. obtained in step S105) is continuous, which can be beneficial, as discussed below.

Though not a limitation, in some embodiments, the process of FIG. 12 is performed so that the image-transfer of step S117 is performed at a low temperature (e.g. to an uncoated substrate)—e.g. a temperature of at most 90° C., or at most 85° C., at most 80° C., or at most 75° C., at most 70° C., or at most 65° C., at most 60° C.—for example, at about 60° C.

A Discussion of Step S91 of FIG. 12

In different embodiments, the ITM (i.e. the ITM provided in step S91 of FIG. 12 or in step S201 of FIG. 2) may provide one of more (i.e. any combination of) of the following features A1-A5:

- A1: In some embodiments, the release layer is formed of a silicone material (e.g. addition-cured)—this provides the ITM with hydrophobic properties useful in step S117;
- A2: Before use in the method of FIG. 12, the silicone-based release layer has been produced in a manner that reduces a hydrophobicity thereof. For example, instead of relying on the addition of functional, reactive groups to imbue the release layer with hydrophilicity, it is possible to cure the silicone release layer so that polar atoms in polar groups (e.g. the oxygen atom in a polar Si—O—Si moiety) are aligned or otherwise face outwardly with respect to the release layer surface. In this example, the oxygen atom of the "Si—O—Si" is not capable, under typical process conditions, of chemically bonding to the materials within the treatment solution, to the dried ink image and/or to the dried treatment film in step S117. However, in steps S101-S105, it is possible to benefit from the hydrophilicity of the outwardly-facing, polar "O".

A3: the release surface of the ITM may have moderately hydrophobic properties but is not overly hydrophobic. Thus, the release surface may have a surface energy (at 25° C.) of at least 23 dynes/cm, and more typically, at least 25 dynes/cm, at least 28 dynes/cm, at least 30 dynes/cm, at least 32 dynes/cm, at least 34 dynes/cm, or at least 36 dynes/cm, and/or at most 48 dynes/cm, at most 46 dynes/cm, at most 44 dynes/cm, at most 42 dynes/cm, at most 40 dynes/cm, at most 38 dynes/cm, or at most 37 dynes.

A4: a receding contact angle of a droplet of distilled water on the ink reception or release layer surface is typically at least 30°, and more typically, 30° to 75°, 30° to 65°, 30° to 55°, or 35° to 55°;

A5: the release layer of the ITM may be devoid or substantially devoid of functional groups bonded within the crosslinked polymer structure; the inventors believe that such functional groups may increase or promote an undesired adhesion.

A Discussion of Step S95 of FIG. 12

In step S95, an aqueous treatment formulation is provided. This treatment formulation comprises at least 50% wt/wt or at least 55% wt/wt or at least 60% wt/wt or at least 65% wt/wt water carrier liquid).

In different embodiments, the aqueous treatment formulation (i.e. the aqueous treatment formulation in its initial state before the application of step S101 of FIG. 12 or the aqueous treatment formulation in its initial state before the application of step S205 of FIG. 1) may provide one of more (i.e. any combination of) the of the following features:

B1. Low evaporation load—In some embodiments, the initial aqueous treatment formulation has a low evaporation load and is relatively rich in material that is solid at 60° C. (and at atmospheric pressure). As will be discussed below, in some embodiments, this may be useful so that during step S105, the viscosity rapidly increases in a very short period of time, thereby counteracting any tendency of the aqueous treatment formulation to bead on the release surface of the ITM, which has hydrophobic properties. For example, the 60° C. evaporation load may be at most 10:1, or at most 9:1, or at most 8:1, or at most 6:1, or at most 5:1, or at most 4:1. In some embodiments, this is useful for achieving a continuous dried treatment film lacking in bare patches.

B2. surfactant rich—in some embodiments, the initial aqueous treatment formulation comprises at least 2% wt/wt, or at least 2.5% w/t, at least 3% wt/wt, or at least 4% w/t, or at least 5% wt/wt, or at least 6% wt/wt, or at least 7% wt/wt, or at least 8% wt/wt, or at least 9% wt/wt, or at least 10% wt/wt of surfactant(s). For example, one or more of the surfactants present in the initial aqueous treatment formulation (e.g. at least 50% or at least 75% or at least 90% by weight of surfactants in the treatment formulation) may be a solid at 60° C., thus contributing to the low evaporative load. In some embodiments, the relatively high concentration of the surfactant in initial the aqueous treatment formulation may serve to make the aqueous treatment formulation less hydrophilic, thereby reducing a tendency of the aqueous treatment formulation to bead on the release surface of the ITM in step S101 and/or S105. In some embodiments, because the surfactant is a wetting agent, the relatively high concentration of the surfactant may be useful for spreading aqueous ink-droplets (or counteracting any tendency of the ink droplet to contract) over the surface of the dried ink film during steps S109 and/or S113, thereby increasing a coverage of the resulting ink dot which eventually resides on the substrate.

B3. a presence (e.g. at relatively high concentration) of quaternary ammonium salts—in some embodiments, the initial aqueous treatment formulation comprises at least 1.5% (e.g. at least 2%, at least 2.5%, at least 3%, at least 4%, at least 5%) wt./wt. quaternary ammonium salts. In some embodiments, a solubility of the quaternary ammonium salts in water is at least 5% at 25° C. In some embodiments, the ammonium quaternary ammonium salt, contains aliphatic substituents.

B4. Moderately hydrophilic initial aqueous treatment formulation—in some embodiments, the initial aqueous treatment formulation is only moderately hydrophilic—e.g. having a static surface tension at 25° C. of at most 32 dynes/cm (e.g. between 20 and 32 dynes/cm) or at most 30 dynes/cm (e.g. between 20 and 32 dynes/cm) or at most 28 dynes/cm (e.g. between 20 and 32 dynes/cm). Because the release surface of the ITM has moderately hydrophobic (or moderately hydrophilic) properties, it may not be useful to employ an initial aqueous treatment formulation having high hydrophilicity, which would cause beading of the aqueous treatment formulation on the surface of the ITM in steps S101 and/or S105. This may be especially important for situations where the thickness of the wet treatment layer is thin, and it is desired to avoid bare patches so the resulting thin dried treatment film is continuous.

B5. Presence of a water-soluble polymer which forms a polymer matrix (e.g. upon drying in step S105 of FIG. 21 or upon drying in step S213 of FIG. 2)—in some embodiments, the initial aqueous formulation comprises at least 1.5% (e.g. at least 2%, at least 2.5%, or at least 3%) by weight, of at least one water soluble, polymer, more particularly, a matrix forming polymer, having a solubility in water of at least 5% at 25° C. Such polymer(s) include but are not limited to polyvinyl alcohol (PVA), water-soluble cellulose, including derivatives thereof, such as hydroxypropyl methyl cellulose, PVP, polyethylene oxide, and acrylic. In some embodiments, the formation of the polymer matrix promotes forming of the film and/or imbues the dried treatment film with desired elasticity and/or cohesiveness or tensile strength, even when the dried treatment film is quite thin.

B6. Relatively low viscosity before application to the ITM in step S101 of FIG. 12 (or before application to the ITM in step S209 of FIG. 2)—as will be discussed below, in step S101 of FIG. 12 (or in step S209 of FIG. 2) the inventors have found it to be desirable to apply a thin but relatively uniform wet layer of aqueous treatment formulation. Towards this end, the 25° C. dynamic viscosity of the initial aqueous treatment formulation may be at most 100 cP or at most 80 cP or at most 40 cP or at most 30 cP. Alternatively or additionally, the 25° C. dynamic viscosity of the initial aqueous treatment formulation may be at least 8 cP or at least 10 cP or at least 12 cP or at least 14 cP—for example, within a range of 8 to 100 cP, 10 to 100 cP, 12 to 100 cP, 14 to 100 cP, 10 to 60 cP, or 12 to 40 cP.

In some embodiments, this feature might be particularly useful when applying the treatment formulation to the ITM as it moves at high speeds (e.g. past an applicator arrangement—for example, a stationary applicator arrangement).

B7. Devoid of organic solvents such as glycerol—in some embodiments, a presence of low vapor pressure organic solvents might retard the drying of the treatment formulation on the surface of the ITM in step S105 and/or result in a treatment film lacking desired elasticity and/or cohesiveness or tensile strength desired for the transfer step S117. In some embodiments, the formulation is devoid of organic solvents, irrespective of their vapor pressure in the pure state, and/or comprises at most 3%, at most 2%, at most 1%, or at most 0.5%, or at most 0.25% or at most 0.1% by weight, organic solvents. In particular, in some embodiments, the formulation is devoid of organic solvents and/or comprises at most 3%, at most 2%, at most 1%, or at most 0.5%, or at most 0.25% or at most 0.1% by weight, glycerol. In some embodiments, the formulation is completely devoid of glycerol.

B8. Comprising water-absorbing materials—in some embodiments, the initial aqueous treatment formulation comprises a solid water-absorbing agent that is selected to absorb water from the ink when the water-absorbing agent is disposed within the solid, dried treatment film. For example, such solid water-absorbing agents may have a melting point (i.e., when in a pure state) of at most 60° C. or at most 50° C. or at most 40° C. or at most 30° C. or at most 25° C.—for example, at least 1.5% or at least 2% or at least 2.5% or at least 3% wt./wt. Examples of such water-absorbing agents include but are not limited to sucrose, urea, sorbitol, and isomalt.

B9. A presence of multiples types of surfactants including at least one surfactant whose surface tension exceeds that of the formulation as a whole—in some embodiments, the initial aqueous treatment formulation comprises first and second surfactants where the first surfactant is more hydrophobic (and has a lower surface tension than) the second surfactant (e.g., quaternary ammonium salts). In one example, the first surfactant comprises a silicon polyether and/or the second surfactant is a quaternary ammonium salt. For example, an absolute value of a difference in respective surface tensions between the first and second surfactants may be at least 5 dynes/cm or at least 7.5 dynes/cm or least 10 dynes/cm. For example, (i) a surface tension of the first surfactant is less than a surface tension of the initial aqueous treatment formulation (e.g. by at least 1 dyne/cm or at least 2 dynes/cm or at least 3 dynes/cm or at least 4 dynes/cm or at least 5 dynes/cm or at least 7 dynes/cm) and/or (ii) a surface tension of the second surfactant exceeds a surface tension of the initial aqueous treatment formulation (e.g. at by least 1 dyne/cm or at least 2 dynes/cm or at least 3 dynes/cm or at least 4 dynes/cm or at least 5 dynes/cm or at least 7 dynes/cm).

In some embodiments, the primary purpose of the first surfactant is to lower the hydrophilicity of the initial aqueous treatment formulation (e.g. to value described above in 'feature A4')—e.g. so that the treatment formulation does not bead in steps S101 and/or S105. Alternatively or additionally, the primary purpose of the second surfactant is to provide any features described above in B3.

In different embodiments, a the initial aqueous treatment formulation comprises at least 2% wt./wt., or at least 2.5% wt./wt., at least 3% wt./wt., or at least 4% wt./wt., or at least 5% wt./wt. of the first surfactant and/or at least 2% wt./wt., or at least 2.5% wt./wt., or at least 3% wt./wt., or at least 4% wt./wt., or at least 5% wt./wt. of the second surfactant. For example, a ratio between a wt./wt. concentration of the first surfactant and a wt./wt. concentration of the second surfactant is at least 0.1 or at least 0.2 or at 0.25 or at least 0.33 or at least 0.5 or at least 0.75 and/or at most 10 or at most 4 or at most 3 at most 2 or at most 4/3.

B10. Having at most a low concentration of flocculants containing polyvalent cations (such as calcium chloride)—in some embodiments, it is believed that these compounds are not good for the image quality.

A Discussion of Step S99 of FIG. 12

Potential Features of the AQUEOUS INK:

Feature C1: In some embodiments (e.g. related to the method of FIG. 2 or of FIG. 12), the ink provides one or more features of (any combination of features) disclosed in PCT/IB13/51755 or US2015/0025179, PCT/IB14/02395 or U.S. Ser. No. 14/917,461, all of which are hereby incorporated by reference.

A Discussion of Step S105 of FIG. 12

Feature D1: The dried treatment layer formed in step S105 is thin but not a monolayer (e.g. significantly thicker than monolayer)—e.g. having a thickness of at most 100 nanometers. In some embodiments, the dried treatment layer is extremely thin, having a thickness of at most 80 nanometers, or at most 75 nanometers, or at most 70 nanometers, or at most 65 nanometers, or at most 60 nanometers, or at most 55 nanometers, or at most 50 nanometers. Nevertheless, in different embodiments, even if the dried treatment film is extremely thin, it is thicker than monolayers or monolayer-type constructs. Thus, in different embodiments, a thickness of the dried treatment layer may be at least 20 nanometers or at least 30 nanometers or at least 40 nanometers or at least 50 nanometers. In some embodiments, providing this much 'bulk' (i.e. minimum thickness features—e.g. together with other feature(s) described below) facilitates formation of a dried treatment film that is cohesive and/or elastic—this may be useful in step S117 where it is desirable for the dried treatment film (i.e. at that stage bearing the dried ink image thereon) to maintain its structural integrity as it is transferred from the ITM to substrate.

In some embodiments, the dried treatment formulation may add an undesired gloss to the resulting ink image after transfer to substrate—thus, the ability to form a thin but cohesive dried treatment layer may be useful. The thin layer also facilitates evaporation and drying of the layer into a film.

Feature D2—The dried treatment film formed on the ITM in step S105 is continuous and is devoid of 'bare patches' thereon, despite the thinness or extreme thinness. As will be discussed below, in some embodiments, in order to achieve this (i.e. especially for thin or very thin layers), both of the following may be required: (i) the initially-applied wet layer applied in step S101 is continuous and devoid of bare-patches, even if the initially-applied wet layer is relatively thin, having a thickness of at most about 1μ (or at most 0.8μ or at most 0.6μ or at most 0.4μ and more typically, at most 0.3μ, at most 0.25μ, or at most 0.2μ, and/or at least 0.1μ) and (ii) the drying process of step S105 occurs very quickly, where the viscosity of the drying treatment formulation increases very rapidly (e.g. by a factor of at least 100 or at least 1000 or at least 10,000 within at most 100 milliseconds, at most 50 milliseconds, within at most 40 milliseconds, within at most 30 milliseconds, within at most 25 milliseconds, within at most 20 milliseconds, within at most 15 milliseconds or within at most 10 milliseconds). Because the ITM release layer has hydrophobic properties and the treatment formulation is aqueous and more hydrophilic, when the aqueous treatment formulation is applied to the ITM release layer, the aqueous treatment formulation may undergo beading. However, if the viscosity increases rapidly after application of the wet treatment layer, the higher viscosity treatment formulation may better resist beading than a formulation of lower viscosity. In some embodiments and as discussed above in feature “B1”, the aqueous treatment formulation may be rich in solids and/or include a low evaporative load—this may facilitate a rapid increase in viscosity.

Another anti-beading feature (i.e. anti-beading of the treatment formulation in steps S101-S105) useful for obtaining a continuous dried treatment film may relate to the relative properties of (i) the release surface of the ITM which in some embodiments has hydrophobic properties but is not overly hydrophobic (see feature (see Feature “BA”); and (ii) the aqueous treatment formulation which in some embodiments has hydrophilic properties but is not overly hydrophilic (see feature “B4”). When the static surface tension between the aqueous treatment formulation and the release layer of the ITM may be relatively small, there is less of a driving force towards beading, and the viscosity of the aqueous treatment formation (e.g. as it rapidly increases) may be sufficient to prevent beading.

As will be discussed above, despite the only moderate hydrophobicity of the release layer of the ITM (see feature “A3”), the ITM release layer may have specific properties (see feature “A5”)), that limits an adhesion between the ITM release layer and the dried treatment film—thus, even if the treatment surface is only moderately hydrophobic to avoid beading of treatment formulation thereon in steps S101 and/or S105, it may be possible (e.g. thanks at least in part to feature “B2”) to avoid paying a ‘price’ for this benefit in step S117 when it is desired later to minimize adhesion forces between the release layer of the ITM and the dried treatment film.

In some embodiments, this is useful for producing substrate-residing ink images having appropriate image integrity (see, for example, FIGS. 15A-15D).

Feature D3. The dried treatment film formed on the ITM in step S105 is characterized by an extremely low surface roughness—in some embodiments, the surface roughness may be characterized by a roughness average $R_a$ (a commonly used one-dimensional roughness parameter) of at most 20 nanometers or at most 18 nanometers or at most 16 nanometers or at most 15 nanometers or at most 14 nanometers or at most 12 nanometers or at most 10 nanometers or at most 9 nanometers or at most 8 nanometers or at most 7 nanometers or at most 6 nanometers. The dried treatment film formed on the ITM may have an $R_a$ of at least 3 nanometers or at least 5 nanometers.

In some embodiments, it may be possible to achieve such a low roughness average $R_a$ even for thin or extremely thin dried treatment films formed in step S105—e.g. even when a ratio between the roughness average $R_a$ and the thickness of the dried treatment layer is at least 0.02 or at least 0.03 or at least 0.04 or at least 0.05 or at least 0.06 or at least 0.07 or at least 0.08 or at least 0.9 or at least 0.1 or at least 0.11 or at least 0.12 or at least 0.13 or at least 0.14 or at least 0.15 or at least 0.16 or at least 0.17 or at least 0.18 or at least 0.19 or at least 0.2.

In some embodiments, the dried treatment film to which the aqueous ink droplets are deposited and a surface (e.g. upper surface of) of the dried treatment film are characterized by a dimensionless ratio between (i) an average roughness $R_a$ and (ii) a thickness of the dried treatment layer, wherein the dimensionless ratio is at most 0.5, at most 0.4, at most 0.3, at most 0.25, at most 0.2, at most 0.15, or at most 0.1, and optionally, at least 0.02 or at least 0.03 or at least 0.04 or at least 0.05 or at least 0.06 or at least 0.07 or at least 0.08.

Feature D4—In some embodiments, it is possible to obtain a continuous dry film covering an entirety of a rectangle of at least 10 cm by 1 meter, or an entirety of 1 m2, 3 m2, or 10 m2. The film may have a thickness or average thickness of at most 120 nm, at most 100 nm, at most 80 nm, at most 60 nm, at most 50 nm, or at most 40 nm, and typically, at least 20 nm, at least 25 nm, or at least 30 nm.

A Discussion of step S109-S117

In different embodiments, steps S109 and/or S113 and/or S117 may be performed to provide one or more of the following process-related features:

Feature E1 In some embodiments, step S117 is performed at a low transfer temperature (e.g. at most 90 or 80 or 75 or 70 or 65 or 60° C.—due to thermoplastic properties and/or tensile strength), even when the image is transferred to an uncoated substrate. In some embodiments, providing a low-temperature transfer step may be useful to reduce or avoid clogging of the ink-jet heads, and/or may also be useful for making the printing process, as a whole, more environmentally friendly.

In some embodiments, both the dried treatment film and the dried ink image are tacky at the transfer temperature and are thus amenable to being peeled cleanly away from the release layer, even at a relatively low temperature. This property may be at least partially attributed to the chemistry of the initial aqueous treatment solution. In some embodiments, the chemistry and structure of the release layer (see, for example, feature ‘A5’) may also be useful for providing a low-temperature transfer process in step S117.

Feature E2—Spreading—the manner in which droplets are deposited onto the film (e.g. the wetting angle) and the physical and/or chemical properties of the treatment film [A2 and/or A3 and/or A8—also the nanoparticles in the ink may contribute] is such as that a radius of an ink-dot exceeds a radius of the precursor droplet immediately upon impact on the dried treatment film—e.g. each droplet increases in size beyond the size resulting from spreading of the droplet caused by the impact energy of the droplet. [Dmax=2·Rmax, or Dimpact-max=2·Rimpact-max].

Figure 13A:
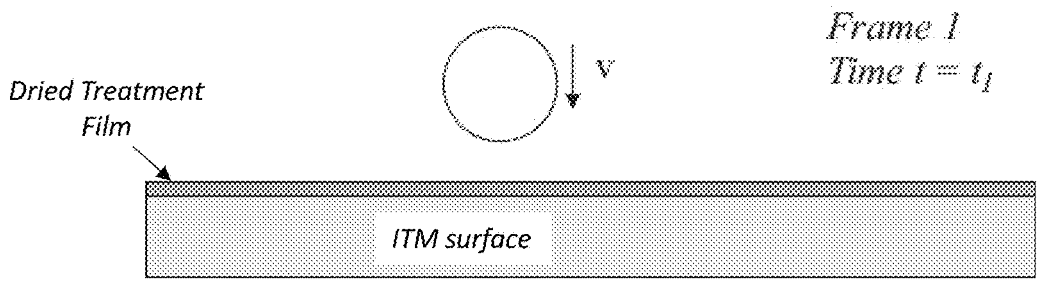
FIGS. 13A-13E schematically describe a process whereby an ink droplet is deposited on an ITM (e.g. a release surface thereof)
Figure 13B:
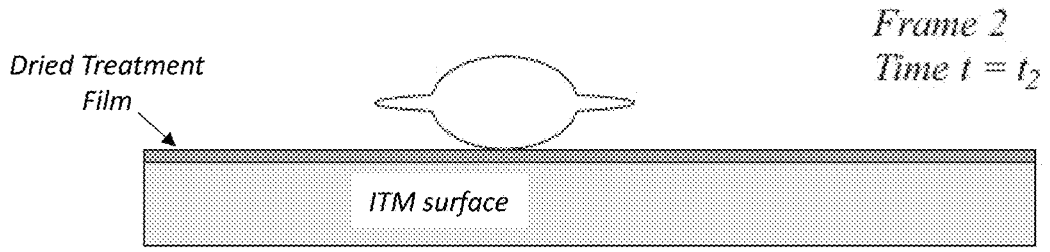
Figure 13C:
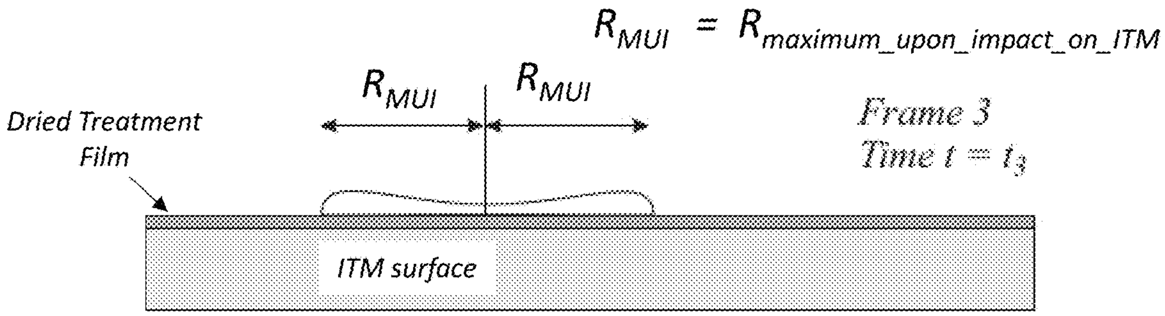
Figure 13D:
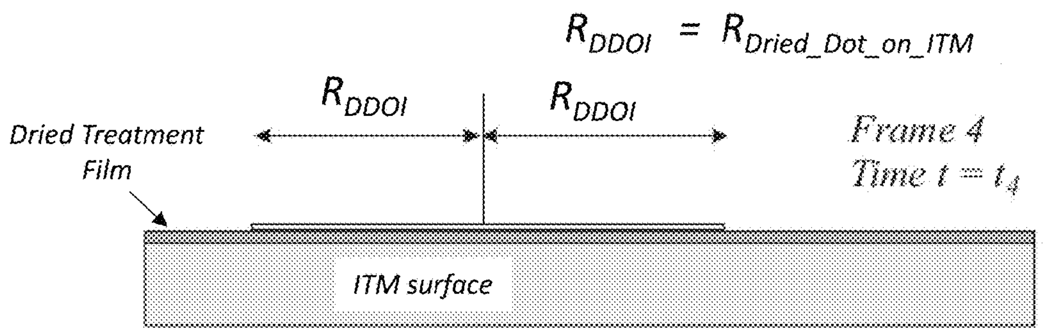
Figure 13E:
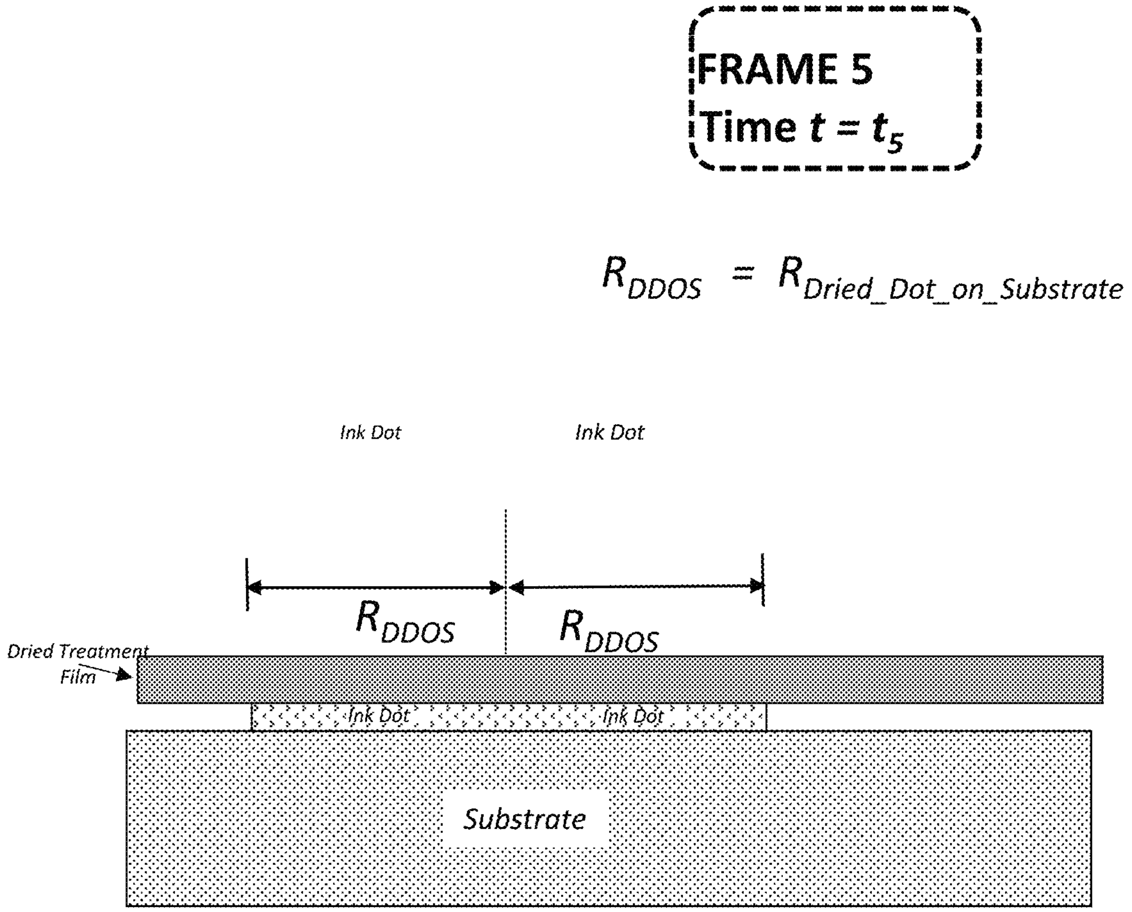

FIGS. 13A-13E schematically describe a process whereby an ink droplet is deposited on an ITM (e.g. a release surface thereof). In FIG. 13A, an ink droplet moves towards the ITM. FIGS. 13B-13C describe the ink droplet immediately after collision between (i) the droplet and (ii) the ITM (or the dried treatment film thereon). Kinetic energy of the droplet causes deformation of the droplet—this is illustrated in FIGS. 13B-13C. In particular, kinetic energy of the droplet causes the droplet to expand outwards—FIG. 13C shows a maximum radius of the droplet upon impact—i.e. the maximum increase of the radius due to deformation caused by kinetic energy of the droplet. After the droplet reaches this maximum radius ("R upon impact" or "R max impact", used interchangeably), e.g. within 10 milliseconds of impact, due to kinetic energy-driven droplet deformation, the droplet (or a successor dot thereof since each droplet eventually becomes an ink dot upon drying—first the dot resides on the ITM (e.g. via the dried treatment film) as shown in FIG. 13D, and after transfer the ink droplet resides on substrate as shown in FIG. 13E). The droplet or dot successor thereof may further expand due to physicochemical forces or chemical interactions. This is a spreading phenomenon that is schematically illustrated by comparing FIG. 13C or 13D with 13B. Once again, it is noted that 13A-13E are schematic and there is no requirement that the deformed droplet will have the specific shapes illustrated in FIGS. 13A-13E.

Figure 14A:
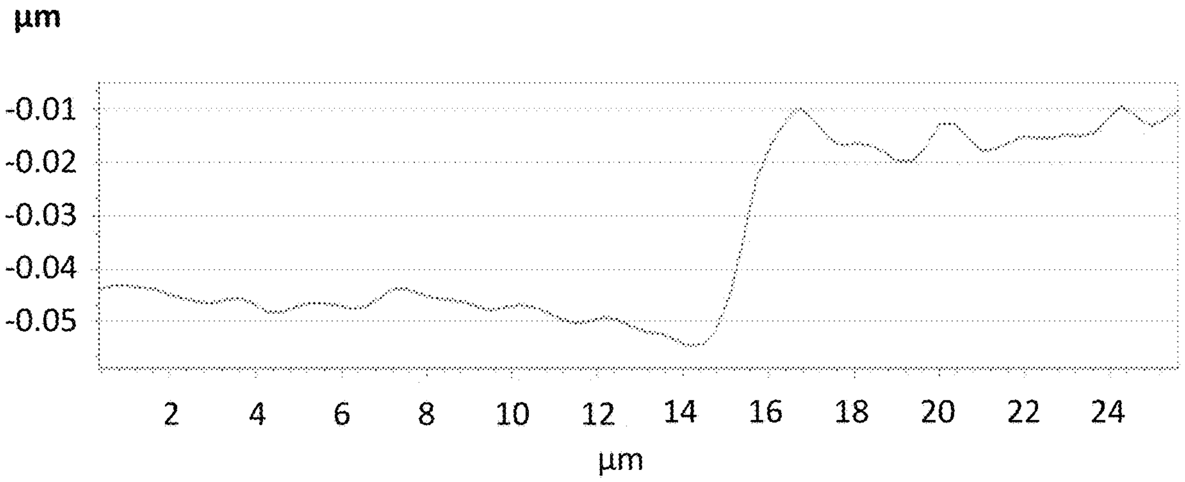
FIGS. 14A-14B provides an instrumentally plotted topographical profile of a dried treatment film, produced in accordance with the present invention.
Figure 14B:
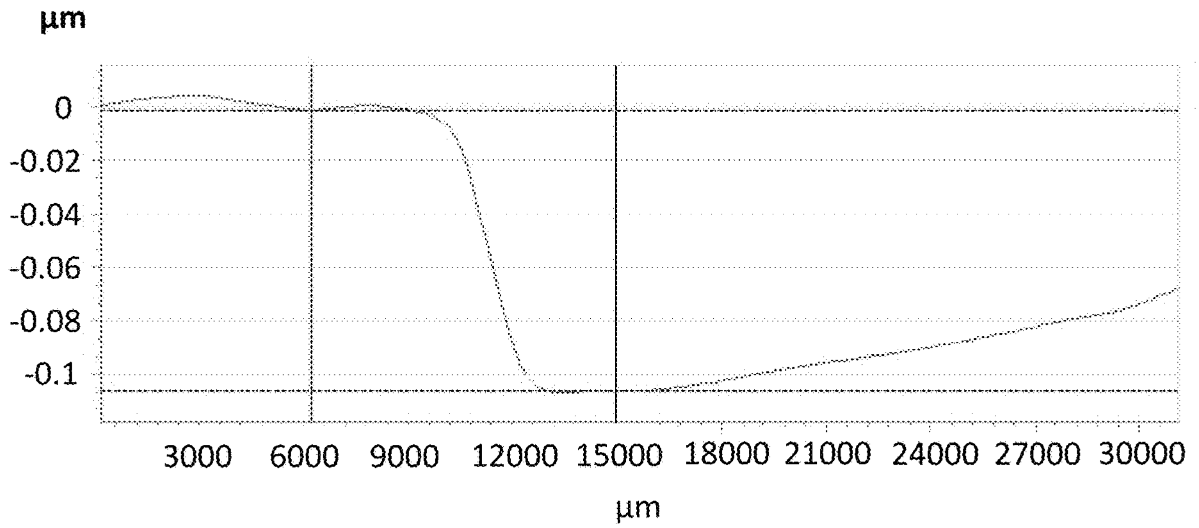

FIGS. 14A-14B provide an instrumentally plotted topographical profile of a dried treatment film, produced in accordance with embodiments of the present invention.

General Comment about FIGS. 2 and 12—In some embodiments, step S201 of FIG. 2 may be performed to provide any feature or combination of features of step S91 of FIG. 12. In some embodiments, step S205 of FIG. 2 may be performed to provide any feature or combination of features of step S95 of FIG. 12. In some embodiments, step S209 of FIG. 2 may be performed to provide any feature or combination of features of step S101 of FIG. 12. In some embodiments, step S213 of FIG. 2 may be performed to provide any feature or combination of features of step S105 of FIG. 12. In some embodiments, step S217 of FIG. 2 may be performed to provide any feature or combination of features of step S109 of FIG. 12. In some embodiments, step S221 of FIG. 2 may be performed to provide any feature or combination of features of step S113 of FIG. 12. In some embodiments, step S225 of FIG. 2 may be performed to provide any feature or combination of features of step S117 of FIG. 12.

FIGS. 14A-14B provide an instrumentally plotted topographical profiles of dried, continuous treatment films, produced in accordance with some embodiments of the present invention. The topographical profiles, produced by a Zygo laser interferometer, display an average film thickness of approximately 40-50 nanometers (FIG. 14A) and approximately 100 nanometers (FIG. 14B), respectively. The film surface is exceptionally smooth, exhibiting an average roughness ($R_a$) of about 7 nanometers in FIG. 14A, and somewhat less in FIG. 14B. In other topographical profiles, an average film thickness of approximately 40 nanometers and an $R_a$ of about 5 nanometers have been observed.

Despite the thinness of the film (typically at most 120 nm, at most 100 nm, at most 80 nm, at most 70 nm, at most 60 nm, at most 50 nm, or at most 40 nm, and more typically, 30 to 100 nm, 40 to 100 nm, 40 to 80 nm, 40 to 70 nm, or 40 to 60 nm), the film is typically devoid of bare spots and defect-free, even over large areas of 20 $cm^2$, 50 $cm^2$, or 200 $cm^2$ and more.

Without wishing to be limited by theory, the inventors believe that the ultra-smooth surface of the dried treatment film enables the spreading of the ink dots to occur in an even and controlled manner, such that the formation of disadvantageous rivulets and the like is appreciably mitigated or averted. The resulting ink dot shape is fairly similar in quality to the superior shape (convexity, roundness, edge sharpness) attained in Landa Corporation's Application No. PCT/IB2013/000840, which is incorporated by reference, for all purposes, as if fully set forth herein. This is particularly surprising in view of the spreading mechanism utilized by the present disclosure, as compared with the surface-tension controlled drop pinning and contraction disclosed in that application.

Figure 15A:
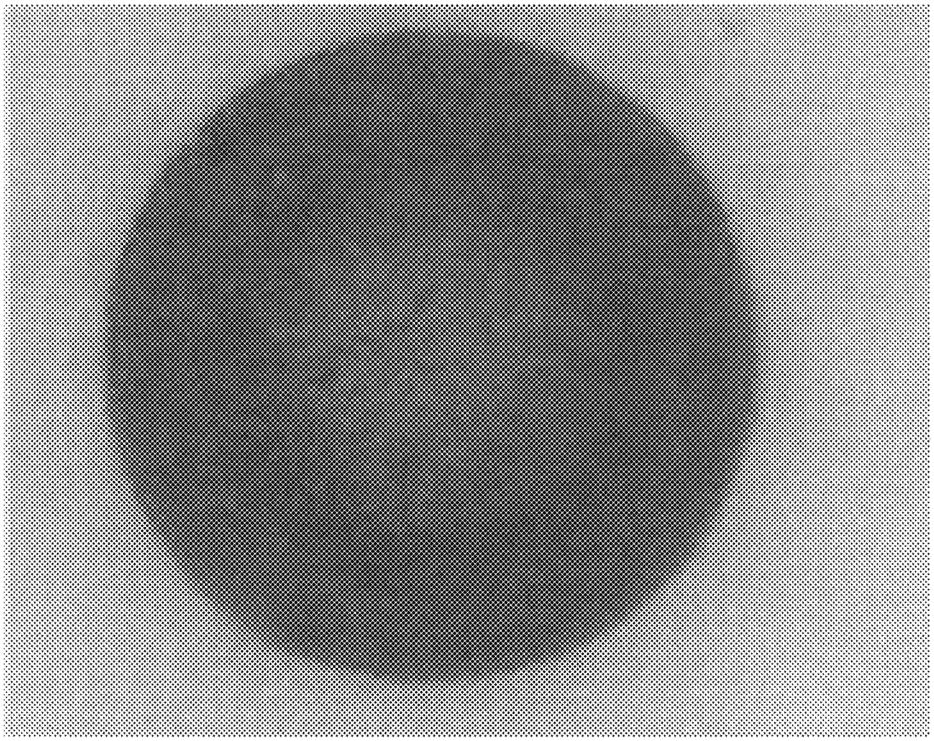
FIGS. 15A-15D illustrate some examples of ink dots on paper substrates.
Figure 15B:
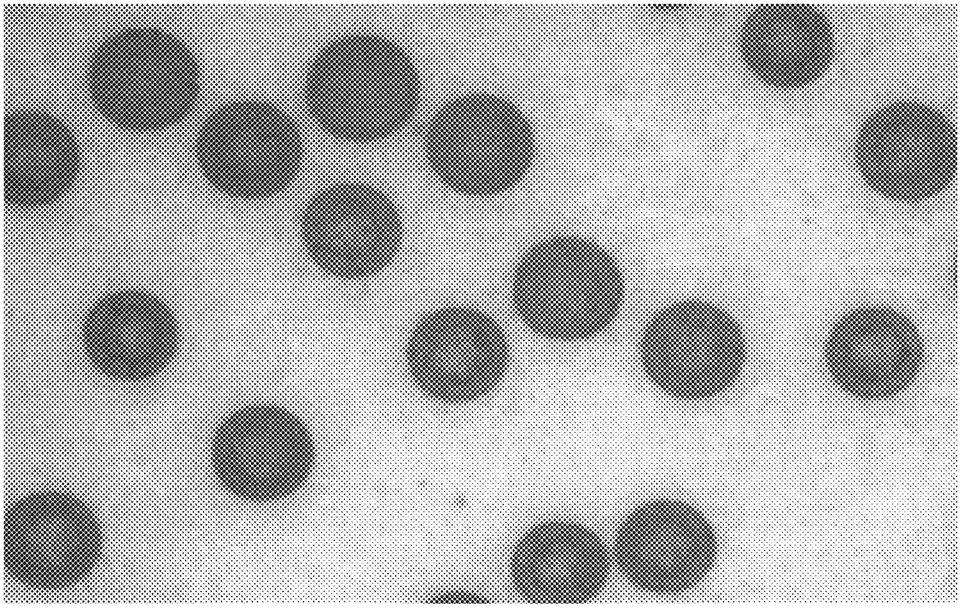
Figure 15C:
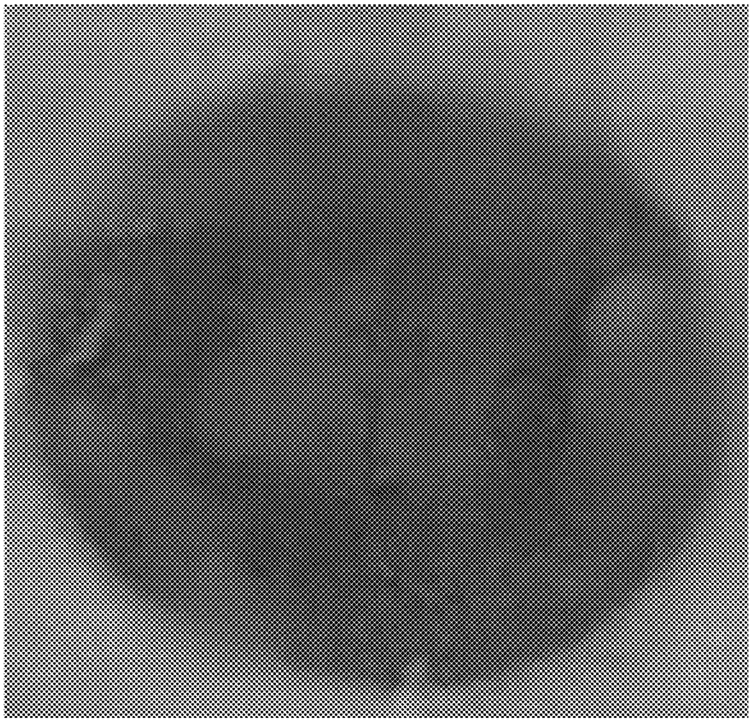
Figure 15D:
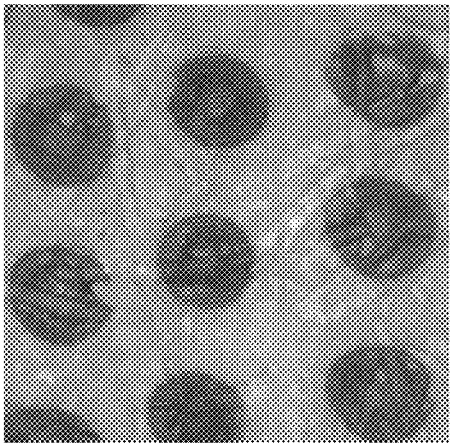

FIGS. 15A-15D illustrate some examples of ink dots on paper substrates. In particular, FIG. 15A provides a top view of a magnified image of a single ink dot adhering to a coated paper substrate (130 GSM), after having been ink-jetted onto an ITM, and transferred therefrom, according to embodiments of the present invention; FIG. 15B provides a top view of a magnified image of a plurality of inkjet ink dots disposed within a field of view on a coated paper substrate (130 GSM), in accordance with embodiments of the present invention; FIG. 15C provides a top view of a magnified image of a single ink dot adhering to an uncoated paper substrate, after having been ink-jetted onto an ITM, and transferred therefrom, according to embodiments of the present invention; FIG. 15D provides a top view of a magnified image of a plurality of inkjet ink dots disposed within a field of view on an uncoated paper substrate, in accordance with embodiments of the present invention.

Dot and convexity measurements were performed according to the procedures disclosed by PCT/IB2013/000840. In addition, dot and convexity measurements were performed substantially as described hereinbelow:

Image Acquisition Method

The acquisition of the dot images was performed using an LEXT (Olympus) OLS3000 microscope. The images were taken with an ×100 and ×20 optical zoom. The color images were saved in uncompressed format (Tiff) having a resolution of 640×640 pixels.

In addition, in order to measure the dot thickness and diameter, a ZYGO microscope having a ×100 lens was used.

About the Analysis

The basic parameters of interest (and their units) included in this work are:

Diameter—fit to a circle [$D_{dot}$] [mic]

Perimeter [P] [mic]

Measured area [A] [pix^2]

Minimal convex shape area [CSA] [pix^2]

Optical uniformity [STD] [8 bit tone value]

Thickness [Hdot] [mic]

From these parameters, the following were calculated:

Aspect ratio: Raspect=Ddot/Hdot [dimensionless]

Dot Roundness: ER=P2/(4π·A) [dimensionless]

DRdot: ER-1 [dimensionless]

Convexity: CX=AA/CSA [dimensionless]

Non-convexity: Dcdot=1−CX [dimensionless]

The analysis was done using the MATLAB image processing tool, utilizing, where possible, the above-referenced analysis procedure applied in WO2013/132418.

Blanket

The ITM may be manufactured in the inventive manner described by FIGS. 17-22 and in the description associated therewith. Such an ITM may be particularly suitable for the Nanographic Printing™ technologies of Landa Corporation.

Figure 16:
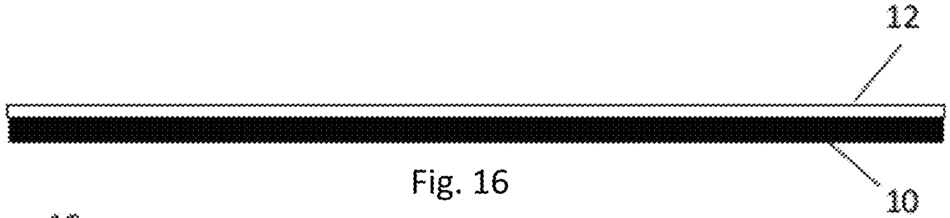
FIG. 16 schematically shows a section through a carrier.

With reference now to FIG. 16, FIG. 16 schematically shows a section through a carrier 10. In all the drawings, to distinguish it from the layers that form part of the finished article, the carrier 10 is shown as a solid black line. Carrier 10 has a carrier contact surface 12.

In some embodiments, carrier contact surface 12 may be a well-polished flat surface having a roughness ($R_a$) of at most about 50 nm, at most 30 nm, at most 20 m, at most 15 nm, at most 12 nm, or more typically, at most 10 nm, at most 7 nm, or at most 5 nm. In some embodiments, carrier contact surface 12 may between 1 and 50 nm, between 3 and 25 nm, between 3 and 20 nm, or between 5 nm and 20 nm.

The hydrophilic properties of the carrier contact surface 12 are described hereinbelow.

In some embodiments, carrier 10 may be inflexible, being formed, for example, of a sheet of glass or thick sheet of metal.

In some embodiments, carrier 10 may advantageously be formed of a flexible foil, such as a flexible foil mainly consisting of, or including, aluminum, nickel, and/or chromium. In one embodiment, the foil is a sheet of aluminized PET (polyethylene terephthalate, a polyester), e.g., PET coated with fumed aluminum metal. The top coating of aluminum may be protected by a polymeric coating, the sheet typically having a thickness of between 0.05 mm and 1.00 mm so as to remain flexible but difficult to bend through a small radius, so as to avert wrinkling.

In some embodiments, carrier 10 may advantageously be formed of an antistatic polymeric film, for example, a polyester film such as PET. The anti-static properties of the antistatic film may be achieved by various means known to those of skill in the art, including the addition of various additives (such as an ammonium salt) to the polymeric composition.

Figure 17:
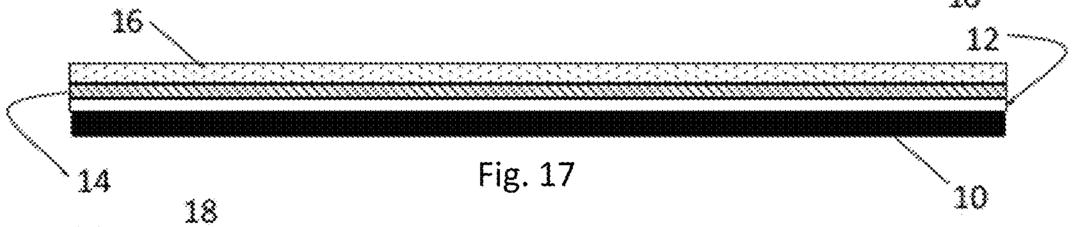
FIGS. 17 to 21 schematically exhibit different stages in the manufacture of an ITM, according to the present method.

In a step of the present ITM manufacturing method, the results of which are shown in FIG. 17, a fluid first curable composition (illustrated as 36 in FIG. 24B) is provided and a layer 16 is formed therefrom on carrier contact surface 12, layer 16 constituting an incipient release layer having an outer ink-transfer surface 14.

The fluid first curable composition of layer 16 may include an elastomer, typically made of a silicone polymer, for example, a polydimethylsiloxane, such as a vinyl-terminated polydimethylsiloxane.

In some embodiments, the fluid first curable material includes a vinyl-functional silicone polymer, e.g., a vinyl-silicone polymer including at least one lateral vinyl group in addition to the terminal vinyl groups, for example, a vinyl-functional polydimethyl siloxane.

In some exemplary embodiments, the fluid first curable material includes a vinyl-terminated polydimethylsiloxane, a vinyl-functional polydimethylsiloxane including at least one lateral vinyl group on the polysiloxane chain in addition to the terminal vinyl groups, a crosslinker, and an addition-cure catalyst, and optionally further includes a cure retardant.

As is known in the art, the curable adhesive composition may include any suitable amount of addition cure catalyst, typically at most 0.01% of the pre-polymer, on a per mole basis.

Exemplary formulations for the fluid first curable material are provided hereinbelow in the Examples.

Figure 24A:
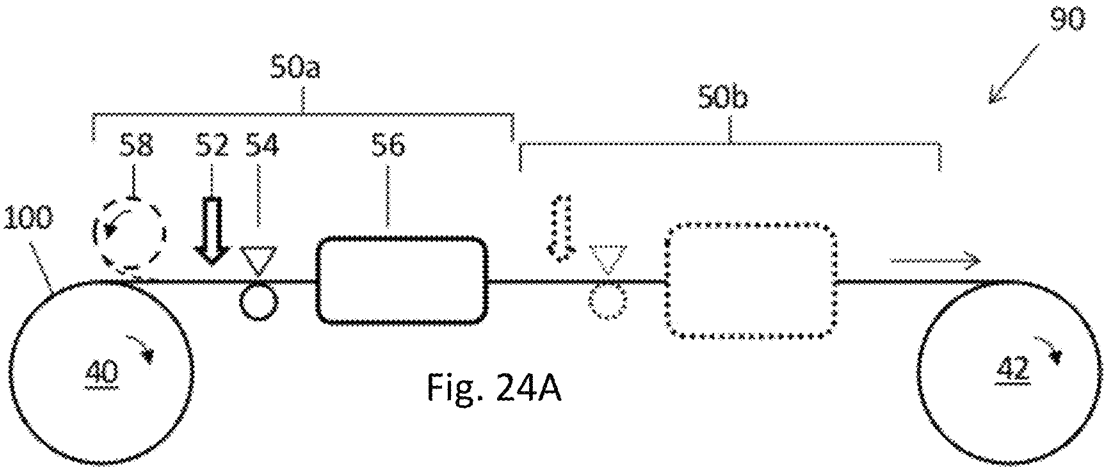
FIGS. 24A to 24D schematically display an apparatus in which some embodiments of the present method can be implemented, different manufacturing stages being illustrated.
Figure 24B:
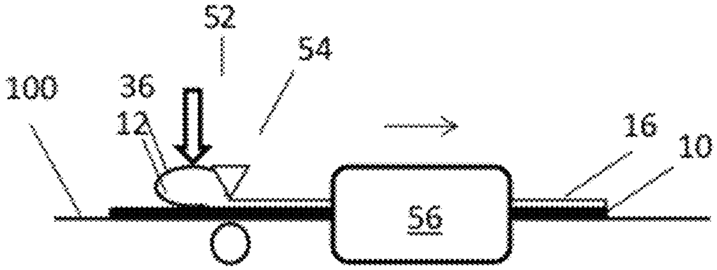

Layer 16 of the fluid first curable composition is applied to carrier contact surface 12, and is subsequently cured. Layer 16 may be spread to the desired thickness using, for example, a doctor blade (a knife on a roll), without allowing the doctor blade to contact the surface that will ultimately act as the ink-transfer surface 14 of the ITM, such that imperfections in the doctor blade will not affect the quality of the finished product. After curing, "release" layer 16 may have a thickness of between about 2 micrometers and about 200 micrometers. An apparatus in which such step and method can be implemented is schematically illustrated in FIGS. 24A and 24B.

For example, the above-detailed release layer formulation may be uniformly applied upon a PET carrier, leveled to a thickness of 5-200 micrometers (μ), and cured for approximately 2-10 minutes at 120-130° C. Surprisingly, the hydrophobicity of the ink transfer surface of the release layer so prepared, as assessed by its receding contact angle (RCA) with a 0.5-5 microliter (μl) droplet of distilled water, may be around 60°, whereas the other side of the same release layer (which served to approximate the hydrophobicity of a layer conventionally prepared with an air interface) may have an RCA that is significantly higher, typically around 90°. PET carriers used to produce ink-transfer surface 14 may typically display an RCA of around 40° or less. All contact angle measurements were performed with a Contact Angle analyzer—Krüss™ "Easy Drop" FM40Mk2 and/or a Dataphysics OCA15 Pro (Particle and Surface Sciences Pty. Ltd., Gosford, NSW, Australia).

Figure 18:
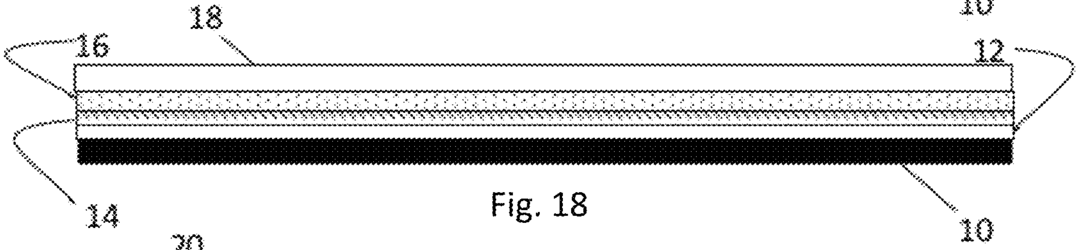

In a subsequent step of the method, the results of which are shown in FIG. 18, an additional layer 18, referred to as a compliance layer, is applied to layer 16, on the side opposite to ink-transfer surface 14. Compliance layer 18 is an elastomeric layer that allows layer 16 and its outermost surface 14 to follow closely the surface contour of a substrate onto which an ink image is impressed. The attachment of compliance layer 18 to the side opposite to ink-transfer surface 14 may involve the application of an adhesive or bonding composition in addition to the material of compliance layer 18. Generally, compliance layer 18 may typically have a thickness of between about 100 micrometers and about 300 micrometers or more.

While compliance layer 18 may have the same composition as that of release layer 16, material and process economics may warrant the use of less expensive materials. Moreover, compliance layer 18 typically is selected to have mechanical properties (e.g., greater resistance to tension) that differ from release layer 16. Such desired differences in properties may be achieved, by way of example, by utilizing a different composition with respect to release layer 16, by varying the proportions between the ingredients used to prepare the formulation of release layer 16, and/or by the addition of further ingredients to such formulation, and/or by the selection of different curing conditions. For instance, the addition of filler particles may favorably increase the mechanical strength of compliance layer 18 relative to release layer 16.

In some embodiments, compliance layer 18 may include various rubbers. Preferably such rubbers are stable at temperatures of at least 100° C., and may include rubbers such as alkyl acrylate copolymer rubbers (ACM), methyl vinyl silicone rubber (VMQ), ethylene propylene diene monomer rubber (EPDM), fluoroelastomer polymers, nitrile butadiene rubber (NBR), ethylene acrylic elastomer (EAM), and hydrogenated nitrile butadiene rubber (HNBR).

As a non-limiting example, Silopren® LSR 2530 (Momentive Performance Materials Inc., Waterford NY), a two-component liquid silicone rubber, in which the two components are mixed at a 1:1 ratio, was applied to the cured release layer 16 previously described. The silicone rubber mixture was metered/leveled with a knife blade to obtain an incipient compliance layer 18 having a thickness of about 250 micrometers, which was then cured for approximately 5 minutes at 150-160° C.

Figure 19:
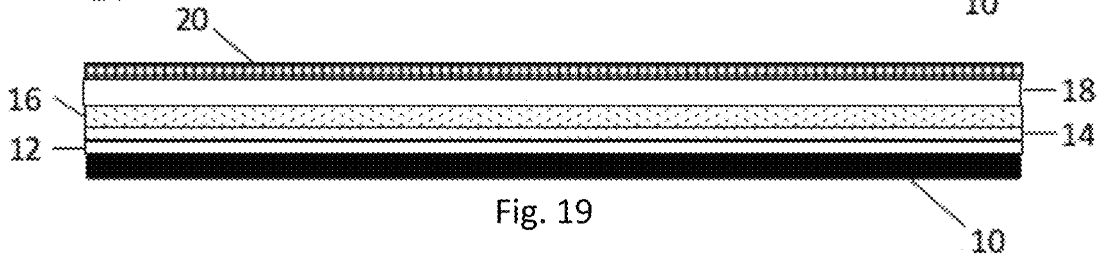

In a subsequent step of the method, the results of which are shown in FIG. 19, a reinforcement layer or support layer 20 is constructed on compliance layer 18. Support layer 20 typically contains a fiber reinforcement, in the form of a web or a fabric, to provide support layer 20 with sufficient structural integrity to withstand stretching when the ITM is held in tension in the printing system. Support layer 20 is formed by coating the fiber reinforcement with a resin that is subsequently cured and remains flexible after curing.

Alternatively, support layer 20 may be separately formed as a reinforcement layer, including such fibers embedded and/or impregnated within the independently cured resin. In this case, support layer 20 may be attached to compliance layer 18 via an adhesive layer, optionally eliminating the need to cure the support layer 20 in situ. Generally, support layer 20, whether formed in situ on compliance layer 18 or separately, may have a thickness of between about 100 micrometers and about 500 micrometers, part of which is attributed to the thickness of the fibers or the fabric, which thickness generally varies between about 50 micrometers and about 300 micrometers. However, the support layer thickness is not limiting. For heavy-duty applications, by way of example, the support layer may have a thickness of more than 200 micrometers, more than 500 micrometers, or 1 mm or more.

For example, to the multi-layered ITM structure described herein, including a vinyl-functionalized release coating 16 and a two-component silicone rubber compliance layer 18, was applied a support layer 20 including woven fabric of glass fibers. The glass fiber fabric, having a thickness of about 100 micrometers, was a plain weave fabric having 16 yarns/cm in perpendicular directions. The glass fiber fabric was embedded into a curable fluid including a liquid silicone rubber Silopren® LSR 2530 corresponding to the compliance layer. Overall, the resulting support layer 20 had a thickness of about 200 micrometers and was cured at 150° C. for approximately 2-5 minutes. Preferably, more dense weave fabrics (e.g., having 24×23 yarns/cm) may be used.

Figure 20:
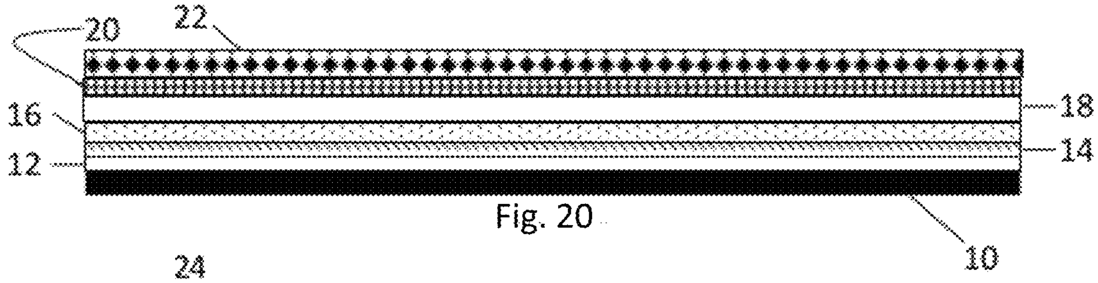
Figure 21:
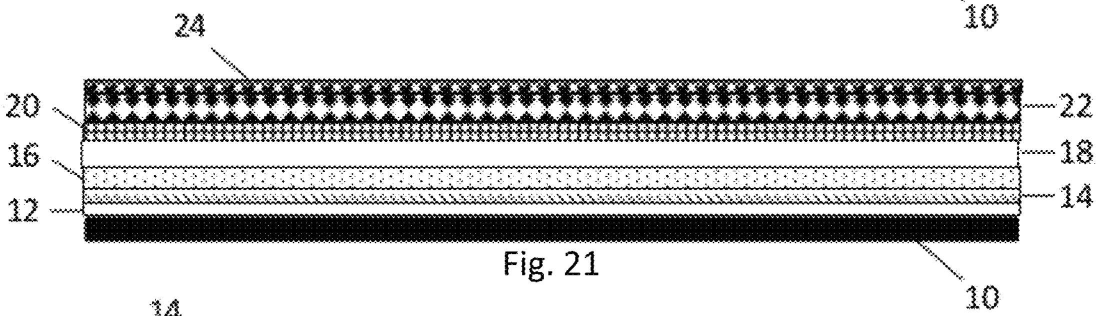

Following the in situ formation, or attachment, of support layer 20, additional layers may be built up on the reverse side thereof, as required. FIG. 20 shows an optional felt blanket 22 secured (e.g., by a cured adhesive or resin) to the reverse side of support layer 20, and FIG. 21 shows a high friction layer 24 coated onto the reverse side of blanket 22. As will be appreciated by persons skilled in the art, various relatively soft rubbers may serve for the preparation of a layer having high friction properties, silicone elastomers being but an example of such rubbers. In the absence of an intervening layer such as blanket 22, high friction layer 24 may be attached directly to support layer 20.

Figure 23A:
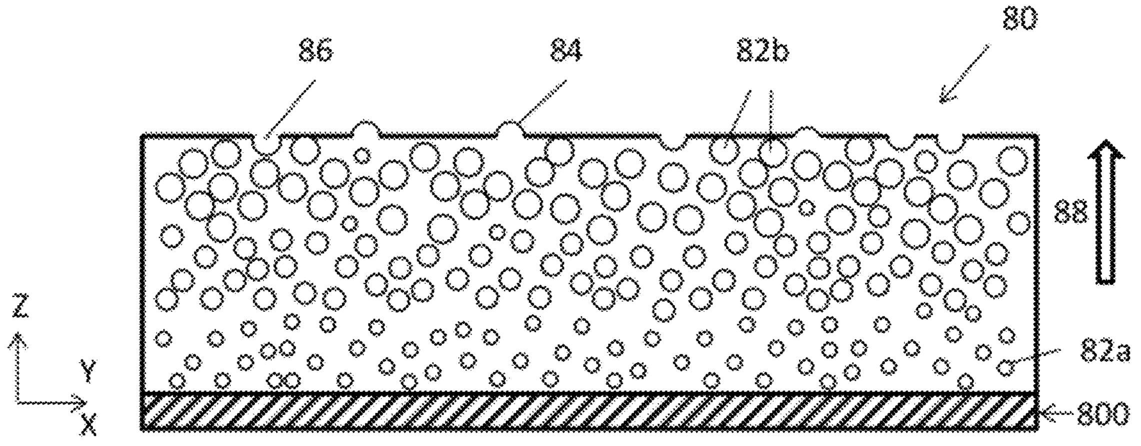
Fig. 23A Prior Art
FIGS. 23A and 23B schematically illustrate a cross section through a release layer prepared according to the prior art.
Figure 23B:
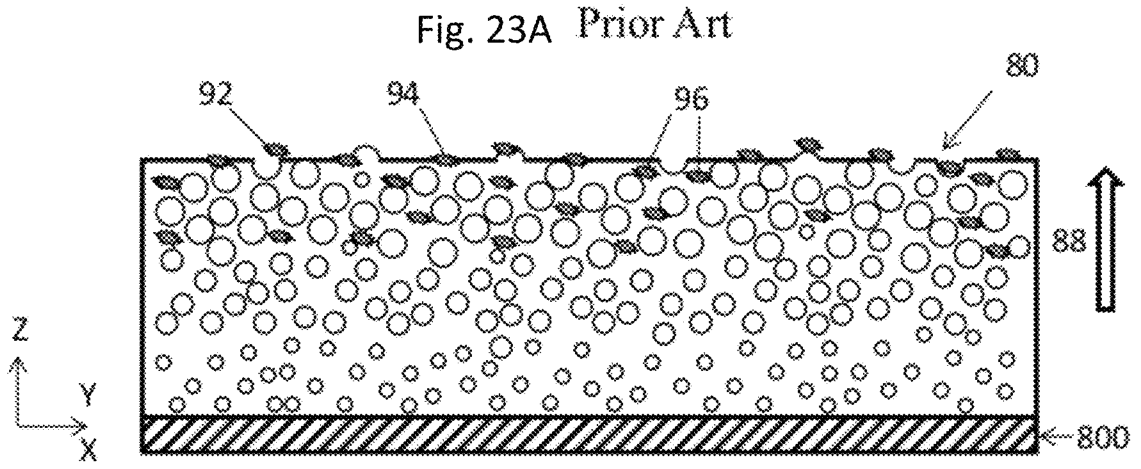
Fig. 23B Prior Art
Figure 23C:
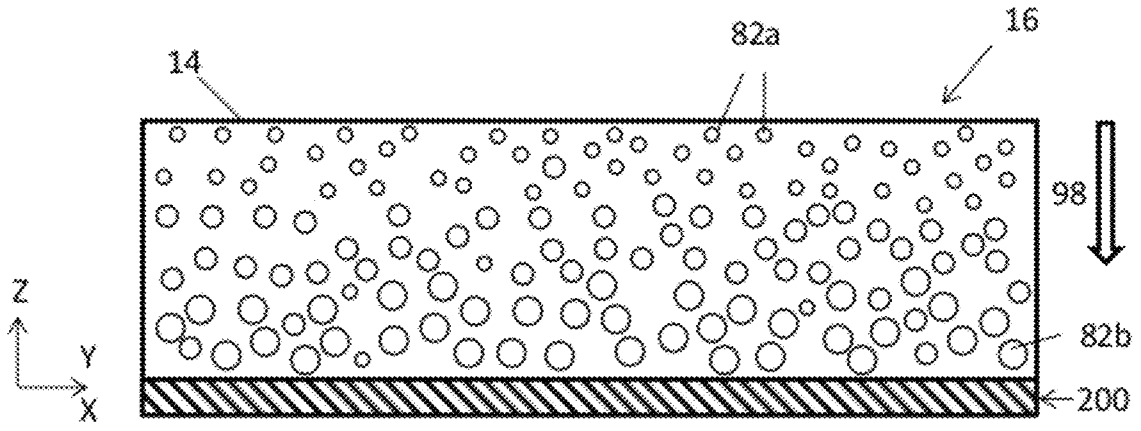
FIG. 23C schematically illustrates a cross section through a release layer prepared according to the present method.

As mentioned, all layers (e.g., 18, 20, 22, 24, or any intervening adhesive or priming layer and the like) added to the release layer of the ITM jointly form the base of the structure, as shown with respect to base 200 in FIG. 23C.

Figure 22:
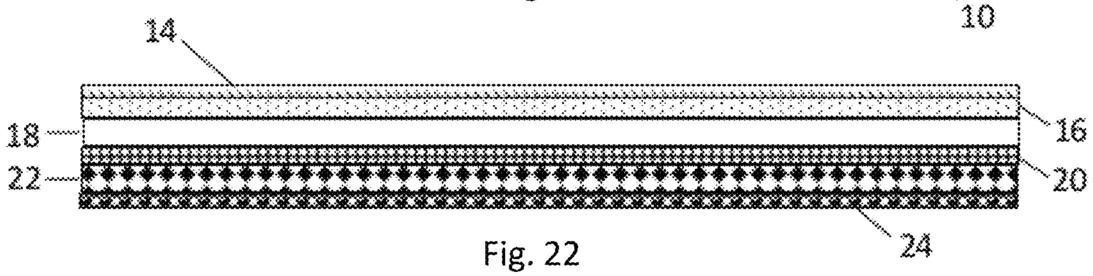
FIG. 22 is a section through a finished ITM after installation in a printing system.

Before the ITM is used, it is necessary to remove carrier 10 to expose ink-transfer surface 14 of release layer 16, as illustrated in FIG. 22. Typically, the finished product can simply be peeled away from carrier 10.

If the carrier 10 is a flexible foil, it may be preferred to leave it in place on the ITM until such time as the ITM is to be installed into a printing system. The foil will act to protect the ink-transfer surface 14 of the ITM during storage, transportation and installation. Additionally, carrier 10 can be replaced, following completion of the manufacturing process, by an alternative foil that is suitable as a protective film.

FIGS. 24A to 24D schematically illustrate an apparatus 90 in which the ITM may be manufactured. FIG. 24A provides a schematic overview of such an apparatus 90 having an unwinding roller 40 and a winding roller 42 moving a flexible loop conveyor 100. Along the path followed by conveyor 100 can be positioned a dispensing station 52, able to dispense curable fluid compositions suitable for the desired ITMs, a leveling station 54, able to control the thickness of the curable layer as it moves downstream of the station, and a curing station 56, able to at least partially cure the layer enabling it to serve as incipient layer for a subsequent step, if any. The dispensing station 52, the leveling station 54 and the curing station 56 constitute a layer forming station 50*a*. As illustrated by 50*b*, apparatus 90 may optionally include more than one layer forming station. Furthermore, a forming station 50 may include additional sub-stations, illustrated by a dispensing roller 58 in station 50*a*.

In some embodiments, the need for loop conveyor 100 is obviated: carrier 10 is directly tensioned between rollers 40 and 42. Unprocessed carrier 10 is unwound from unwinding roller 40, and after passing through stations 50*a* and 50*b*, is rewound onto winding roller 42.

Though not illustrated in the figure, the apparatus may further include upstream of the dispensing station a "surface treatment" station facilitating the subsequent application of a curable composition, or its attachment to the carrier contact surface or incipient layer as the case may be. As mentioned in relation with the carrier, the optional surface treatment station (not shown) can be suitable for physical treatment (e.g., corona treatment, plasma treatment, ozonation, etc.).

FIG. 24B schematically illustrates how in a forming station 50 of apparatus 90, a carrier 10 placed on conveyor 100 can be coated. At dispensing station 52, the curable composition 36 of release layer 16 is applied to carrier contact surface 12. As carrier 10 is driven in the direction of the arrow, the curable composition 36 is leveled to a desired thickness at leveling station 54, for instance, by using a doctor blade. As the leveled layer proceeds downstream, it enters curing station 56, configured so as to at least partially cure curable composition 36, enabling the formation of incipient layer 16 at the exit side of the curing station. Such exemplary steps have been described in connection with FIGS. 16 and 17.

Figure 24C:
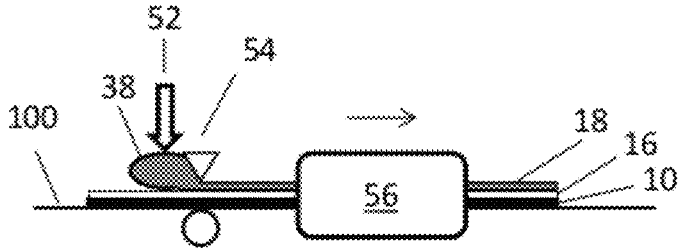
Figure 24D:
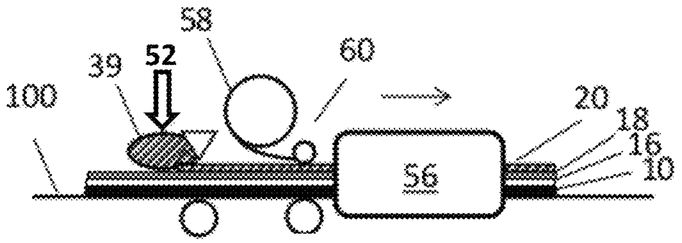

FIGS. 24C and 24D schematically illustrate how additional layers (forming the base) can be applied. In FIG. 24C, a curable composition 38 is dispensed at dispensing station 52 (which can be same or different than the station having served to coat the carrier with the release layer 16, as illustrated in FIG. 24B). Curable composition 38 is leveled to a desired thickness at leveling station 54, then enters curing station 56, and exits curing station 56 sufficiently cured to serve as incipient layer 18 for a subsequent step, and so on. Such an exemplary step has been described in connection with FIG. 18. With reference now to FIG. 24C, FIG. 24C schematically depicts a curable composition 39 being applied at dispensing station 52. The backbone of a support layer (e.g., a fabric) can be delivered by dispensing roller 58. The exemplary fabric can be submerged into the curable composition at a station 60 prior to their entry into curing station 56. In such a manner, a support layer 20 can be formed at the exit side of the curing station.

FIGS. 23A and 23B schematically illustrate how defects would appear in a section of an outer layer 80 (e.g., a release layer) prepared according to the above-described method of the art. FIG. 23A illustrates different phenomena relating to air bubbles, which may be entrapped in any curable composition if the curing occurs before such bubbles can be eliminated (e.g., by degassing). As can be seen in the figure, as tiny bubbles 82 migrate towards the air interface, the orientation of layer 80 during manufacturing over a body 800, hence the direction of migration, being indicated by an arrow, they can merge into larger bubbles. The bubbles, independently of their size, may either remain entrapped within the bulk of the layer or on its surface, the upper part of the bubbles envelope forming protrusions 84. When bubbles adjacent to the surface burst while the curing of the layer is advanced, craters 86 may remain, even if the segment of the envelope of the bubbles protruding from the surface has disappeared. These phenomena therefore typically provide a "gradient" of air bubbles, the upper sections being generally either populated by larger bubbles than the lower sections and/or having a higher density of bubbles per cross section area or per volume, lower and higher being relative to the orientation of the layer during its manufacturing. The impact of bubbles-derived defects on the surface is self-evident, the heterogeneity of the surface typically negatively affecting any subsequent interplay, for instance with an ink image. With time, such ITM being typically operated under tension and/or under pressure, craters may widen and merge to form more significant fissures. Thus, such phenomena may affect the structural integrity of the surface and any mechanical property such integrity would have conferred to the ITM.

FIG. 23B schematically illustrates different phenomena relating to solid contaminants, such as dust. Though in the present illustration, the dust is represented as being in addition to air bubbles, this need not be necessarily the case, each such surface or layer defect able to occur independently. As can be seen in the figure, solid contaminants may remain upon the surface. If the settling of contaminants occurs after the outer layer 80 is cured, then such contaminants 92 may even be removed by suitable cleaning of the outer surface. Still, such a phenomenon is undesirable, as it would require additional processing of such an ITM before being able to use it. If such contaminations occur while the layer is still uncured, then the contaminants can be either entrapped on the surface of layer 80, (e.g., contaminant 94, which appears to be "floating"), or can even be submerged within the release layer, (e.g., contaminant 96). As can be readily understood, larger/heavier contaminants may sink more deeply than smaller ones.

Unlike methods known in the art, the method disclosed herein includes forming a layer of a fluid first curable material with one side of the layer contacting a carrier contact surface, the layer constituting an incipient release layer. The carrier contact surface functions to protect the incipient release layer, giving the ink transfer layer desired properties, while the carrier acts as a physically robust support structure onto which other layers are added to form the ITM, until the ITM is complete. As a result, many potential sources of defect are avoided. Moreover, the finish of the ink transfer surface is primarily, if not exclusively, determined by the carrier contact surface.

FIG. 23C schematically illustrates a section through an outer layer 16 (e.g., a release layer) prepared according to the present method. For comparison with previous drawings, the section is shown without a carrier and in the same orientation as FIGS. 23A and 23B, though the manufacturing is performed in inversed orientation as shown by the arrow. The base 200, which, as shall be detailed hereinafter, is attached to the first outer layer 16 after the layer is at least partially cured, is therefore not equivalent to body 800 already serving as support during the manufacturing process. For the sole sake of illustration, layer 16 is represented as including an important number of bubbles 82, but this need not be the case. However, if present, such bubbles would display a distinct pattern than those previously described. First, as the now uppermost ink transfer surface 14 of layer 16 was previously in contact with a carrier, no protrusions can be observed, the release layer being therefore devoid of phenomena such as previously illustrated by surface protruding bubbles 84. Likewise, craters previously illustrated as cavities 86 are very unlikely, as they would imply using an incompatible curable layer and carrier. As according to the present method, the curable material due to form the outer layer is to suitably wet the carrier, it is believed that substantially no air bubbles can be entrapped between the carrier and the incipient layer formed thereon. Thus, if at all present, such bubbles would be disposed in the bulk of the layer. However, as the manufacturing is performed in inverted orientation as compared to conventional methods, the gradient of bubbles would, for the same reason, be inverted. Thus, and as depicted in FIG. 23C, tiny bubbles would be closer to the outer surface than larger bubbles, which would be closer to the base.

The inventive release layer structures of the present invention, produced from addition-cure formulations, may contain substantially no functional groups, or an insubstantial amount (e.g., an insubstantial amount of OH groups), covalently attached within the polymer matrix. Such functional groups may include moieties such as C═O, S═O, and OH, by way of example.

Because these release layer structures contain, at most, an insubstantial amount of such functional groups, it would be expected that the release layers thereof would be highly hydrophobic. The inventors have surprisingly found, however, that the release layer surfaces produced by the present method may actually be somewhat hydrophilic, and appreciably more hydrophilic than corresponding release layers, i.e., release layers having the same composition, but manufactured using the conventional curing technique in which the release layer is exposed to air ("standard air curing"). Without wishing to be bound by theory, the inventors believe that the intimate contact between the carrier contact surface and the incipient release layer surface, the somewhat hydrophilic properties of the carrier contact surface are induced in the release layer surface.

As discussed hereinabove, ITM release layers having low surface energies may facilitate transfer of the dried ink image to the printing substrate. However, during the ink reception stage, the aqueous ink drops jetted onto such a low-energy, hydrophobic release layer tend to bead after the initial impact, thereby compromising image quality. Higher-energy, less hydrophobic release layers may mitigate this effect, but are detrimental to image transfer quality. The inventors have found that the release layer structures of the present invention typically have release surfaces of characteristically moderated hydrophobicity, as manifested by receding contact angles for distilled water of at most 80°, or at most 70°, typically, at most 60°, or at most 50°, and more typically, 30°-60°, 35°-60°, 30°-55°, 30°-50°, 30°-45°, or 35°-50°. Surprisingly, however, both the ink reception and the transfer of the dry, heated ink image may be of good quality. It must be emphasized that yet lower values of the receding contact angle (and the dynamic contact angle discussed hereinbelow) may be achieved by employing carrier surfaces having higher hydrophilicity (lower contact angles with respect to drops of distilled water), and/or by corona (or similar) treatment.

Without wishing to be bound by theory, the inventors believe that the above-described induced surface properties improve the interactions between polar groups (e.g., O—Si—O) on the release layer surface and corresponding polar moieties (e.g., OH groups in the water) in the aqueous liquids (e.g., aqueous inkjet inks) deposited thereon, thereby contributing to the reception of the jetted ink drops. Subsequently, after drying the ink and heating of the ink film to transfer temperatures, these interactions are weakened, enabling complete transfer of the dry or substantially dry ink image. Thus, the performance of the inventive release layer structure—at both the ink reception stage and the ink film transfer stage—is appreciably better than would have been expected for a release layer having moderate hydrophobicity, but devoid of the special surface structure and properties induced by the carrier contact surface.

EXAMPLES

Reference is now made to the following examples, which together with the above descriptions, illustrate the invention in a non-limiting fashion.

List of Materials Used:

| Ingredient | Supplier | CAS Number | Description |
|---|---|---|---|
| DMS-V35 Resin | Gelest | 68083-19-2 | Vinyl terminated polydimethyl siloxane<br>Viscosity 5,000 mPa · s<br>MW ~49,500<br>Vinyl ~0.018-0.05 mmol/g |
| VQM-146 Resin | Gelest | 68584-83-8 | 20-25% Vinyl resin in DMS V46<br>Viscosity 50,000-60,000 mPa · s<br>Vinyl ~0.18-0.23 mmol/g |
| Inhibitor 600 Cure Retardant | Evonik | 204-070-5 | Mix of divinylpolydimethylsiloxane and 2-methylbut-3-yn-2-ol<br>Viscosity 900 mPa · s<br>Vinyl 0.11 mmol/g |
| SIP6831.2 Catalyst | Gelest | 68478-92-2 | Platinum divinyltetramethyldisiloxane<br>Platinum 2.1-2.4% |
| Polymer RV 5000 (XPRV 5000) Resin | Evonik | | Vinyl-functional polydimethyl siloxanes<br>Viscosity 3000 mPa · s<br>Vinyl 0.4 mmol/g |
| Crosslinker 100 Crosslinker | Evonik | | Polydimethyl siloxanes including SiH groups in the polymer chain<br>Hydride 7.8 mmol/g |
| HMS-301 Crosslinker | Gelest | 68037-59-2 | Poly(dimethylsiloxane-co-methyl-hydrosiloxane), trimethylsilyl terminated<br>Hydride 4.2 mmol/g |
| Silsurf A010-D-UP Additive | Siltech | 134180-76-0 | polyether siloxane copolymer |
| SilGrip SR 545 Functional MQ resin | Momentive | 56275-01-5 | Silicone-based resin containing "MQ" groups Viscosity 11 mPa · s |
| Aluminized PET | Hanita Ltd. | NR | Aluminized polyester film |
| Skyroll SH 92 | SKC Inc. | NR | Anti-static polyester film |
| Skyroll SH 76 | SKC Inc. | NR | Untreated polyester film |

The carriers used as substrates in the production of the release layer surface include (1) an anti-static polyester film (Examples 1-7); (2) an untreated polyester film i.e., not anti-static (Example 11); and (3) an aluminized polyester film (Example 10).

Example 1

The ITM release layer of Example 1 had the following composition (wt./wt.):

| Name | Parts |
|---|---|
| DMS-V35 | 70 |
| XPRV-5000 | 30 |
| VQM-146 | 40 |
| Inhibitor 600 | 5 |
| SIP6831.2 | 0.1 |
| Crosslinker HMS-301 | 12 |

The release layer was prepared substantially as described in the present blanket preparation procedure, provided below.

Blanket Preparation Procedure (for Release Layers Cured Against a Carrier Surface)

All components of the release layer formulation were thoroughly mixed together. The desired thickness of the incipient release layer was coated on a PET sheet, using a rod/knife (other coating methods may also be used), followed by curing for 3 minutes at 150° C. Subsequently, Siloprene LSR 2530 was coated on top of the release layer, using a knife, to achieve a desired thickness. Curing was then performed at 150° C. for 3 minutes. An additional layer of Siloprene LSR 2530 was then coated on top of the previous (cured) silicone layer, and fiberglass fabric was incorporated into this wet, fresh layer such that wet silicone penetrated into the fabric structure. Curing was then performed at 150° C. for 3 minutes. A final layer of Siloprene LSR 2530 was then coated onto the fiberglass fabric and, once again, curing was performed at 150° C. for 3 minutes. The integral blanket structure was then cooled to room temperature and the PET was removed.

Example 2

The ITM release layer of Example 2 has the following composition:

| Component Name | Parts |
|---|---|
| DMS-V35 | 70 |
| XPRV-5000 | 30 |
| VQM-146 | 40 |
| Inhibitor 600 | 5 |
| SIP6831.2 | 0.1 |
| Crosslinker HMS-301 | 12 |
| Silsurf A010-D-UP | 5 |

The blanket was prepared substantially as described in Example 1.

Example 3

The ITM release layer of Example 3 has the following composition:

| Component Name | Parts |
|---|---|
| DMS-V35 | 70 |
| XPRV-5000 | 30 |
| VQM-146 | 40 |
| Inhibitor 600 | 5 |
| SIP6831.2 | 0.1 |
| Crosslinker 100 | 6.5 |
| Silsurf A010-D-UP | 5 |

The blanket was prepared substantially as described in Example 1.

Example 4

The ITM release layer of Example 4 has the following composition:

| Component Name | Parts |
|---|---|
| DMS-V35 | 100 |
| VQM-146 | 40 |
| Inhibitor 600 | 3 |
| SIP6831.2 | 0.1 |
| Crosslinker HMS-301 | 5 |

The blanket was prepared substantially as described in Example 1.

Example 5

The ITM release layer of Example 5 was prepared from Silopren® LSR 2530 (Momentive Performance Materials Inc., Waterford, NY), a two-component liquid silicone rubber, in which the two components are mixed at a 1:1 ratio. The blanket was prepared substantially as described in Example 1.

Example 6

The ITM release layer of Example 6 has a composition that is substantially identical to that of Example 4, but includes SR545 (Momentive Performance Materials Inc., Waterford, NY), a commercially available silicone-based resin containing polar groups. The polar groups are of the "MQ" type, where "M" represents $Me_3SiO$ and "Q" represents $SiO_4$. The full composition is provided below:

| Component Name | Parts |
|---|---|
| DMS-V35 | 100 |
| VQM-146 | 40 |
| SR545 | 5 |
| Inhibitor 600 | 3 |
| SIP6831.2 | 0.1 |
| Crosslinker HMS-301 | 5 |

The blanket was prepared substantially as described in Example 1.

Example 7

The ITM release layer of Example 7 has a composition that is substantially identical to that of Example 6, but includes polymer RV 5000, which includes vinyl-functional polydimethyl siloxanes having a high density of vinyl groups, as described hereinabove. The full composition is provided below:

| Component Name | Parts |
|---|---|
| DMS-V35 | 70 |
| RV 5000 | 30 |
| VQM-146 | 40 |
| Inhibitor 600 | 5 |
| SIP6831.2 | 0.1 |
| Crosslinker HMS-301 | 12 |
| SR545 | 5 |

The blanket was prepared substantially as described in Example 1.

Comparative Examples 1A-1F

ITM release layers were prepared as "corresponding release layers" or "reference release layers" to the compositions of Examples 1-6, such that the corresponding release layers (designated Comparative Examples 1A-1F) had the identical compositions as Examples 1-6, respectively. However, during the curing of the release layer, the release layer surface (or "ink reception surface") was exposed to air ("standard air curing"), according to a conventional preparation procedure, provided below.

Comparative Blanket Preparation Procedure (for Release Layers Exposed to Air During Curing)

A first layer of Siloprene LSR 2530 was coated on a PET sheet, using a rod/knife, followed by curing for 3 min at 150° C., to achieve the desired thickness. An additional layer of Siloprene LSR 2530 was then coated on top of the previous (cured) silicone layer, and fiberglass fabric was incorporated into this wet, fresh layer such that wet silicone penetrated into the fabric structure. Siloprene LSR 2530 was then coated on top of the fiberglass fabric, and curing ensued at 150° C. for 3 minutes. Prior to forming the incipient release layer, all components of the release layer formulation were thoroughly mixed together. The release layer was coated on top of cured Siloprene LSR 2530 to achieve the desired thickness, and was subsequently cured at 150° C. for 3 minutes, while the release layer surface was exposed to air.

Example 8

Contact angles of drops of distilled water on release layer surfaces were measured using a dedicated Dataphysics OCA15 Pro contact angle measuring device (Particle and Surface Sciences Pty. Ltd., Gosford, NSW, Australia). The procedure used for performing the Receding Contact Angle (RCA) and Advancing Contact Angle (ACA) measurements is a conventional technique elaborated by Dr. Roger P. Woodward ("Contact Angle Measurements Using the Drop Shape Method", inter alia, www.firsttenangstroms.com/pdfdocs/CAPaper.pdf).

The results for Examples 1-6 are provided below, along with the results for the release layers produced according to Comparative Examples 1A-1F.

In virtually all cases, the release surfaces produced against the carrier surfaces exhibited lower Receding Contact Angles than the identical formulation, cured in air. More typically, the release surfaces produced against the carrier surfaces exhibited Receding Contact Angles that were lower by at least 5°, at least 7°, at least 10°, at least 12°, or at least 15°, or were lower within a range of 5°-30°, 7°-30°, 10°-30°, 5°-25°, 5°-22°, 7°-25°, or 10°-25°.

Example 9

The release surfaces produced in Examples 1-6 and the respective release surfaces produced in Comparative Examples 1A-1F were aged at 160° C. for 2 hours, to simulate the aging of the release layer under extended operating conditions. Receding Contact Angles were measured, and the results are provided below:

| | Release Surface vs. PET | | | Release Surface vs. Air | |
|---|---|---|---|---|---|
| Release formulation | RCA before aging | RCA after aging | Comparative release formulation | RCA before aging | RCA after aging |
| Example 1 | 75° | 80° | Comparative Example 1A | 95° | 95° |
| Example 2 | 45° | 60° | Comparative Example 1B | 65° | 65° |
| Example 3 | 40° | 50° | Comparative Example 1C | 63° | 65° |
| Example 4 | 65° | 62° | Comparative Example 1D | 79° | 75° |
| Example 5 | 70° | 74° | Comparative Example 1E | 80° | 80° |
| Example 6 | 56° | 70° | Comparative Example 1F | 74° | 70° |

With regard to the comparative examples, it is evident that the receding contact angle is substantially maintained after performing the aging process. With regard to inventive Examples 1-6, however, it is evident that the receding contact angle increases, typically by 4°-15°, after performing the aging process. Without wishing to be bound by theory, the inventors believe that the increase in contact angle in the inventive release layer structures may be attributed to a loss in hydrophilic behavior (or increased hydrophobic behavior) due to some change in the position of the polar groups (e.g., Si—O—Si) at the release layer surface.

Example 10

A blanket including a release layer of the composition of Example 2 was prepared substantially as described in Example 1, but against an aluminized PET carrier surface.

Example 11

A release layer having the release layer composition of Example 2 was prepared substantially as described in Example 1, but against a commercially available PET carrier surface that was not subjected to an anti-static pre-treatment.

Example 12

The release layers produced in Examples 2, 10, and 11, in accordance with the present invention, were subjected to contact angle measurements, to determine both the advancing contact angle and the receding contact angle. The results are provided below:

| Release formulation | Carrier film | RCA vs. Carrier |
|---|---|---|
| Example 10 | Aluminized PET | 62° |
| Example 11 | PET without anti-static treatment | 62° |
| Example 2 | PET with anti-static treatment | 45° |

Examples 10 and 11 exhibited receding contact angles that were about 30° less than the receding contact angle of the same composition cured with the release layer exposed to air. The release layer surface of Example 2, prepared against an anti-static PET carrier surface, displayed a receding contact angles that was about 50° less than the receding contact angle of the same composition prepared while exposed to air.

Example 13

The carrier surfaces utilized in Examples 2, 10, and 11 were subjected to contact angle measurements, to determine both the advancing contact angle and the receding contact angle. The results are provided below:

| | CA of carrier | |
|---|---|---|
| Carrier film | ACA | RCA |
| Aluminized PET | 80° | 40° |
| PET without antistatic treatment | 70° | 40° |
| PET with antistatic treatment | 40° | 20° |

It may be seen from the receding contact angles obtained that the three carrier surfaces exhibit hydrophilic behavior, and that the PET subjected to anti-static treatment exhibits the greatest degree of hydrophilic behavior (20° RCA vs. 40° RCA).

Significantly, the hydrophilic behavior of the carrier surfaces has been at least partially induced in the respective release surfaces: the formulation cured while exposed to air has an RCA of 65°; the same formulation, prepared against an antistatic PET surface, has an RCA of 45°; the anti-static PET carrier used displays an RCA of 20°. Thus, the inventive release layer structure has a release surface whose hydrophilicity/hydrophobicity properties lie in between the properties of the same formulation, cured in air, and the carrier surface itself.

Example 14

Release layer surface energies were calculated for ink reception surfaces of the following Examples: Example 1A, cured under exposure to air; Example 1, cured against an anti-static PET surface; and Example 1, cured against an anti-static PET surface and then subjected to the standard aging procedure at 160° C., for 2 hours. The three Examples have the identical chemical formulation.

For each of these examples, the total surface energy was calculated using the classic "harmonic mean" method (also known as the Owens-Wendt Surface Energy Model, see, by way of example, KRUSS Technical Note TN306e). The results are provided below:

| Release formulation | Total Surface Energy J/m$^2$ |
|---|---|
| Example 1A -- Air Cured | 20.9 |
| Example 1 -- Aged | 22.6 |
| Example 1 | 26.1 |

In Example 1A, cured under exposure to air, the release layer surface is extremely hydrophobic, and the total surface energy of the surface is low, 20.9 J/m$^2$, as expected. This is fairly close to the literature value for surface energy, for polydimethylsiloxane (PDMS). Significantly, Example 1, which was cured against an anti-static PET surface, exhibited a total surface energy of about 26 J/m$^2$, which is moderately less hydrophobic than the "air-cured" sample. After this formulation was subjected to the standard aging procedure, the total surface energy decreased from about 26 J/m$^2$ to under 26 J/m$^2$. This result would appear to corroborate the RCA results obtained for the various aged and un-aged materials of this exemplary formulation.

Example 15

Release layer surface energies were calculated for ink reception surfaces of the following Examples: Example 2A, cured under exposure to air; Example 2, cured against an anti-static PET surface; and Example 2, cured against an anti-static PET surface and then subjected to the standard aging procedure at 160° C., for 2 hours. The three Examples have the identical chemical formulation.

As in Example 14, the total surface energy was calculated using the classic "harmonic mean" method. The results are provided below:

| Release formulation | Total Surface Energy (J/m$^2$) |
|---|---|
| Example 2A -- Air Cured | 34.6 |
| Example 2 -- Aged | 39.9 |
| Example 2 | 49.1 |

In Example 2A, cured under exposure to air, the release layer surface is less hydrophobic than the release layer of Example 1A, the total surface energy of the surface being about 35 J/m$^2$. Example 2, cured against an anti-static PET surface, exhibited a total surface energy of about 49 J/m$^2$, which is significantly less hydrophobic than the "air-cured" sample. After this formulation was subjected to the standard aging procedure, the total surface energy decreased from about 49 J/m$^2$ to about 40 J/m$^2$. This result would appear to corroborate the RCA results obtained for the various aged and un-aged materials of this exemplary formulation.

Example 16

The temperature on the blanket surface is maintained at 75° C. The image (typically a color gradient of 10-100%) is printed at a speed of 1.7 m/sec on the blanket, at a resolution of 1200 dpi. An uncoated paper (A4 Xerox Premium Copier Paper, 80 gsm) is set between the pressure roller and the blanket and the roller is pressed onto blanket, while the pressure is set to 3 bar. The roller moves on the paper, applying pressure on the contact line between blanket and paper and promoting the transfer process. In some cases, incomplete transfer may be observed, with an ink residue remaining on the blanket surface. In order to evaluate the extent of that ink residue, glossy paper (A4 Burgo glossy paper 130 gsm) is applied on the blanket similarly to the uncoated paper and the transfer process is again performed. Any ink that remained on blanket and was not transferred to the uncoated paper will be transferred to the glossy paper. Thus, the glossy paper may be evaluated for ink residue, according to the following scale (% of image surface area):

A—no visible residue
B—1-5% visible residue
C—more than 5% visible residue

Results of the evaluation are provided below:

| Release formulation | Transfer grade |
|---|---|
| Example 4 | B |
| Example 1 | B |
| Example 2 | A |
| Example 3 | A |
| Example 6 | C |

Example 17

Example 16 was repeated for the release surfaces of Examples 2 and 3, but at a printing speed of 3.4 m/sec on the blanket. Both release surfaces retained a transfer grade of A.

Example 18

The ITM release layer compositions of Examples 2 and 3 were cured against a PET substrate according to the procedure provided in Example 1. The ITM release layer compositions of Examples 2 and 3 were cured against air, according to the procedure provided in Comparative Examples 1B and 1C. The samples were then subjected to dynamic contact angle (DCA) measurements at 10 seconds and subsequently at 70 seconds, according to the following procedure:

The drop is placed onto a smooth PTFE film surface with as little drop falling as possible, so that kinetic energy does not spread the drop. A pendant drop is then formed. Subsequently, the specimen is raised until it touches the bottom of the drop. If the drop is large enough, the adhesion to the surface will pull it off the tip of the needle. The needle tip is positioned above the surface at such a height that the growing pendant drop will touch the surface and detach before it falls free due to its own weight.

The dynamic contact angle is then measured at 10 seconds and at 70 seconds. The results are provided below:

| | Dynamic contact angle | | | |
|---|---|---|---|---|
| | Cured against PET | | Cured against Air | |
| Example | after 10 sec | after 70 sec | after 10 sec | after 70 sec |
| Ex 2 | 105° | 97° | 114° | 103° |
| Ex 3 | 87° | 70° | 113° | 94° |

It is observed that the initial measurement of the dynamic contact angle, at 10 seconds, provides a strong indication of the hydrophilicity of the release layer surface. The subsequent measurement at 70 seconds provides an indication of the extent to which any liquid (such as a polyether glycol functionalized polydimethyl siloxane) disposed within the release layer has been incorporated into the drop. Such incorporation may further reduce the measured DCA.

Thus, the samples cured against PET exhibit substantially lower (more hydrophilic) initial DCA measurements (105°, 87°) relative to the hydrophilic initial DCA measurements (114°, 113°) of the respective samples cured against air. In addition to displayed hydrophilicity, the samples cured against PET exhibited a drop in DCA of 8 to 17° between the first and second measurements.

FIGS. 25A-25C provide images of various ink patterns printed onto a release layer of an ITM of the present invention, in which the release layer of Example 2 was cured against the PET carrier surface. FIGS. 26A-26C are images of the same ink patterns printed onto a release layer of Example 2, but in which the release layer was cured against air. Comparing between FIGS. 25A and 26A, it is manifest that the release layer of the inventive ITM exhibits a higher optical density, and more accurately reflects the ink image pattern. A comparison between FIGS. 25C and 26C yields the identical conclusion. Comparing now between FIGS. 25B and 26B, it is evident that each ink dot in FIG. 25B is appreciably larger than the respective ink dots in FIG. 26B.

As used herein in the specification and in the claims section that follows, the term "receding contact angle" or "RCA", refers to a receding contact angle as measured using a Dataphysics OCA15 Pro Contact Angle measuring device, or a comparable Video-Based Optical Contact Angle Measuring System, using the above-described Drop Shape Method, at ambient temperatures. The analogous "advancing contact angle", or "ACA", refers to an advancing contact angle measured substantially in the same fashion.

As used herein in the specification and in the claims section that follows, the term "dynamic contact angle" or "DCA", refers to a dynamic contact angle as measured using a Dataphysics OCA15 Pro Contact Angle measuring device, or a comparable Video-Based Optical Contact Angle Measuring System, using the method elaborated by Dr. Roger P. Woodward in the above-referenced "Contact Angle Measurements Using the Drop Shape Method", at ambient temperatures, and as elaborated hereinabove in Example 17.

As used herein in the specification and in the claims section that follows, the term "standard aging procedure" refers to an accelerated aging protocol performed on each tested release layer at 160° C., for 2 hours, in a standard convection oven.

As used herein in the specification and in the claims section that follows, the term "standard air curing" refers to a conventional curing process for curing the release layer, described with respect to Comparative Examples 1A-1F, in which, during the curing of the release layer, the release layer surface (or "ink reception surface") is exposed to air.

As used herein in the specification and in the claims section that follows, the term "bulk hydrophobicity" is characterized by a receding contact angle of a droplet of distilled water disposed on an inner surface of the release layer, the inner surface formed by exposing an area of the cured silicone material within the release layer.

With regard to Examples C1-C12, the viscosity of each sample, measured at room temperature, is provided below (all values in cP):

C1=19.2

C2=18.15

C3=22.3

C4=36.2

C5=19.8

C6=21.2

C7=28.1

C8=18.0

C9=50.0

C10=48.2

C11=20.2

C12=20.7

The surface tensions for these aqueous treatment formulations was more homogeneous for these 12 exemplary formulations, and was generally within the range of 26-29 mN/m or 26-28 mN/m, at room temperature.

Examples C1-C12

Exemplary compositions of the invention ITM aqueous treatment liquids are provided in the tables hereinbelow:

| | conc. | components |
|---|---|---|
| C1 | 5.00% | PVA 4-88 |
| | 0.30% | Xiameter OFX-5211 |
| | 3.00% | Silsurf A010 D up |
| | 0.50% | Lupasol PN 50 |
| | 5.00% | Sugar |
| | 6.00% | Foamquat SAQ 90 |
| | 80.20% | water |

| | conc. | components |
|---|---|---|
| C2 | 3.50% | 9VA 8-88 |
| | 0.30% | Xiameter OFX-5211 |
| | 3.00% | Silsurf A010 D up |
| | 0.50% | Lupasol P |
| | 3.00% | Sugar |
| | 5.00% | Foamquat SAQ 90 |
| | 84.70% | water |

| | conc. | components |
|---|---|---|
| C3 | 6.00% | PVA 4-88 |
| | 0.30% | Xiameter OFX-5211 |
| | 3.00% | Silsurf A010 D up |
| | 0.50% | Lupasol PN 50 |
| | 5.00% | Sugar |
| | 5.40% | Larostate 264 A |
| | 79.80% | water |

| | conc. | components |
|---|---|---|
| C4 | 4.50% | PVA 8-88 |
| | 0.30% | Tego 240 |
| | 1.00% | Silsurf A010 D up |
| | 0.50% | Lupasol PN 50 |
| | 3.00% | Basionics LQ01 |
| | 7.00% | Foamquat SAQ 90 |
| | 83.70% | water |

| | conc. | components |
|---|---|---|
| C5 | 3.20% | PVA 8-88 |
| | 0.30% | Xiameter OFX-5211 |
| | 1.00% | Silsurf A010 D up |
| | 0.50% | Lupasol PN 50 |
| | 6.00% | cliqsmart 129-30 |
| | 6.00% | Arquad O-50 |
| | 83.00% | water |

| | conc. | components |
|---|---|---|
| C6 | 5.00% | Methocel E3 |
| | 0.30% | Xiameter OFX-5211 |
| | 1.00% | Silsurf A010 D up |
| | 0.50% | Lupasol PN 50 |
| | 6.00% | cliqsmart 129-30 |
| | 6.00% | Foamquat SAQ 90 |
| | 81.20% | water |

| | conc. | components |
|---|---|---|
| C7 | 5.00% | Methocel E3 |
| | 0.30% | Xiameter OFX-5211 |
| | 1.00% | Silsurf A010 D up |
| | 0.50% | Lupasol PN 50 |
| | 5.00% | Basionics LQ01 |
| | 5.00% | Foamquat SAQ 90 |
| | 83.20% | water |

| | conc. | components |
|---|---|---|
| C8 | 5.00% | Methocel E3 |
| | 0.30% | Xiameter OFX-5211 |
| | 1.00% | Silsurf A010 D up |
| | 0.50% | Lupasol PN 50 |
| | 6.00% | Urea |
| | 6.00% | Foamquat SAQ 90 |
| | 81.20% | water |

| | conc. | components |
|---|---|---|
| C9 | 5.00% | PVA 8-88 |
| | 0.30% | Xiameter OFX-5211 |
| | 1.00% | Silsurf A010 D up |
| | 0.50% | Lupasol PN 50 |
| | 5.50% | Urea |
| | 5.50% | Foamquat SAQ 90 |
| | 82.20% | water |

| | conc. | components |
|---|---|---|
| C10 | 5.00% | PVA 4-88 |
| | 0.30% | Xiameter OFX-5211 |
| | 3.00% | Silsurf A010 D up |
| | 0.50% | Lupasol PN 50 |
| | 5.00% | Sugar |
| | 6.00% | Foamquat SAQ 90 |
| | 80.20% | water |

| | conc. | components |
|---|---|---|
| C11 | 3.50% | PVA 8-88 |
| | 0.30% | Dynax 4000 |
| | 1.00% | Silsurf A010 D up |
| | 0.50% | Lupasol PN 50 |
| | 3.00% | Basionics LQ01 |
| | 7.00% | Foamquat SAQ 90 |
| | 84.70% | water |

| | conc. | components |
|---|---|---|
| C12 | 5.00% | PVA 4-88 |
| | 0.30% | BYK 307 |
| | 1.00% | Silsurf A010 D up |
| | 0.50% | Lupasol PN 50 |
| | 5.00% | Sugar |
| | 5.40% | Foamquat SAQ 90 |
| | 82.80% | water |

Examples C13-C22

Compositions of ITM aqueous treatment liquids, and various properties thereof, are provided in the table below, as Example Compositions C13 to C22.

| | | EX. C13 | EX. C14 | EX. C15 | EX. C16 | EX. C17 | EX. C18 | EX. C19 | EX. C20 | EX. C21 | EX. C22 |
|---|---|---|---|---|---|---|---|---|---|---|---|
| % solids (by wt.) | PVA6-88 | 4 | 4 | 4 | 4 | 4 | 4 | 4 | 4 | 4 | 4 |
| | PVA8-88 | | | | | | | | | | |
| | sugar | 5 | 5 | 5 | 5 | 0 | 0 | | 10 | 10 | 5 |
| | Silsurf A010 D-UP | 3 | 3 | | 4.38 | 3 | 3 | 3 | 3 | 3 | 3 |
| | Lupasol P | | | | 0.84 | 0.5 | 0.5 | | | 0.5 | 0.5 |
| | BYK 21344 | 0.3 | 0.3 | 0.3 | 0.3 | 0.3 | 0.3 | 0.3 | 0.3 | 0.3 | 0.3 |
| | glycerin | | | | | | | | | | |

-continued

| | | EX. C13 | EX. C14 | EX. C15 | EX. C16 | EX. C17 | EX. C18 | EX. C19 | EX. C20 | EX. C21 | EX. C22 |
|---|---|---|---|---|---|---|---|---|---|---|---|
| | Larostate 264A | 3 | | 3 | | 5 | | 3 | | | |
| | Foamquat SAQ 90 | | | | 5.5 | | 5.5 | | | | |
| | total solids (%) | 15.3 | 12.3 | 12.3 | 20.2 | 12.8 | 13.3 | 10.3 | 17.3 | 17.8 | 12.8 |
| 1200 dpi × | M dot size | 47.33 | 42.44 | 47.58 | 48.43 | 41.6 | 41.5 | 41.9 | 46.5 | 43.2 | 39.5 |
| 600 dpi, | K dot size | 48.75 | 44.3 | 46.62 | 48.35 | 43.4 | 43 | 43.5 | 48.5 | 45.9 | 42 |
| 2D-as | Viscosity (cP) | 15.57 | 8.34 | 10.23 | 19 | 10.7 | 13.6 | 9.3 | 11.2 | 13.9 | 11.2 |
| prepared | Transfer (K, 3/150), Burgo/Condat | | | | | | | | | | |
| | Wetting (M) | | | | | | | | very grainy | grainy | |
| | surface tension (dyne/cm) | 25 | 21.5 | 28.7 | 26.2 | | | | | | |
| | texture | | failed | | | | | | | | |

Example C23

An additional aqueous treatment formulation is provided in Example C23. This formulation is devoid of surfactant, other than the quaternary ammonium salt (Larostate 264A), which is present at a relatively high percentage (8% by weight) so as to sufficiently reduce the surface tension of the aqueous treatment formulation. The surface tension and viscosity at room temperature are 32.3 mN/m and 17.8 cP, respectively.

| conc. | components |
|---|---|
| 4.00% | PVA 6-88 |
| 8.00% | Larostate 264A |
| 0.30% | Lupasol P |
| 4.00% | Sugar |
| 83.700% | water |

Preparation of Pigments

Pigments used in the examples described below are generally supplied with initial particle size of a few micrometers. Such pigments were ground to submicron range in presence of the dispersing agent, the two materials being fed to the milling device as an aqueous mixture. Unless stated otherwise, 30 g pigment were mixed with the weight amount of dispersant satisfying the weight ratio indicated in the following examples. Deionized water was added to a balance of 200 g. This liquid slurry was size-reduced in presence of 4500 g of chrome-steel beads (Glen Mills Inc., USA) having a diameter of 0.8 mm in an Attritor HDDM-01/HD-01 by Union Process for a duration of time and at an energy input sufficient to prepare millbase comprising pigment particles having a median diameter (as analyzed per volume of particles) of 100 nm or less ($D_{V50}$≤100 nm). Typically, the attritor was operated at about 3000 rpm, for at least 48 hours, the milling duration also depending on the initial particle size.

Particle size and distribution thereof in the compositions so prepared was determined using DLS methodology (Malvern Zetasizer Nano ZS). Unless otherwise stated, an aliquot was removed from the compositions being considered, and if necessary diluted in double distilled water (DDW), so as to obtain samples having a solid concentration of about 1 wt. %. The liquid samples were briefly sonicated (about 7 sec in a Sonics Vibracell VCX 750 (750 watts) at 75% of max power) ahead of DLS measurement to ensure a proper dispersion of the pigment particles during assessment of particle size and distribution. Results were analyzed based on the volume of the particles.

Once the pigment-dispersant mixture reached desired particle size, 50 g water were added to the chamber of the milling device and the resulting diluted dispersion was extracted therefrom. The beads were separated by filtration of the diluted millbase through a suitable mesh. The pigment concentration at this stage was 12 wt. %.

To the pigment-dispersant-containing millbase was added sodium dodecanoate (SDD), and/or at least one additive from the following additives: potassium dodecanoate, sodium oleate, potassium oleate, sodium myristate, potassium myristate, sodium dodecyl sulfate, sodium dodecylbenzene sulfonate, potassium and sodium octanoate. Water was added as needed to yield a composition having a pigment concentration of 10 wt. %.

Example I1—Ink Composition

In the present example, the preparation of an ink composition is described: Heliogen® Blue D7079 was milled with Disperbyk® 190 in a HDDM-01/HD-01 attritor as previously described, the materials were mixed in the following proportion:

| | |
|---|---|
| Heliogen ® Blue D7079 | 30 g |
| Disperbyk ® 190 (40%) | 30 g |
| Water | 140 g |
| Total | 200 g |

The milled concentrate, now having a Dv50 of less than 100 nm, was further diluted with 50 g water and extracted from the milling device at 12 wt. % pigment concentration. The millbase concentrate was further processed as below described for the preparation of an ink composition In a first stage, 2.4 g of sodium dodecanoate were added to 200 g of the millbase concentrate to yield a millbase. The mixture was stirred to homogeneity (5' magnetic stirrer at 50 rpm) and incubated at 60° C. for 1 day. The mixture was then left to cool down to ambient temperature. In a second stage, ink ingredients were added to the millbase as follows:

| | | |
|---|---|---|
| Millbase Concentrate (from stage 1) | 202.4 | g |
| Joncryl ® 538 (46.5%) | 154.8 | g |
| BYK ® 349 | 5 | g |
| BYK ® 333 | 2 | g |
| Propylene Glycol | 240 | g |
| Water | 595.8 | g |
| Total | 1200 | g |

The mixture was stirred for 30 minutes at ambient temperature, resulting in an ink-jettable ink composition having a viscosity of less than 10 cP.

Examples I2 to I5—Ink Compositions

The ink of Example I1 was formulated, but with the addition of 5, 10, 12, and 15 g, respectively, of TWEEN 20.

Dot Gain

Dot gain refers to the increase in dot size over the initial, spherical drop diameter. The dot gain is determined by the ratio of the final dot diameter to the initial drop diameter. It is highly desirable to find a way to increase dot size without having to increase drop volume.

Utilizing the inventive technologies disclosed herein, the inventors attained dot gains of at least 1.5 or 1.6, and more typically, at least 1.7, at least 1.8, at least 1.9, or at least 2.0, or within a range of 1.5 to 2.2, 1.5 to 2.1, 1.7 to 2.1, or 1.8 to 2.1.

For example, using drops having a volume of 6.3 picoliters (D=22.9 micrometers), and using the aqueous treatment formulations of the present invention, the dried ink dots obtained were within a diameter range of 40 to 48 micrometers.

As used herein in the specification and in the claims section that follows, the terms "hydrophobicity" and "hydrophilicity" and the like, may be used in a relative sense, and not necessarily in an absolute sense.

As used herein in the specification and in the claims section that follows, the term "functional group" refers to a group or moiety attached to the polymer structure of the release layer, and having a higher polarity than the O—Si—O group of conventional addition-cured silicones. Various examples are provided herein. The inventors observe that pure addition cure polydimethyl siloxane polymer contains O—Si—O, $SiO_4$, Si—$CH_3$ and C—C groups, and that most other functional groups will have a higher dipole, such that they may be considered "functional". It will be appreciated by those of skill in the art that such functional groups, may have a tendency or strong tendency to react with components typically present in aqueous inks utilized in indirect inkjet printing, at process temperatures of up to 120° C.

Unless otherwise defined, all technical and scientific terms used herein have the same meaning as commonly understood by one of ordinary skill in the art to which the invention pertains. In case of conflict, the specification, including definitions, will take precedence.

In the description and claims of the present disclosure, each of the verbs, "comprise" "include" and "have", and conjugates thereof, are used to indicate that the object or objects of the verb are not necessarily a complete listing of members, components, elements, steps or parts of the subject or subjects of the verb. These terms encompass the terms "consisting of" and "consisting essentially of".

As used herein, the singular form "a", "an" and "the" include plural references and mean "at least one" or "one or more" unless the context clearly dictates otherwise.

Positional or motional terms such as "upper", "lower", "right", "left", "bottom", "below", "lowered", "low", "top", "above", "elevated", "high", "vertical", "horizontal", "backward", "forward", "upstream" and "downstream", as well as grammatical variations thereof, may be used herein for exemplary purposes only, to illustrate the relative positioning, placement or displacement of certain components, to indicate a first and a second component in present illustrations or to do both. Such terms do not necessarily indicate that, for example, a "bottom" component is below a "top" component, as such directions, components or both may be flipped, rotated, moved in space, placed in a diagonal orientation or position, placed horizontally or vertically, or similarly modified.

Unless otherwise stated, the use of the expression "and/or" between the last two members of a list of options for selection indicates that a selection of one or more of the listed options is appropriate and may be made.

As used herein in the specification and in the claims section that follows, the term "%" refers to percent by weight, unless specifically indicated otherwise.

Similarly, the term "ratio", as used herein in the specification and in the claims section that follows, refers to a weight ratio, unless specifically indicated otherwise.

In the disclosure, unless otherwise stated, adjectives such as "substantially" and "about" that modify a condition or relationship characteristic of a feature or features of an embodiment of the present technology, are to be understood to mean that the condition or characteristic is defined to within tolerances that are acceptable for operation of the embodiment for an application for which it is intended.

While this disclosure has been described in terms of certain embodiments and generally associated methods, alterations and permutations of the embodiments and methods will be apparent to those skilled in the art. The present disclosure is to be understood as not limited by the specific embodiments described herein, but only by the scope of the appended claims.

What is claimed is:

1. An ITM handling system for use with an intermediate transfer member (ITM) comprising a flexible endless belt mounted over a plurality of guide rollers, the system comprising:

a. cleaning station comprising a first brush disposed outside of a belt-loop defined by the endless belt and configured to remove material disposed on the surface of the ITM; and b. a turret-assembly disposed downstream of the cleaning station, the turret-assembly configured to thin an in-motion layer of liquid that is applied to the ITM surface downstream of the first brush, the turret assembly comprising:

i. a turret; and ii. a plurality of turret-mounted deflector-objects mounted around a circumference of the turret, a given deflector-object of the plurality of deflector-objects disposed outside of the belt-loop and facing the ITM surface so as to deflect therefrom excess liquid to thin the in-motion layer of liquid, wherein:

A. the turret is rotatable to effect replacement of the given deflector-object; and B. a spacing of the turret-mounted deflector-objects is such that, during rotation of the turret, the given deflector-object does not cease to be functional until a replacement deflector-object of the plurality of turret-mounted deflector-objects commences functioning.

2. The system of claim 1, wherein the given deflector-object is a doctor blade which, when active to thin the in-motion layer of liquid, is oriented normal to the ITM surface.

3. The system of claim 1, wherein when active to thin the in-motion layer of liquid, the given deflector-object is urged towards the ITM surface and/or vice versa.

4. The system of claim 1, further comprising a treatment-station backing roller disposed inside the loop defined by the endless belt, wherein when the given deflector-object is active to deflect liquid from the ITM surface, pressure is applied between (i) the given deflector-object and (ii) the treatment-station backing roller via a section of the ITM which is disposed therebetween.

5. The system of claim 4 wherein the treatment-station backing roller has a soft outer surface.

6. The system of claim 1, further comprising a cleaning-station backing roller disposed inside the loop defined by the endless belt opposite of the first brush, wherein the system is configured so that pressure is applied between (i) the cleaning-station backing roller and (ii) the first brush via a section of the ITM which is disposed therebetween.

7. The system of claim 1 further comprising a second brush for deflector-object-cleaning, wherein in some later stage of the turret rotation cycle after which the given deflector-object has ceased to interact with the ITM surface, the given deflector-object is rotated through a group of bristles of the second brush to remove deposits from the given deflector-object.

8. The system of claim 7 wherein the turret rotation cycle is such that further rotation of the given deflector-object after cleaning by the second brush positions the given deflector-object to again interact with the ITM surface to deflect liquid from the ITM surface.

9. The system of claim 1 wherein when the given deflector-object is active, (A) a liquid-removing-portion thereof faces and is disposed below, a downwards-facing portion of ITM surface; and (B) a downwards-facing portion of the ITM surface is downwardly urged towards the liquid-removing portion of the given deflector-object.

10. The system of claim 1 wherein the given deflector-object is a doctor-blade, and when the given deflector-object is active, a liquid-removing portion of the deflector-object is both vertically-oriented and is disposed below, a surface of a horizontally-oriented section of the ITM and (II) the vertically-oriented liquid-removing portion of the given deflector-object is oriented normal to the horizontally-oriented section of ITM.

11. The system of claim 1, wherein the given deflector-object is a doctor blade and wherein the system is configured such that the removing of excess liquid is performed at least in part by the combination of: (i) a tip of a vertically-oriented blade which faces, and is disposed below, a surface of a horizontally-oriented section of the ITM; and (ii) a backing roller which is disposed inside of a closed loop of the endless ITM and which downwardly urges the surface of the horizontally-oriented section of the ITM towards the tip of the vertically-oriented blade.

12. An ITM handling system for use with an intermediate transfer member (ITM) comprising a flexible endless belt mounted over a plurality of guide rollers, the system comprising:

a. cleaning station comprising a first brush disposed outside of a belt-loop defined by the endless belt and configured to remove material disposed on the surface of the ITM; and b. a turret-assembly disposed downstream of the cleaning station, the turret-assembly configured to thin an in-motion layer of liquid that is applied to the ITM surface downstream of the first brush, the turret assembly comprising:

i. a turret; and ii. a plurality of turret-mounted deflector-objects mounted around a circumference of the turret, a given deflector-object of the plurality of deflector-objects disposed outside of the belt-loop and facing the ITM surface so as to deflect therefrom excess liquid to thin the in-motion layer of liquid, wherein:

A. the turret is rotatable to effect replacement of the given deflector-object; and B. the turret is further rotatable so that in some later stage of the turret rotation cycle after which the given deflector-object has ceased to interact with the ITM surface, the given deflector-object is rotated through a group of bristles of the second brush to remove deposits from the given deflector-object; and C. the turret rotation cycle is such that further rotation of the given deflector-object after cleaning by the second brush positions the given deflector-object to again interact with the ITM surface to deflect therefrom liquid to thin the in-motion layer of liquid.

13. The system of claim 12 wherein when the given deflector-object is active, (A) a liquid-removing-portion of the given deflector-object faces and is disposed below, a downwards-facing portion of ITM surface; and (B) a downwards-facing portion of the ITM surface is downwardly urged towards the liquid-removing portion of the given deflector-object.

14. The system of claim 12 wherein when the given deflector-object is active, a liquid-removing portion of the deflector-object is both vertically-oriented and is disposed below, a surface of a horizontally-oriented section of the ITM and (II) the vertically-oriented liquid-removing portion of the given deflector-object is oriented normal to the horizontally-oriented section of ITM.

15. The system of claim 12, configured such that the removing of excess liquid is performed at least in part by the combination of: (i) a tip of a vertically-oriented blade which faces, and is disposed below, a surface of a horizontally-oriented section of the ITM; and (ii) a backing roller which is disposed inside of a closed loop of the endless ITM and which downwardly urges the surface of the horizontally-oriented section of the ITM towards the tip of the vertically-oriented blade.

16. An ITM handling system for use with an intermediate transfer member (ITM) comprising a flexible endless belt mounted over a plurality of guide rollers, the system comprising:

a. cleaning station comprising a first brush disposed outside of a belt-loop defined by the endless belt and configured to remove material disposed on the surface of the ITM;

b. backing roller disposed inside the belt-loop and downstream of the first brush;

c. a turret-assembly disposed downstream of the cleaning station, the turret-assembly configured to thin an in-motion layer of liquid that is applied to the ITM surface downstream of the first brush, the turret assembly comprising:

i. a turret; and ii. a plurality of turret-mounted deflector-objects mounted around a circumference of the turret, a given deflector-object of the plurality of deflector-objects disposed outside of the belt-loop, opposite of the backing roller, and facing the ITM surface so as to deflect therefrom excess liquid to thin the in-motion layer of liquid, wherein:

A. the turret is rotatable to effect replacement of the given deflector-object; and B. when positioned opposite of the backing roller to thin the in-motion layer of liquid:

(I) the given deflector-object is urged towards the backing roller to press thereon via a portion of the ITM dispose therebetween; and/or (II) the backing roller is urged towards the given deflector object to press thereon via a portion of the ITM dispose therebetween.

17. A conveyer-belt system comprising:

a. an intermediate transfer member (ITM) comprising a flexible endless belt mounted over a plurality of guide rollers to define a belt-loop;

b. a turret-assembly disposed downstream of the cleaning station, the turret-assembly configured to thin an in-motion layer of liquid that is pre-applied to the ITM surface, the turret assembly comprising:

i. a turret; and ii. a plurality of turret-mounted deflector-objects mounted around a circumference of the turret, a given deflector-object of the plurality of deflector-objects disposed outside of the belt-loop and facing the ITM surface so as to remove therefrom excess liquid to thin the in-motion layer of liquid, iii. the turret is rotatable to effect replacement of the given deflector-object; wherein:

A. the system is configured so that at least one of a first condition, a second condition, and a third condition is true;

B. according to the first condition the system further comprises a backing roller disposed inside the belt-loop defined by the endless belt, and when positioned to thin the in-motion layer of liquid, the given deflector-object is disposed opposite of the backing roller so that:

(III) the given deflector-object is urged towards the backing roller to press thereon via a portion of the ITM dispose therebetween; and; or (IV) the backing roller is urged towards the given deflector object to press thereon via a portion of the ITM dispose therebetween;

C. according to the second condition, a spacing of the turret-mounted deflector-objects is such that, during rotation of the turret, the given deflector-object does not cease to be functional until a replacement deflector-object of the plurality of turret-mounted deflector-objects commences functioning; and D. according to the third condition:

(I) the system further comprises a brush;

(II) the turret is further rotatable so that in some later stage of the turret rotation cycle after which the given deflector-object has ceased to interact with the ITM surface, the given deflector-object is rotated through a group of bristles of the brush to remove deposits from the given deflector-object; and (III) the turret rotation cycle is such that further rotation of the given deflector-object after cleaning by the brush positions the given deflector-object to again interact with the ITM surface to deflect liquid from the ITM surface to thin the in-motion liquid layer.

18. The system of claim 17 wherein at least the first condition is true.

19. The system of claim 17 wherein at least the second condition is true.

20. The system of claim 17 wherein at least the third condition is true.

* * * * *